United States Patent
Sasaki

(10) Patent No.: US 6,490,127 B1
(45) Date of Patent: Dec. 3, 2002

(54) THIN FILM MAGNETIC HEAD WITH DIVERGING POLE CONNECTION PORTIONS

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/544,332

(22) Filed: Apr. 6, 2000

(30) Foreign Application Priority Data

Mar. 22, 2000 (JP) ......................................... 2000-084757

(51) Int. Cl.$^7$ ................................................. G11B 5/31
(52) U.S. Cl. ...................................................... 360/126
(58) Field of Search ........................................ 360/126

(56) References Cited

U.S. PATENT DOCUMENTS

| | | | | |
|---|---|---|---|---|
| 5,245,493 A | * | 9/1993 | Kawabe et al. | 360/126 |
| 5,600,519 A | | 2/1997 | Heim et al. | 360/126 |
| 5,668,689 A | * | 9/1997 | Schultz et al. | |
| 5,710,683 A | * | 1/1998 | Sundaram | 360/126 |
| 5,793,578 A | * | 8/1998 | Heim et al. | 360/126 |
| 5,828,533 A | * | 10/1998 | Ohashi et al. | 360/126 |
| 6,130,809 A | * | 10/2000 | Santini | 360/126 |
| 6,226,149 B1 | * | 5/2001 | Dill, Jr. et al. | 360/126 |
| 6,337,783 B1 | * | 1/2002 | Santini | |

FOREIGN PATENT DOCUMENTS

JP 08-249614 9/1996

* cited by examiner

Primary Examiner—Craig A. Renner
(74) Attorney, Agent, or Firm—Oliff & Berridge, PLC

(57) ABSTRACT

A thin film magnetic head capable of obtaining a sufficient overwrite characteristic and a method of manufacturing the same are provided. An insulating film pattern is disposed in a recess formed in a bottom pole. The front end of the insulating film pattern is positioned within a region where the front end part of a top pole tip extends. The insulating film pattern has the function of shielding propagation of magnetic flux from the top pole tip disposed on the insulating film pattern to the bottom pole formed under the insulating film pattern. Consequently, due to the existence of the insulating film pattern, the propagation of the magnetic flux from the top pole tip to the bottom pole is suppressed, so that sufficient magnetic flux is supplied to the front end part. Therefore, the excellent overwrite characteristic can be assured.

6 Claims, 30 Drawing Sheets

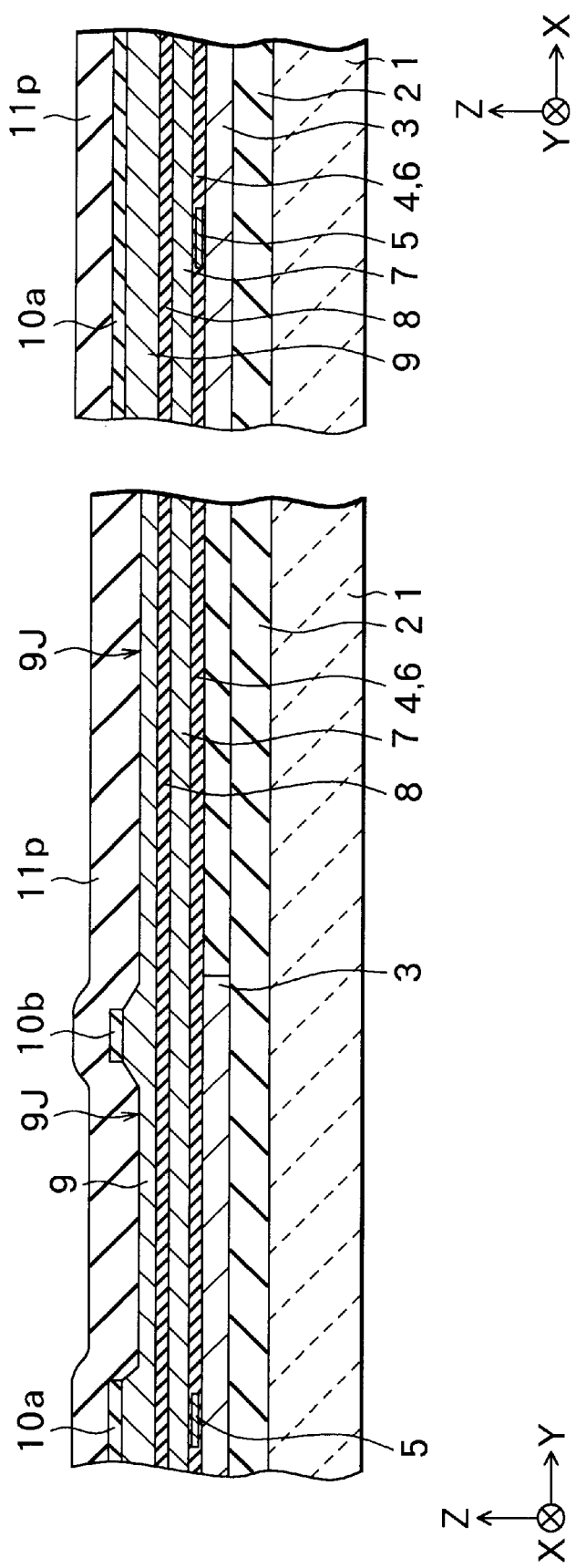

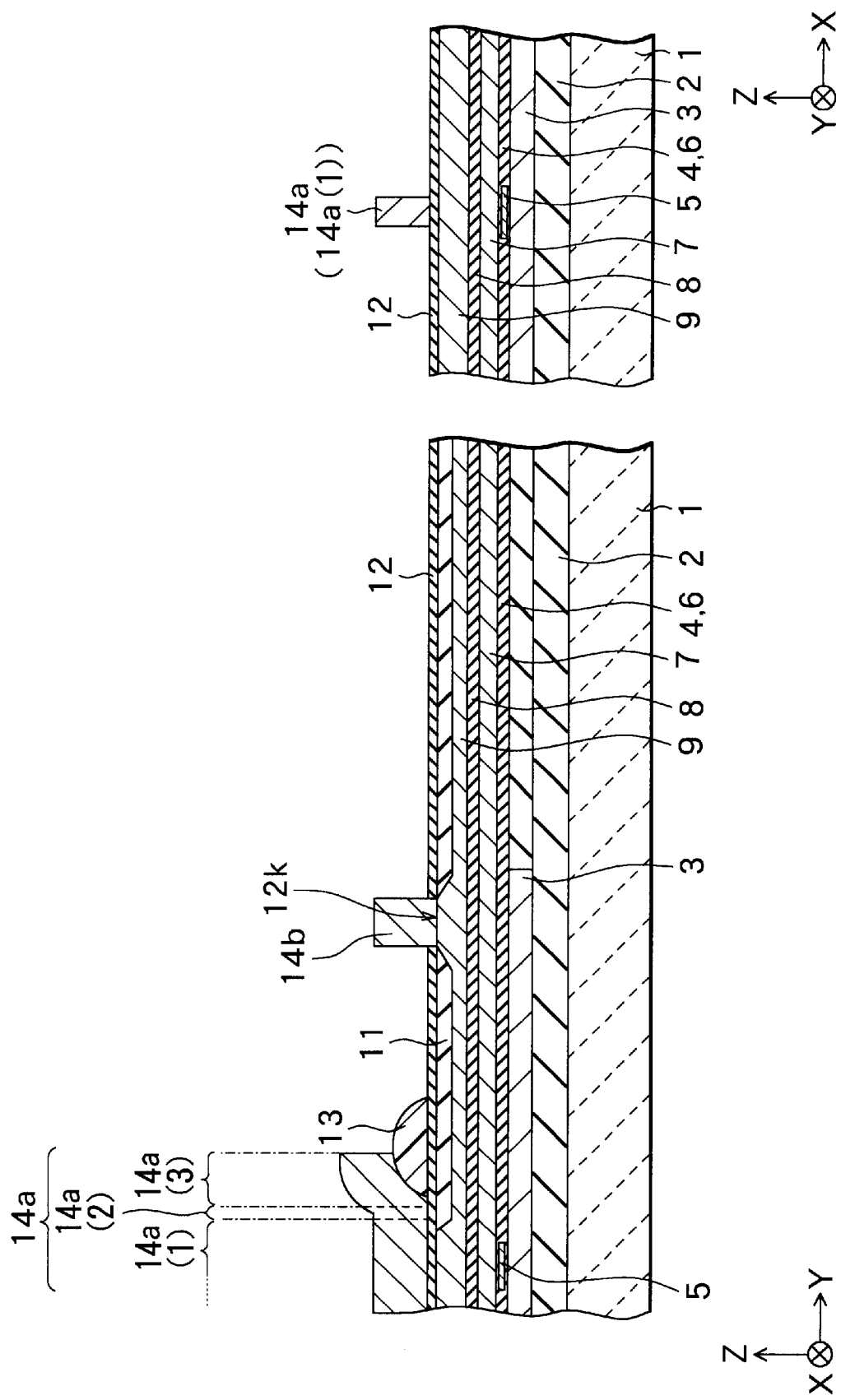

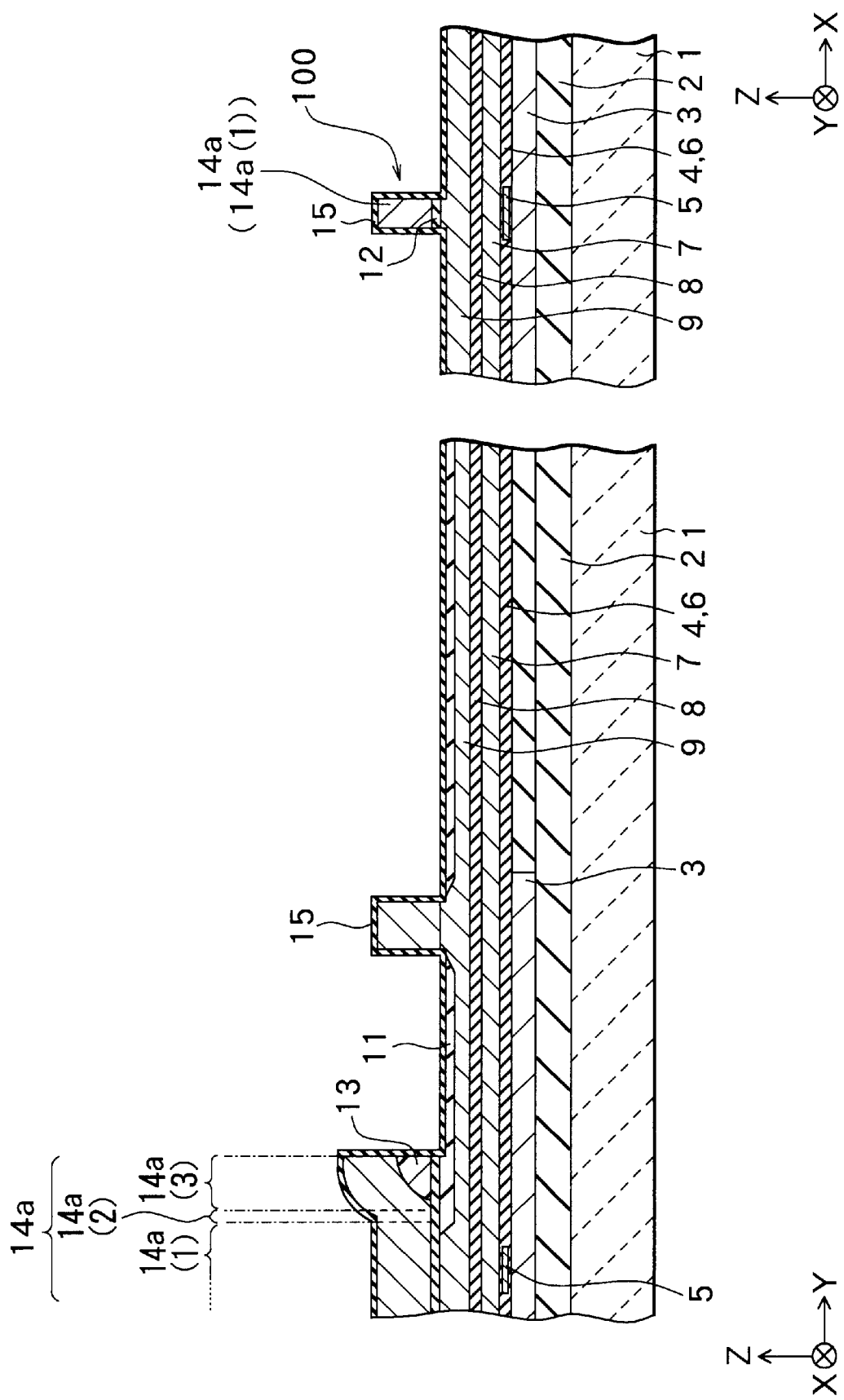

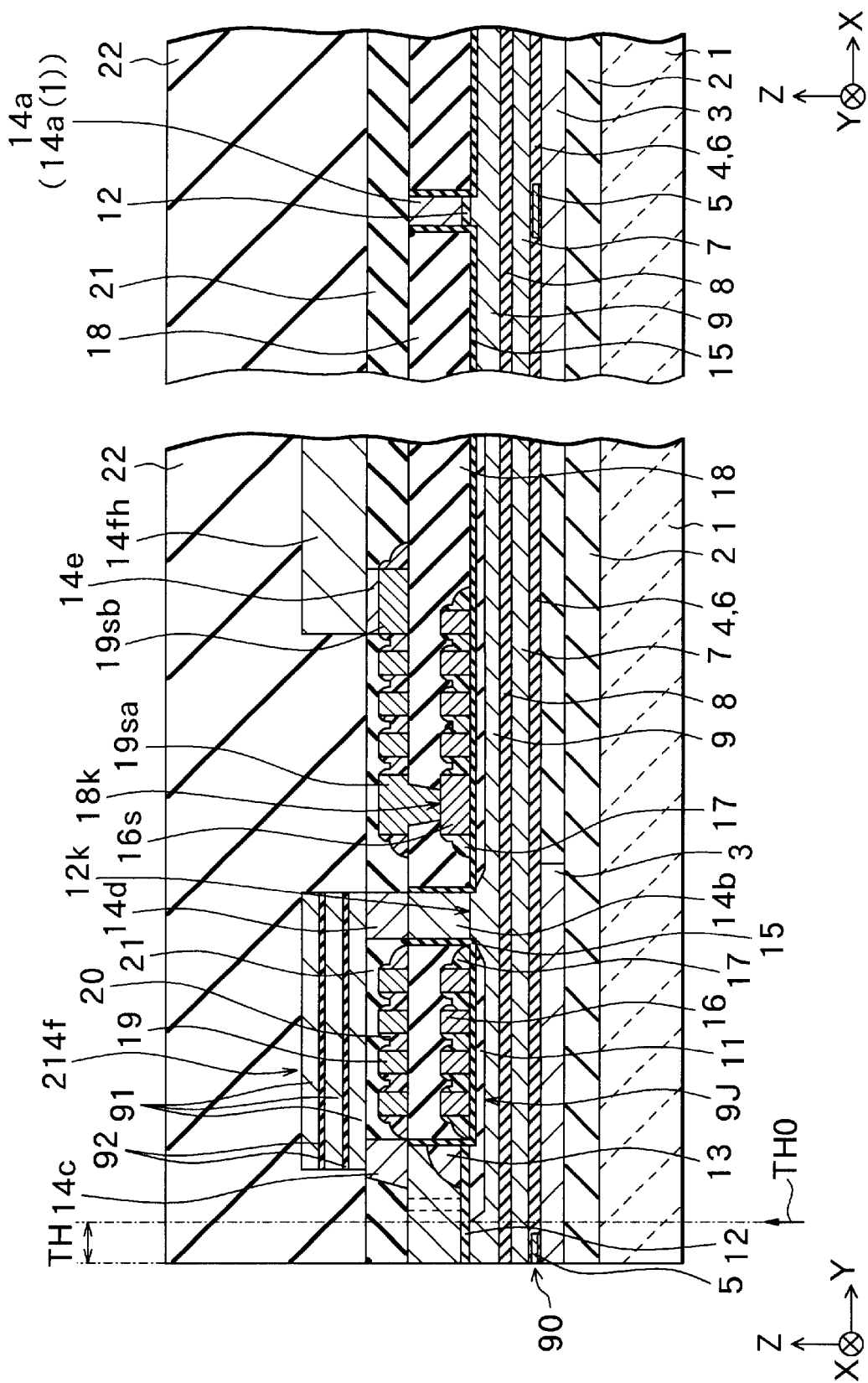

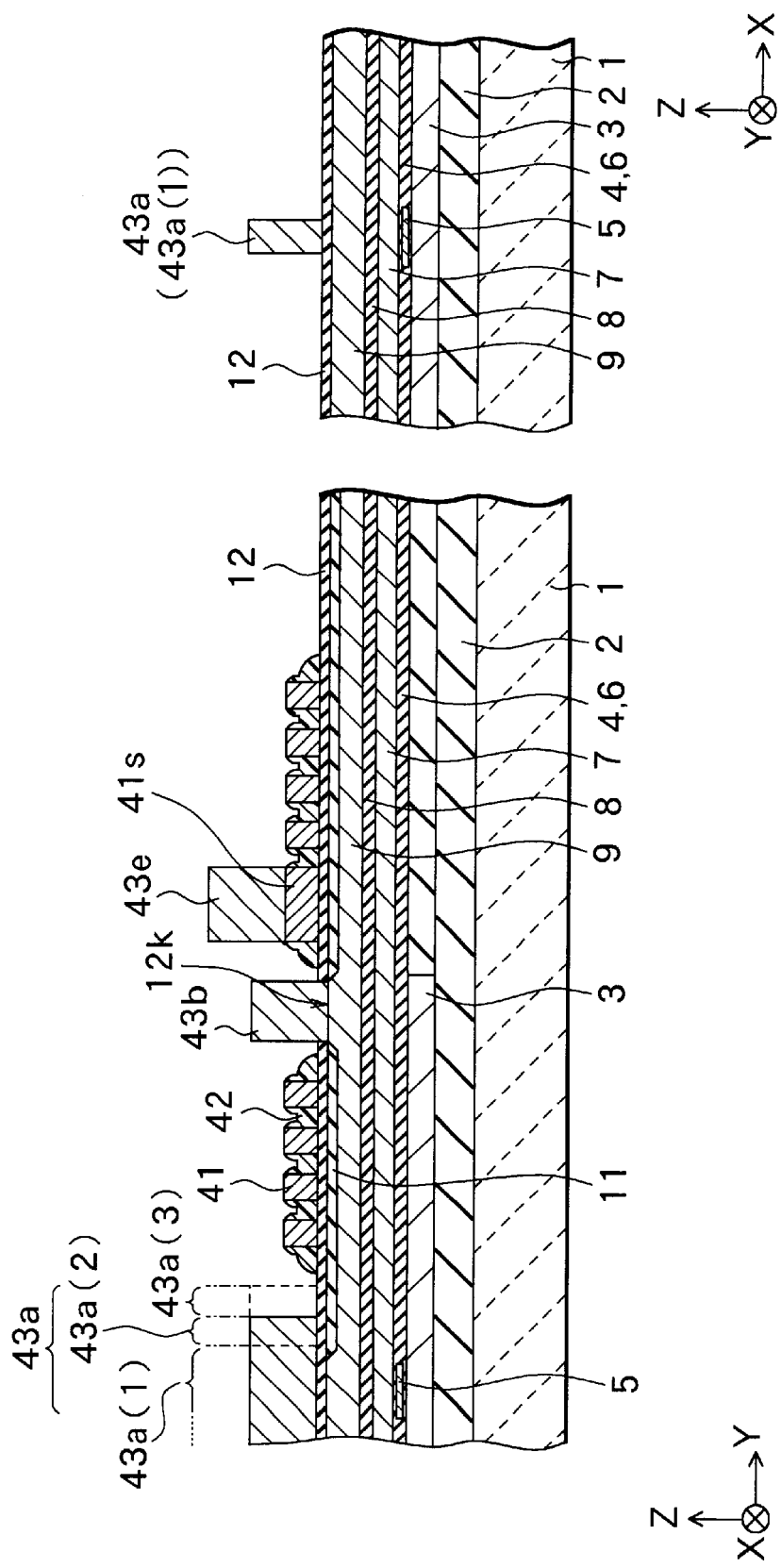

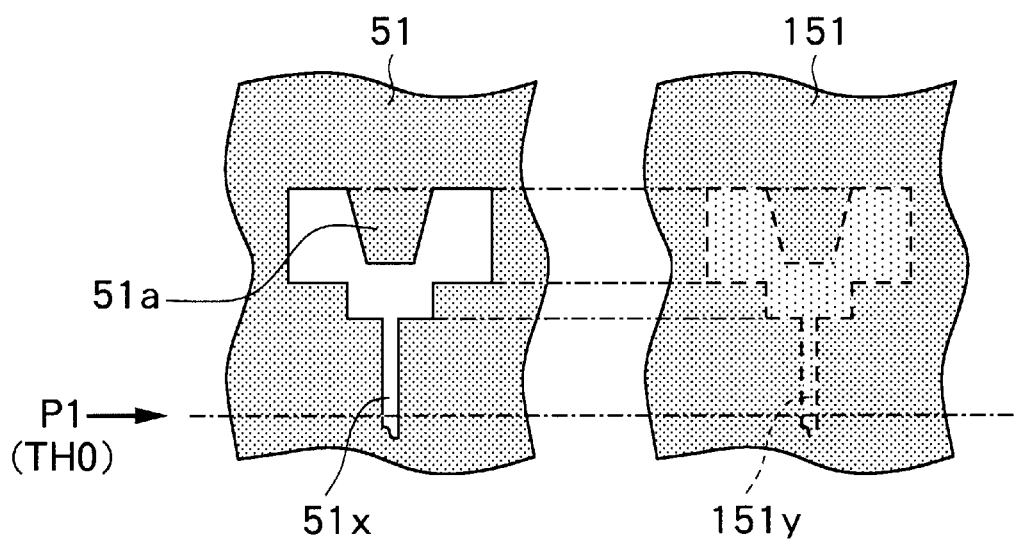
FIG.29A  FIG.29B
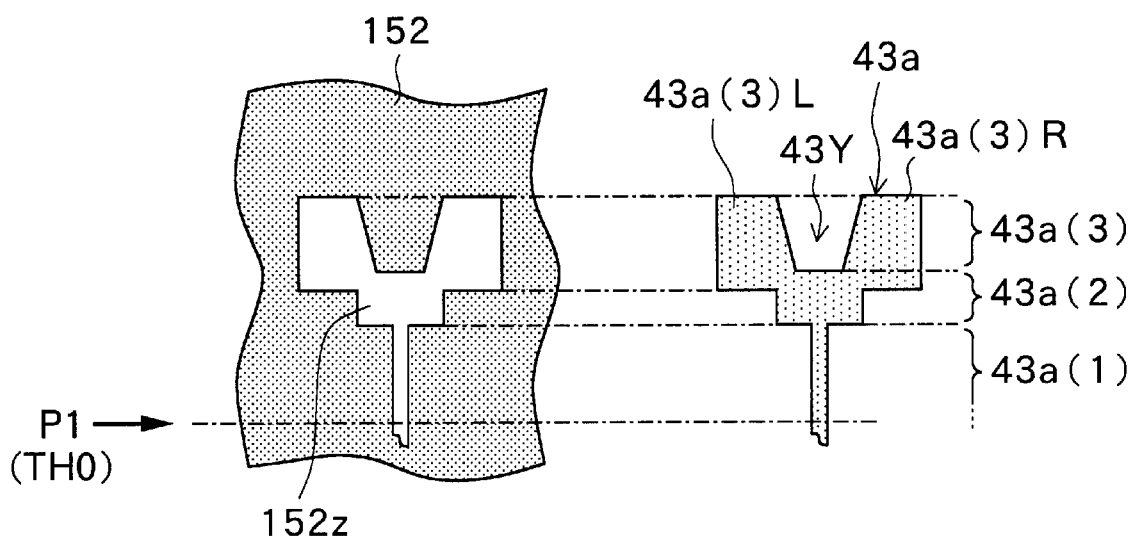
FIG.29C  FIG.29D
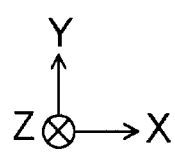

ND WITH CONNECTION PORTIONS

BACKGROUND OF THE INVENTION

1. Field of the Invention

The present invention relates to a method of manufacturing a thin film magnetic head having at least an inductive magnetic transducer for writing.

2. Description of the Related Art

In recent years, an improvement in performance of a thin film magnetic head is demanded in accordance with an increase in surface recording density of a hard disk drive. As a thin film magnetic head, a composite thin film magnetic head in which a recording head having an inductive-type magnetic transducer for writing and a reproducing head having a magnetoresistive (hereinbelow, referred to as MR) element for reading are stacked is widely used.

In order to improve the recording density in the performances of the recording head, it is necessary to increase track density of a magnetic recording medium. For this purpose, it is necessary to realize a recording head of a narrow track structure in which the width on the air bearing surface of each of a bottom pole and a top pole formed while sandwiching a write gap is reduced to the order of a few microns to submicrons. In order to achieve this, semiconductor processing techniques are used.

Referring to FIGS. 31 and 36, as an example of a method of manufacturing a conventional thin film magnetic head, a method of manufacturing a composite thin film magnetic head will be described.

According to the manufacturing method, first, as shown in FIG. 31, an insulating layer 102 made of, for example, aluminium oxide ($Al_2O_3$; hereinbelow, simply called "alumina") is deposited in a thickness of about 5.0 to 10.0 μm on a substrate 101 made of altic ($Al_2O_3$.TiC) or the like. Subsequently, a bottom shield layer 103 for a reproducing head is formed on the insulating layer 102. For example, alumina layer is then sputter-deposited in a thickness of 100 to 200 nm on the bottom shield layer 103 to form a shield gap film 104. An MR film 105 for constructing an MR device for reproducing is deposited in a thickness of tens nm on the shield gap film 104 and is patterned in a desired shape by high-precision photolithography. Then lead layers (not shown) as lead electrode layers, which are electrically connected to the MR film 105, are formed on both sides of the MR film 105. After that, a shield gap film 106 is formed on the lead layers, the shield gap film 104, and the MR film 105, and the MR film 105 is buried in the shield gap films 104 and 106. A top shield-cum-bottom pole (hereinbelow, referred to as a bottom pole) 107 made of a magnetic material such as nickel iron alloy (NiFe; hereinbelow, also simply called "Permalloy (trade name)") used for both of the reproducing head and the recording head is formed on the shield gap film 106.

As shown in FIG. 32, on the bottom pole 107, a write gap layer 108 made of an insulating material such as alumina is formed. Further, a photoresist film 109 is formed in a predetermined pattern on the write gap layer 108 by high-precision photolithography. On the photoresist film 109, a thin film coil 110 for an inductive-type recording head made of, for example, copper (Cu) is formed by plating or the like. A photoresist film 111 is formed in a predetermined pattern by high-precision photolithography so as to cover the photoresist film 109 and the thin film coil 110. In order to insulate the winding portions of the thin film coil 110 from each other, a heat treatment is conducted at, for example, 250 degrees on the photoresist film 111.

As shown in FIG. 33, in a position rearward of the thin film coil 110 (the right side in FIG. 33), an opening 108a is formed by partially etching the write gap layer 108 in order to form a magnetic path, thereby exposing part of the bottom pole 107. A top yoke-cum-top pole (hereinbelow, called top pole) 112 made of a magnetic material having high saturated magnetic flux density such as Permalloy is selectively formed so as to cover the exposed face of the bottom pole 107, the photoresist film 111 and the write gap layer 108.

As a method of forming the top pole 112, for example, as disclosed in Japanese Unexamined Patent Application No. Hei 7-262519, a frame plating is used. When the top pole 112 is formed by using the frame plating, first, on the whole coil portion (hereinbelow, called an "apex portion") projected like a mountain covered with the photoresist film 111, a thin electrode film made of, for example, Permalloy is deposited by sputtering or the like. A photoresist is then applied on the electrode film, thereby forming the photoresist film. The photoresist film is patterned by a photolithography to form a frame (outer frame) for a plating. Then the electrode film formed before is used as a seed layer and a plating film made of Permalloy is grown by plating, thereby forming the top pole 112.

The top pole 112 has, for example, a shape in plane as shown in FIG. 36 which will be described hereinlater and includes a yoke part 112a and a pole tip part 112b. The top pole 112 is in contact with and magnetically coupled to the bottom pole 107 in the opening 108a. Subsequently, by using part (pole tip part 112b) of the top pole 112 as a mask, both the write gap layer 108 and bottom pole 107 are selectively etched about 0.5 μm by ion milling (refer to FIG. 35) and, after that, an overcoat layer 113 made of, for example, alumina is formed on the top pole 112. Finally, by machining and polishing, the track surface, that is, an air bearing surface 120 of the recording head and reproducing head is formed, thereby completing a thin film magnetic head.

FIGS. 34 to 36 show the structure of the thin film magnetic head in a completed state. FIG. 34 is a cross section of the thin film magnetic head in the direction perpendicular to the air bearing surface 120. FIG. 35 is an enlarged cross section in the direction parallel to the air bearing surface 120 of the pole part. FIG. 36 is a plan view of the structure. FIG. 33 is a cross section taken along line XXXIII—XXXIII of FIG. 36. In FIGS. 34 to 36, the overcoat layer 113 and the like are omitted. In FIG. 36, with respect to the thin film coil 110 and the photoresist film 111, only their outlines are shown.

In FIGS. 34 and 36, "TH" denotes the throat height and "MRH" indicates the MR height. The "throat height (TH)" is one of factors which determine the performance of the recording head and is length from the position of the edge on the side closest to the air bearing surface 120 of the insulating layer (photoresist film 111) for electrically isolating the thin film coil 110 from the other conductive portions, that is, from the throat height zero position (THO) to the air bearing surface 120. In order to improve the performance of the recording head, it is necessary to optimize the throat height (TH). The throat height (TH) is controlled by a polishing amount at the time of forming the air bearing surface 120. The "MR height (MRH)" denotes length from the position of the edge on the side furthest from the air bearing surface 120 of the MR film 105, that is, the MR height zero position (MRH0) to the position of the air bearing surface 120. The MR height (MRH) is also controlled by the polishing amount at the time of forming the air bearing surface 120.

Besides the throat height (TH) and the MR height (MRH), another factor which determines the performance of the thin film magnetic head is an apex angle (θ) shown in FIG. 34. The apex angle θ is an average inclination angle of an inclined face close to the air bearing surface 120 of the photoresist film 111.

As shown in FIG. 35, a structure such that part of the write gap layer 108 and part of the bottom pole 107 are etched in a self aligned manner to the pole tip part 112b of the top pole 112 is called a trim structure. According to the trim structure, an increase in the effective track width due to expansion of the magnetic flux which occurs at the time of writing data to a narrow track can be prevented. "P2W" in the drawing indicates the width of the portion having the trim structure (hereinbelow, simply called "pole part 500"), that is, the pole width (hereinbelow, also called "track width"). The processing dimension of the pole width P2W depends on the width of a portion corresponding to the pole part 500 in a mask (photoresist film pattern in the above case) used at the time of performing an etching process to form the trim structure. "P2L" in the drawing denotes the thickness of the pole tip part 112b as part of the pole part 500, that is, the pole length. As shown in FIG. 35, lead layers 121 as lead electrode layer electrically connected to the MR film 105 are provided on both sides of the MR film 105. In FIGS. 31 to 34, the lead layer 121 is omitted.

As shown in FIG. 36, the top pole 112 has the yoke part 112a, which occupies a major part of the top pole 112, and the pole tip part 112b having an almost constant width as the pole width P2W. In the connecting portion between the yoke part 112a and the pole tip part 112b, the outer edge of the yoke part 112a forms an angle α to a plane parallel to the air bearing surface 120. In the connecting portion, the outer edge of the pole tip part 112b and a plane parallel to the air bearing surface 120 form an angle β. For example, α is 45 degrees and β is 90 degrees. As described above, the pole tip part 112b is a part serving as a mask used to form the trim structure of the pole part 500. As understood from FIGS. 34 and 36, the pole tip part 112b extends on the flat write gap layer 108 and the yoke part 112a extends on the apex portion.

Detailed structural characteristics of the top pole are described in, for example, Japanese Unexamined Patent Application No. Hei 8-249614.

In the conventional thin film magnetic head having the structure as shown in FIG. 33, the magnetic flux generated by the thin film coil 110 at the time of recording information propagates through the top pole 112 from the yoke part 112a toward the pole tip part 112b and finally reaches the tip of the pole tip part 112b. The magnetic flux reached the pole tip part 112b generates a signal magnetic field to the outside. By the signal magnetic field, information is recorded onto a recording medium (not shown).

In order to assure the excellent overwrite characteristics of the thin film magnetic head, generally, it is necessary to smoothly and sufficiently supply the magnetic flux to the pole tip part 112b of the top pole 112 to sufficiently generate the signal magnetic field.

In the conventional thin film magnetic head shown in FIG. 33, however, only the thin write gap layer 108 is provided between the pole tip part 112b of the top pole 112 and the bottom pole 107. Part of the magnetic flux flowed from the yoke part 112a toward the pole tip part 112b does not therefore reach the tip of the pole tip part 112b but passes through the write gap layer 108 and propagates to the bottom pole 107. In the following, the propagation of the magnetic flux from the top pole 112 to the bottom pole 107 via the write gap layer 108 will be called "leakage of magnetic flux". Such a tendency is conspicuous in a region 112S defined between a region formed on the flat write gap layer 108 in the top pole 112 and a region formed on the apex because a downward flow of the magnetic flux in the top pole 112 occurs in the region 112S extending in the thickness direction (longitudinal direction in the drawing).

The "leakage of the magnetic flux" induces inconveniences as described below.

1) Due to the leakage of the magnetic flux from the top pole 112 to the bottom pole 107, the absolute volume of the magnetic flux propagating through the top pole 112 from the yoke part 112a to the pole tip part 112b decreases. In such a case, the magnetic flux generated by the thin film coil 110 cannot be sufficiently supplied to the tip of the pole tip part 112b. Consequently, the overwrite characteristic of the thin film magnetic head deteriorates severely.

2) Local concentration of the magnetic flux on the bottom pole 107 due to the leakage of the magnetic flux exerts an adverse influence on the reading operation of the thin film magnetic head. For example, when the magnetic flux concentrates on the bottom pole 107 more than necessary and part of the magnetic flux passes through the bottom pole 107 and reaches the MR film 105, the magnetic flux reached the MR film 105 acts as magnetic noises at the time of the reading operation of the reproducing head. Due to this, the normal reading operation of the thin film magnetic head is disturbed.

SUMMARY OF THE INVENTION

The invention has been achieved in consideration of the problems. An object is to provide a thin film magnetic head capable of obtaining a sufficient overwrite characteristic by suppressing "leakage of magnetic flux" in a propagation process of magnetic flux and a method of manufacturing the same.

According to the invention, there is provided a thin film magnetic head comprising: a first magnetic layer having a magnetic pole and a second magnetic layer having a magnetic pole, which are magnetically coupled to each other, the magnetic poles facing each other with a gap layer having a flat surface region in between in part of a side of a recording-medium-facing surface facing a recording medium, and the first magnetic layer including a first magnetic portion having a constant width portion which extends from the recording medium facing surface in a length direction so as to be apart from the recording medium facing surface and which specifies a recording track width of the recording medium; a thin film coil part disposed between the two magnetic layers sandwiching an insulating layer; and a first non-magnetic pattern which is embedded in a recess formed in part on the side in contact with the gap layer, of the second magnetic layer, and which serves as part of the insulating layer, the position of the front end of the first non-magnetic pattern specifying the position of the front end of the insulating layer, wherein the front end of the first non-magnetic pattern is positioned in a region where the constant width portion extends of the region where the first magnetic portion extends.

According to the invention, there is provided a method of manufacturing a thin film magnetic head comprising: a first magnetic layer having a magnetic pole and a second magnetic layer having a magnetic pole, which are magnetically coupled to each other, the magnetic poles facing each other with a gap layer having a flat surface region in between in part of a side of a recording-medium-facing surface facing a recording medium, and the first magnetic layer including a first magnetic portion having a constant width portion which extends from the recording medium facing surface in a length direction so as to be apart from the recording medium facing surface and which specifies a recording track width of the recording medium; and a thin film coil part disposed between the two magnetic layers sandwiching an insulating layer; wherein the method comprises a step of forming a first non-magnetic pattern serving as part of the insulating layer in a recess formed in part on the side in contact with the gap layer, of the second magnetic layer, so that the front end of the first non-magnetic pattern is positioned in a region where the constant width portion extends of the region where the first magnetic portion extends, and specifies the position of the front end of the insulating layer.

In the thin film magnetic head of the invention, the position of the front end of the insulating layer is specified by the position of the front end of the first non-magnetic pattern as part of the insulating layer. In this case, the "position of the front end of the insulating layer" is a position of one of the edges of the insulating layer, which is the closest to the recording medium facing surface. Especially, due to the existence of the first non-magnetic pattern, propagation of the magnetic flux from its upper region to its lower region can be suppressed.

In the thin film magnetic head or in the method of manufacturing the head of the invention, further, a second non-magnetic pattern which serves as part of the insulating layer so as to extend in contact with a side of the gap layer opposite to the side with which the first non-magnetic pattern is in contact may be provided.

In the thin film magnetic head of the invention, the surface near the front end of the second non-magnetic pattern is inclined with respect to the surface of the gap layer.

In the thin film magnetic head of the invention, the position of the front end of the second non-magnetic pattern is rearward in the length direction of the position of the front end of the first non-magnetic pattern, and the first magnetic portion may extend from a flat region of the gap layer to the inclined face of the second non-magnetic pattern.

In the method of manufacturing the thin film magnetic head of the invention, the second non-magnetic pattern may be formed so that the front end of the second non-magnetic pattern is positioned rearward of the front end of the first non-magnetic pattern along the length direction.

In the thin film magnetic head or the method of manufacturing the head of the invention, at least the constant width portion in the first magnetic portion may extend on the flat region of the gap layer.

In the thin film magnetic head or the method of manufacturing the head of the invention, the first magnetic portion may further comprise: at least two connection portions disposed so as to be separated from each other in the track width direction; and a coupling portion for magnetically coupling the constant width portion and at least two connection portions. In such a case, part of the insulating layer may be buried in a region surrounded by the coupling portion in the first magnetic portion and at least two connection portions.

According to the method of manufacturing the thin film magnetic head of the invention, in the case where the surface near the front end of the second non-magnetic pattern has an inclined face inclined with respect to the surface of the gap layer and at least part of the coupling portion in the first magnetic portion and the connection portion is disposed on the inclined face of the second non-magnetic pattern, the step of forming the first magnetic portion may include: a step of forming a photoresist layer so as to cover at least the flat region in the gap layer and the inclined region in the second non-magnetic pattern; a first exposing step of selectively exposing a first region including a region corresponding to the shape in plane of the constant width portion, in the photoresist layer of the flat region in the gap layer; a second exposing step of selectively exposing a second region corresponding to the shape in plane of at least the coupling portion and the connection portion of the photoresist layer in a region extending from the inclined region of the second non-magnetic pattern to the flat region of the gap layer; a step of forming a photoresist pattern by developing both the first and second regions of the photoresist layer in a lump; and a step of integrally forming the constant width portion, the coupling portion and the connection portion by using the photoresist pattern. In such a case, in the second exposing step, preferably, the first and second regions are partially overlapped with each other.

In the thin film magnetic head or the method of manufacturing the head of the invention, the first magnetic layer may further include: a second magnetic portion which is magnetically coupled to the first magnetic portion so as to be partially overlapped with each other; and a third magnetic portion for magnetically coupling the second magnetic portion to the second magnetic layer.

The method of manufacturing the thin film magnetic head of the invention may further include the steps of: forming the first magnetic portion and, simultaneously, forming the third magnetic portion and a coil connection pattern as part of the thin film coil part on a coil end provided at the end of the thin film coil part; forming a coil covering layer as part of the insulating layer so as to cover at least the first magnetic portion, the third magnetic portion and the coil connection pattern; planarizing the surface of the coil covering layer by polishing until at least the first magnetic portion, the third magnetic portion and the coil connection pattern are exposed; and forming the second magnetic portion so as to be magnetically coupled with the exposed faces of both the first and third magnetic portions on the surface planarized by the polishing and, simultaneously, forming a conductive layer pattern so as to be electrically connected to the exposed face of the coil connection pattern.

In the thin film magnetic head or the method of manufacturing the head of the invention, at least one of the first and second magnetic layers may be made of a material containing either nickel iron alloy or iron nitride, or a material containing an amorphous alloy. It is preferable to use either cobalt iron alloy or zirconium cobalt iron alloy as the amorphous alloy.

Other and further objects, features and advantages of the invention will appear more fully from the following description.

BRIEF DESCRIPTION OF THE DRAWINGS

FIGS. 2A and 2B are cross sections for explaining a process subsequent to FIGS. 1A and 1B, respectively.

FIGS. 4A and 4B are cross sections for explaining a process subsequent to FIGS. 3A and 3B, respectively.

FIGS. 5A and 5B are cross sections for explaining a process subsequent to FIGS. 4A and 4B, respectively.

FIGS. 20A and 20B are cross sections showing further another modification of the thin film magnetic head according to the first embodiment of the invention.

FIGS. 21A and 21B are cross sections for explaining a process in a method of manufacturing a thin film magnetic head according to a second embodiment of the invention.

FIGS. 29A, 29B, 29C and 29D are plan views for explaining the process of forming the top pole tip, in the method of manufacturing the thin film magnetic head according to the second embodiment of the invention.

DETAILED DESCRIPTION OF THE PREFERRED EMBODIMENTS

Figures 1A, 1B:
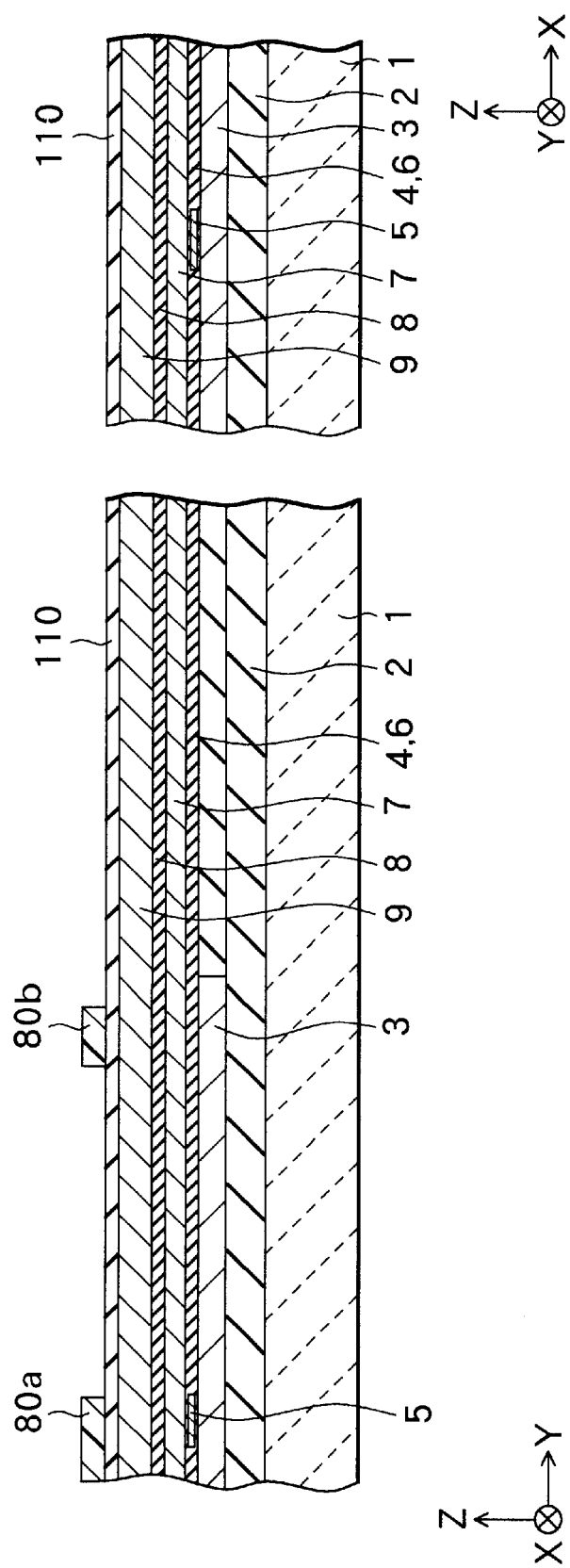
FIGS. 1A and 1B are cross sections for explaining a process in a method of manufacturing a thin film magnetic head according to a first embodiment of the invention.

Embodiments of the invention will be described in detail hereinbelow by referring to the drawings.

[First Embodiment]

<Method of Manufacturing Thin Film Magnetic Head>

Referring to FIGS. 1A and 1B to FIGS. 9A and 9B, and FIGS. 10 to 12, an example of a method of manufacturing a composite thin film magnetic head as a method of manufacturing a thin film magnetic head according to a first embodiment of the invention will be described.

Figures 8A, 8B:
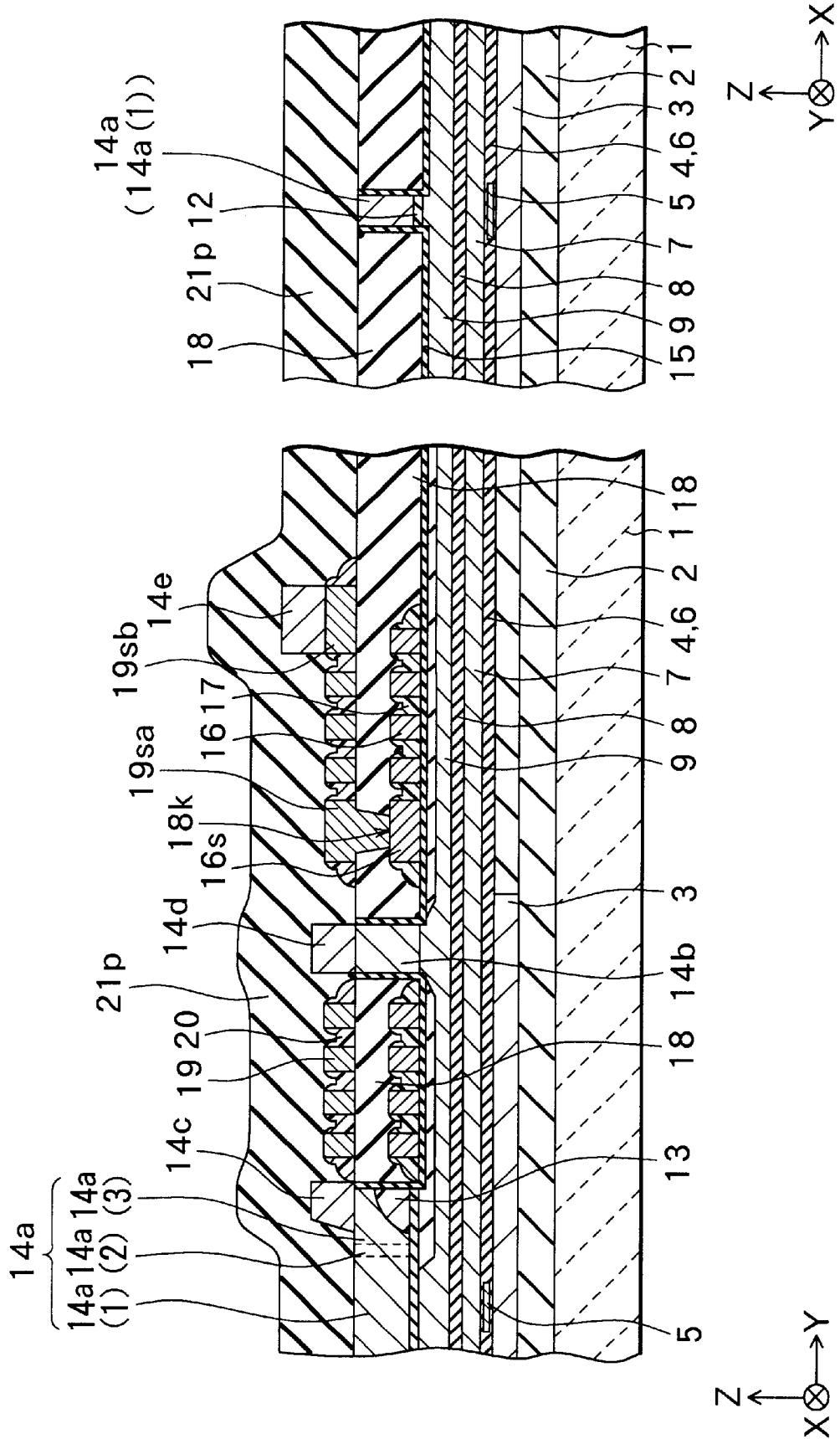
FIGS. 8A and 8B are cross sections for explaining a process subsequent to FIGS. 7A and 7B, respectively.
Figures 9A, 9B:
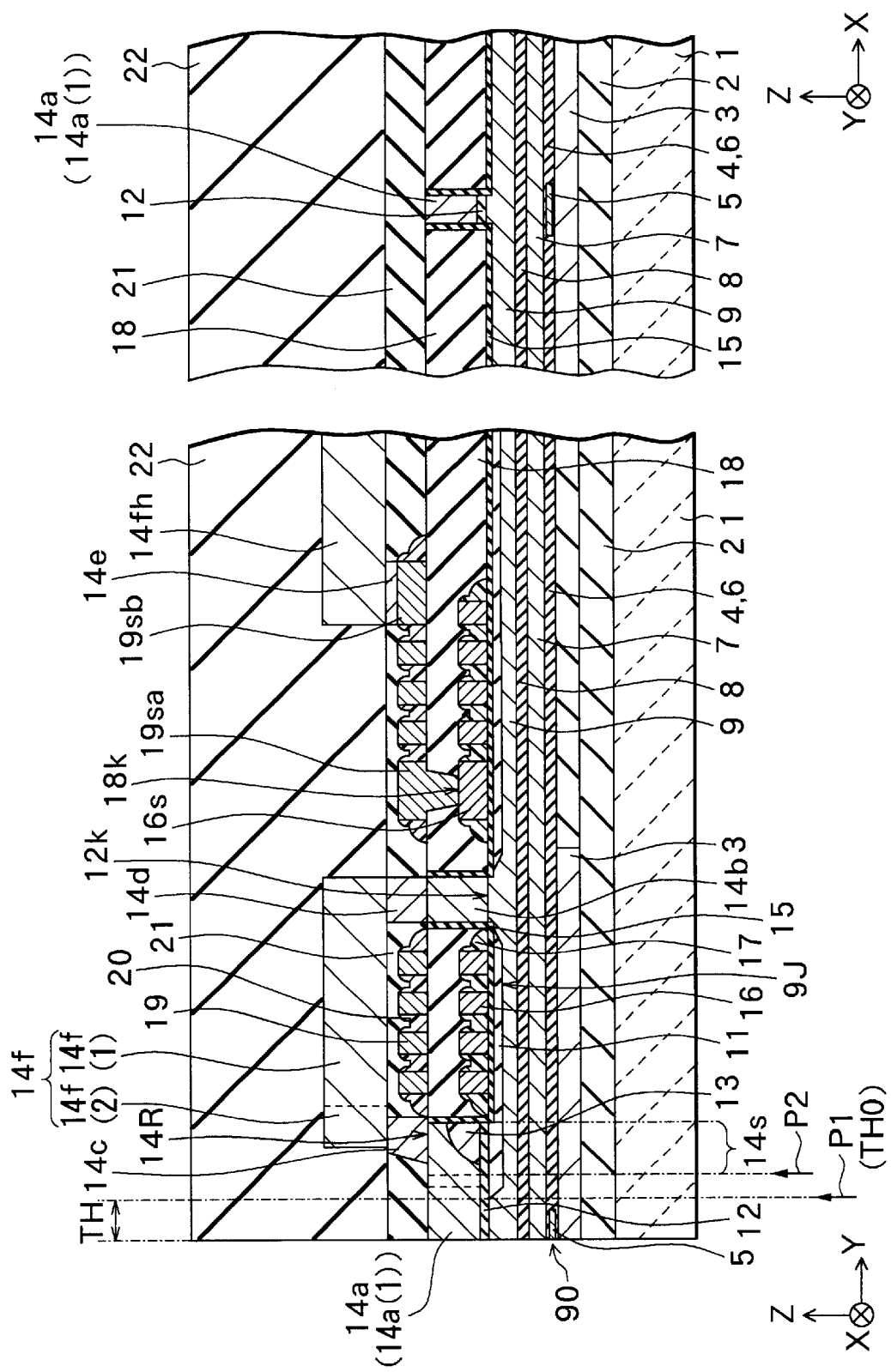
FIGS. 9A and 9B are cross sections for explaining a process subsequent to FIGS. 8A and 8B, respectively.
Figure 10:
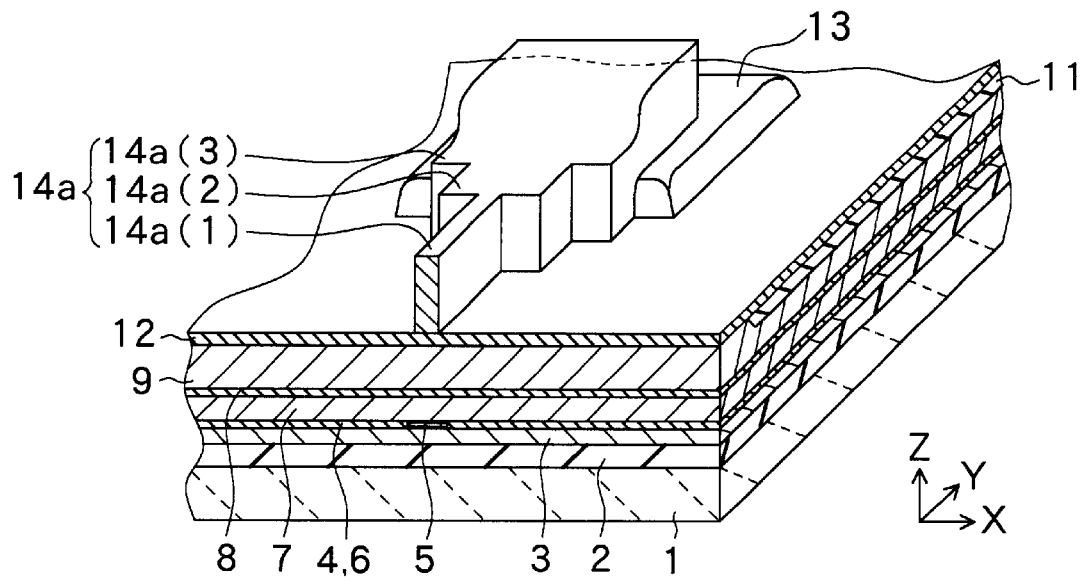
FIG. 10 is a perspective view corresponding to the cross sections shown in FIGS. 4A and 4B.
Figure 11:
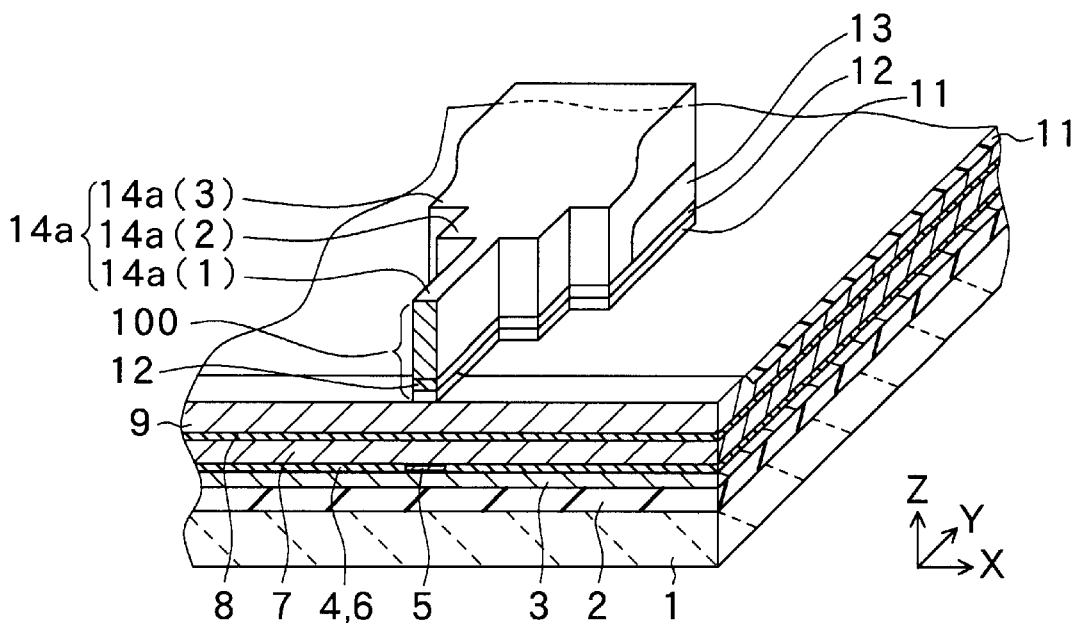
FIG. 11 is a perspective view corresponding to the cross sections shown in FIGS. 5A and 5B.
Figure 12:
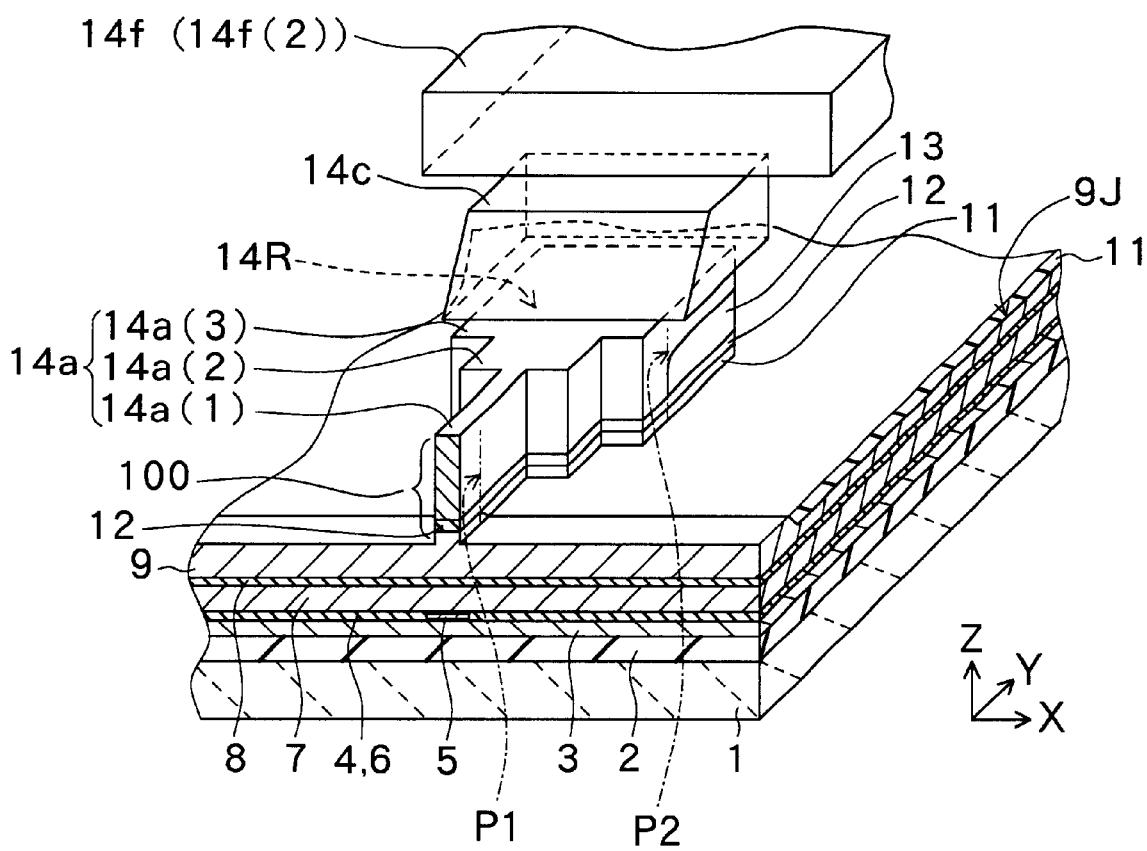
FIG. 12 is a perspective view corresponding to the cross sections shown in FIGS. 9A and 9B.

FIGS. 1A to 9A are cross sections each of which is perpendicular to the air bearing surface and FIGS. 1B to 9B are cross sections each of which is parallel to the air bearing surface of the pole part. FIGS. 10 and 12 are perspective views corresponding to main manufacturing processes. FIG. 10 corresponds to a state shown in FIGS. 4A and 4B. FIG. 11 corresponds to a state shown in FIGS. 5A and 5B. FIG. 12 corresponds to a state shown in FIGS. 9A and 9B. In FIG. 11, an insulating film 15 and the like shown in FIGS. 5A and 5B are omitted. In FIG. 12, insulating films 15, 17, 18, 20 and 21, thin film coils 16 and 19, an overcoat layer 22, and the like shown in FIGS. 9A and 9B are omitted.

In the following description, the X axis direction in each of FIGS. 1A and 1B to FIGS. 9A and 9B and FIGS. 10 to 12 is described as "width direction (or lateral direction", the Y axis direction is described as "lengthwise direction", and the Z axis direction is described as "thickness direction (or longitudinal direction)". The side in the Y axis direction, which is close to an air bearing surface 90 (or a side which becomes the air bearing surface 90 in a following process) is described as "front side (or forward)" and the opposite side is described as "rear side (or rearward)".

In the manufacturing method according to the embodiment, first, as shown in FIGS. 1A and 1B, an insulating layer 2 made of, for example, alumina is deposited in a thickness of about 3.0 to 5.0 μm on a substrate 1 made of, for example, altic ($Al_2O_3$.TiC). Then, a bottom shield layer 3 for a reproducing head is formed by selectively depositing, for example, Permalloy (Ni: 80 percent by weight and Fe: 20 percent by weight) in a thickness of about 3.0 μm on the insulating layer 2 by using photolithography and plating. An insulating film made of alumina or the like is deposited in a thickness of about 4.0 to 5.0 μm so as to cover the entire surface of the layer structure as mentioned above and the surface of the insulating film is polished by, for example, CMP (Chemical Mechanical Polishing) until the bottom shield layer 3 is exposed, thereby planarizing the entire surface of the layer structure as mentioned above.

As shown in FIGS. 1A and 1B, a shield gap film 4 made of alumina or the like is deposited in a thickness of about 100 to 200 nm on the bottom shield layer 3 by, for example, sputtering. Subsequently, an MR film 5 for constructing an MR device as the main part of the reproducing head is formed on the shield gap film 4 in a desired shape by high-precision photolithography. The lead layers (not shown) as lead electrode layers to be electrically connected to the MR film 5 are formed on both sides of the MR film 5 and, after that, a shield gap film 6 is formed on the lead layer, the shield gap film 4, and the MR film 5, thereby burying the MR film 5 in the shield gap films 4 and 6. As shown in FIGS. 1A and 1B, a top shield layer 7 is selectively deposited in a thickness of about 1.0 to 1.5 $\mu$m on the shield gap film 6. The material, the forming method and the like of the top shield layer 7 are similar to those of the bottom shield layer 3.

As illustrated in FIGS. 1A and 1B, on the top shield layer 7, an insulating film 8 made of alumina or the like is deposited in a thickness of about 0.15 to 0.2 $\mu$m by, for example, sputtering. On the insulating film 8, a bottom pole 9 made of, for example, a magnetic material having high saturated flux density such as iron nitride (FeN) is selectively deposited in a thickness of about 2.0 to 2.5 $\mu$m by a procedure as described below. Specifically, first, on the insulating film 8, for example, an iron nitride layer is formed by sputtering. Subsequently, by using a mask in a predetermined shape made of a predetermined material, the iron nitride layer is etched and patterned by, for instance, ion milling, thereby selectively forming the bottom pole 9. As materials for forming the bottom pole 9, besides iron nitride, a magnetic material having high saturated flux density similar to iron nitride, such as Permalloy (Ni: 45 percent by weight and Fe: 55 percent by weight) or an amorphous alloy may be used. As an amorphous alloy, cobalt iron alloy (CoFe), zirconium cobalt iron (ZrCoFe) or the like can be used. The bottom pole 9 corresponds to an example of "second magnetic layer" in the invention.

As shown in FIGS. 1A and 1B, an insulating film made of alumina or the like is deposited in a thickness of about 4.0 to 5.0 $\mu$m so as to cover the entire surface of the layer structure as mentioned above. After that, the surface of the insulating film is polished by, for example, CMP until the bottom pole 9 is exposed, thereby planarizing the entire surface of the layer structure as mentioned above.

As shown in FIGS. 1A and 1B, on the bottom pole 9, a mask precursor layer 110 made of alumina or the like is deposited by, for example, sputtering in a thickness of about 0.3 to 0.5 $\mu$m. The mask precursor layer 110 is patterned by etching in a following process, thereby becoming pattern masks 10a and 10b (refer to FIGS. 2A and 2B) used for etching the bottom pole 9. Subsequently, a photoresist film (not shown) or the like is deposited on the mask precursor layer 110 and patterned by photolithography. By the process, masks 80a and 80b made by the photoresist film are selectively formed in predetermined positions on the mask precursor layer 110. The "predetermined position" in the case of forming the masks 80a and 80b is a position in which the rearward edge of the mask 80a (hereinbelow, also simply called "rear end") almost coincides with the rear end of the MR film 5, and a position in which the region of forming the mask 80b corresponds to a region of forming a magnetic path connection portion 14b formed in a following process.

With the masks 80a and 80b, the mask precursor layer 110 is etched and patterned by, for example, reactive ion etching (hereinbelow, simply called "RIE"). By the operation, as shown in FIGS. 2A and 2B, the pattern masks 10a and 10b made of alumina are selectively formed. By using the RIE as an etching method for patterning the mask precursor layer 110, the etching process can be performed in shorter time as compared with the case of using ion million. Particularly, in the case of performing the etching process by the RIE, it is suitable to use an etching gas containing at least one of chlorine ($Cl_2$) and boron dichloride ($BCl_2$). When a chemical reaction of the etching process is promoted in such a gas atmosphere, the etching process can be performed in shorter time. The masks 80a and 80b themselves are also etched by the etching process (RIE) and the film thickness of the masks 80a and 80b is reduced. The masks 80a and 80b may be either removed completely (refer to FIGS. 2A and 2B) or partially by the etching process.

As shown in FIGS. 2A and 2B, by using the pattern masks 10a and 10b, the bottom pole 9 is selectively etched about 0.3 to 0.8 $\mu$m by, for example, ion milling. By the etching process, an upper part of the bottom pole 9 is selectively removed to form a recess 9J. In the case of performing the etching process, for example, the surface of the bottom pole 9 is irradiated with ion beams diagonally from above to make the inner wall of the recess inclined. The pattern masks 10a and 10b themselves are also etched by the etching process (ion milling) and the film thickness of the pattern masks 10a and 10b is reduced. The masks 10a and 10b may be removed either completely (refer to FIGS. 2A and 2B) or partially by the etching process.

As shown in FIGS. 2A and 2B, for example, an alumina layer 11p is formed in a thickness of about 3.0 to 4.0 $\mu$m by, for example, sputtering so as to cover the whole surface of the uneven region created by the pattern masks 10a and 10b and the recess 9J.

Figures 3A, 3B:
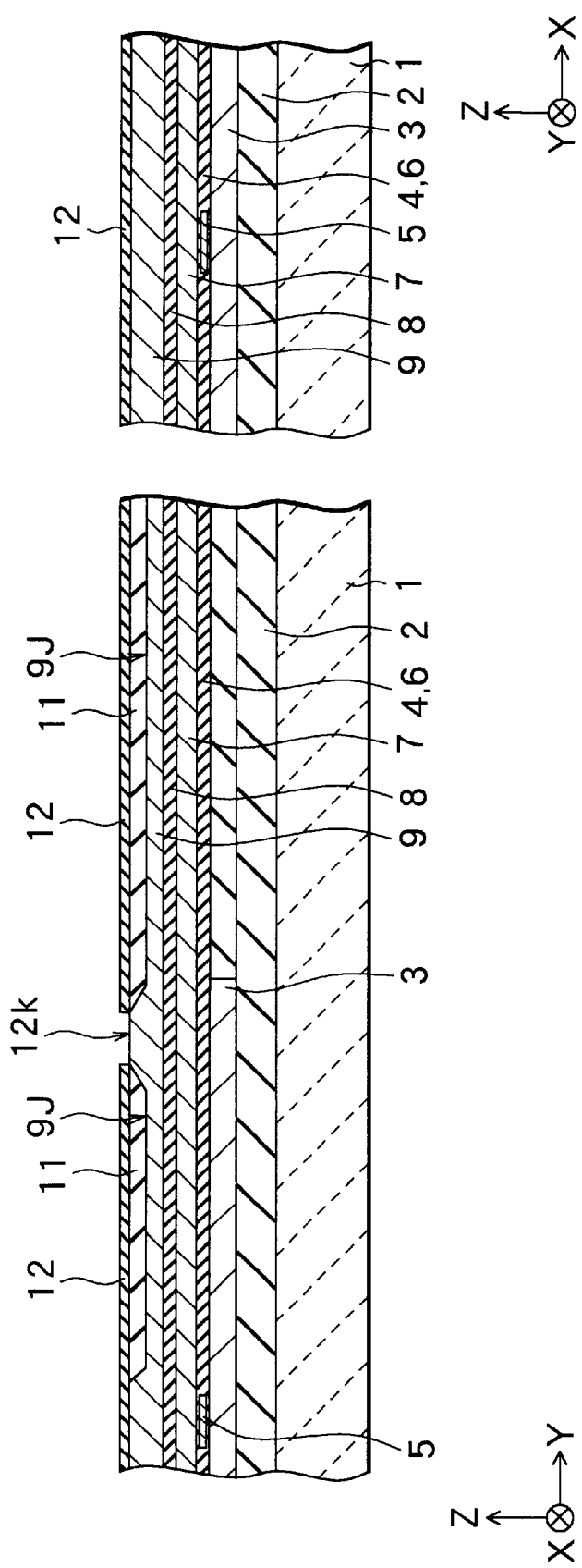
FIGS. 3A and 3B are cross sections for explaining a process subsequent to FIGS. 2A and 2B, respectively.
Figure 17:
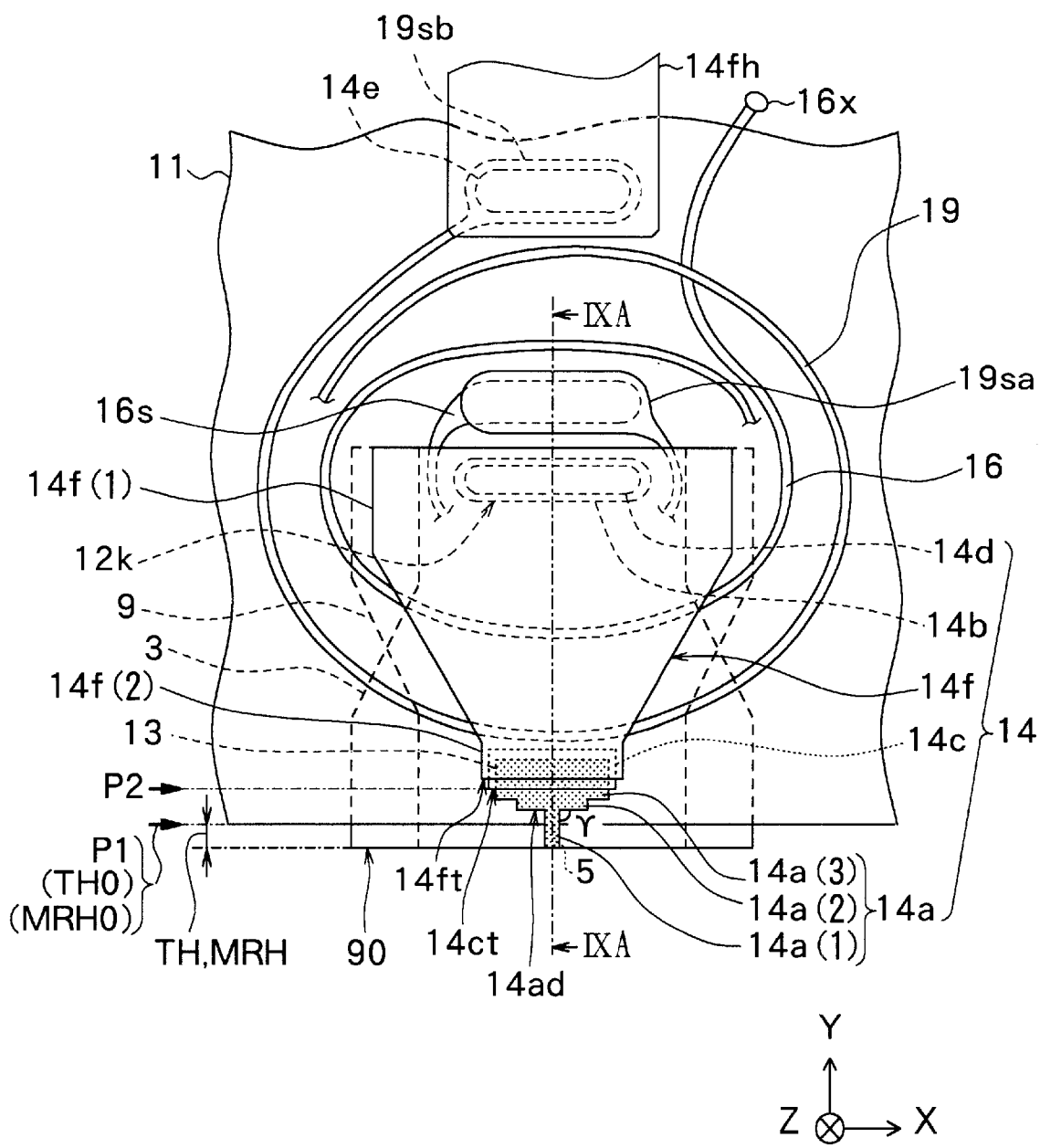
FIG. 17 is a plan view showing the structure of the thin film magnetic head according to the first embodiment of the invention.

The whole surface of the alumina layer 11p is polished by, for example, the CMP to thereby form an insulating film pattern 11 made by the alumina buried in the recess 9J as shown in FIGS. 3A and 3B. The polishing process is performed until the bottom pole 9 is exposed except the recess region. The region in which the insulating film pattern 11 is disposed is, for example, as shown in FIG. 17 which will be described hereinlater, a region including regions of a top pole tip 14a, thin film coils 16 and 19, and the like which are formed in following processes. The position of the front end edge (hereinbelow, simply referred to as "front end") of the insulating film pattern 11 almost coincides with, for example, the position of the rear end of the MR film 5. The position of the front end of the insulating film pattern 11 is a position as a reference of determining the throat height (TH), that is, the throat height zero position (THO). The insulating film pattern 11 corresponds to an example of "first non-magnetic pattern" in the invention. Subsequently, as shown in FIGS. 3A and 3B, on the surface of the insulating film pattern 11 and the bottom pole 9, which is planarized by polishing, a write gap layer 12 made of alumina or the like is formed in a thickness of about 0.15 to 0.2 $\mu$m by, for example, sputtering. The entire surface of the write gap layer 12 is flat. At the time of forming the write gap layer 12, a region (exposed face on the rear side of the bottom pole 9) in which the magnetic path connection portion 14b will be formed in a following process is not covered. The region serves as an opening 12k for connecting the bottom pole 9 to a top pole 14, which will be formed in a following process. The write gap layer 12 corresponds to an example of "gap layer" in the invention.

In a predetermined position on the flat write gap layer 12 in the front side region of the forming region of the opening 12k, a photoresist film of, for example, an organic material is selectively formed in a thickness in the order of 1.0 $\mu$m by a high-precision photolithography process. A heat treatment is conducted on the photoresist film at a temperature of about 200 to 250 degrees. By the treatment, the region around the edge of the photoresist film is rounded and inclined downward to the edge. As shown in FIGS. 4A, 4B and 10, an insulating film pattern 13 made by the photoresist film is formed. The "predetermined position" at the time of forming the insulating film pattern 13 is, for example, a position in which the front end of the insulating film pattern 13 is deviated to the rear side of the position of the front end of the insulating film pattern 11. The distance (length of deviation) from the position of the front end of the insulating film pattern 11 to the position of the front end of the insulating film pattern 13 is suitably, for example, about 0.4 to 0.8 μm. By disposing the insulating film pattern 13 in such a position, the propagation of the magnetic flux (leakage of the magnetic flux) from a rear end part 14a(3) (refer to FIG. 4A) of the top pole tip 14a which will be formed in a following process on the inclined face on the front side of the insulating film pattern 13 to the bottom pole 9 can be suppressed, and the flow of the magnetic flux in the rear end part 14a(3) can be smoothed. The insulating film pattern 13 corresponds to an example of "second non-magnetic pattern" in the invention.

As shown in FIGS. 4A, 4B and 10, the top pole tip 14a as part of the top pole 14 is selectively formed in a thickness of about 2.5 to 3.5 Jim by, for ex ample, frame plating in the region from the inclined region on the front side of the insulating film pattern 13 to the flat recording gap layer 12 in front of the insulating film pattern 13. At the time of forming the top pole tip 14a, simultaneously, the magnetic path connection portion 14b as part of the top pole 14 is formed in the opening 12k. The top pole tip 14a has, for example, a shape in plane as shown in FIG. 17. The top pole tip 14a includes, in accordance with the order from the side which becomes the air bearing surface 90 in a following process (the left side in the drawing), a front end part 14a(1) having a constant width which specifies a recording track width on a recording medium (not shown), an intermediate part 14a(2) wider than the front end part 14a(1), and the rear end part 14a(3) wider than the intermediate part 14a(2). The structural characteristics of the top pole tip 14a will be described hereinlater. The top pole tip 14a corresponds to an example of "first magnetic portion" in the invention and the front end part 14a(1) corresponds to an example of "constant width portion" in the invention.

In the case of forming the top pole tip 14a by frame plating, first, an electrode film (not shown) serving as a seed layer in electrolytic plating is formed in a thickness of about 70 nm by, for example, sputtering. The electrode film is made of, for example, Permalloy (Ni: 45 percent by weight and Fe: 55 percent by weight) having high saturated magnetic flux density. By applying a positive photoresist (hereinbelow, simply referred to as "photoresist") on the electrode film, a photoresist film (not shown) is formed. Subsequently, by using a photo mask (not shown) made of a metal such as chromium having a predetermined pattern in plane, a predetermined region in the photoresist film is selectively exposed. By developing the exposure region in the photoresist film, a frame (outer frame) used at the time of performing plating according to the frame plating method, that is, a photoresist pattern (not shown) is formed. The photoresist pattern comprises an opening having a plane shape corresponding to the shape of the exposure region.

At this time, as will be described hereinlater, the selective exposure of the photoresist film is not performed at once. It is preferable to perform the selective exposure a plurality of times by using a plurality of kinds of photo masks having different openings and, after that, to develop the whole exposure region of the photoresist film in a lump by a single developing process. Particularly, in the embodiment, for example, by sequentially using two kinds of photo masks having different openings for the single photoresist film, the regions in the photoresist film, corresponding to the shapes in plane of the openings of the photo masks are sequentially selectively exposed twice. By developing the exposure regions in the photoresist film in a lump, the photoresist pattern including the opening having the shape in plane corresponding to that of the top pole tip 14a is formed.

After forming the photoresist pattern by the developing process, by using the electrode film formed-in the above process as a seed layer and the photoresist pattern as a mask, the top pole tip 14a made of Permalloy (for example, Ni: 45 percent by weight and Fe: 55 percent by weight) as a magnetic material having high saturated magnetic flux density is formed by the electrolytic plating. After that, the photoresist pattern is removed. The magnetic path connection portion 14b is also formed by using a material and a method similar to those of the case of the top pole tip 14a. As the material of the top pole tip 14a and the magnetic path connection portion 14b, besides the Permalloy (Ni: 45 percent by weight and Fe: 55 percent by weight), iron nitride, amorphous alloy (such as cobalt iron or zirconium cobalt iron), or the like may be used.

As shown in FIGS. 5A, 5B and 11, by using both of the top pole tip 14a and the magnetic path connection portion 14b (which is not shown in FIG. 11) as a mask, the whole surface of the layer structure as mentioned above is etched about 0.3 to 0.4 μm by the RIE or the like. By the etching process, among the write gap layer 12, the bottom pole 9 and the insulating film pattern 11, the region except for the region in which the top pole tip 14a and the magnetic path connection portion 14b are disposed is selectively removed and etched. At this time, part of the rear side of the insulating film pattern 13 is etched and removed. By the etching process, a pole part 100 having the trim structure is formed. The pole part 100 is constructed by the front end part 14a(1) of the top pole tip 14a, part corresponding to the front end part 14a(1) in the bottom pole 9, and part of the write gap layer 12 sandwiched therebetween. Each part has almost the same width. Generally, a processing speed in the case of using the RIE as an etching method is faster than that in the case of using the ion milling. By forming the pole part 100 having the trim structure by using the RIE, the pole part 100 can be therefore formed in shorter time as compared with the case of using the ion milling. Especially, in the case of performing the etching process by the RIE to form the pole part 100, it is suitable to use, for example, an etching gas containing at least one of chlorine and boron dichloride and adjust processing temperature so as to be within the range from 100 to 200 degrees for the following reason. Particularly, by promoting a chemical reaction of the etching process performed on the bottom pole 9 under such conditions, the pole part 100 can be formed in shorter time.

Figures 6A, 6B:
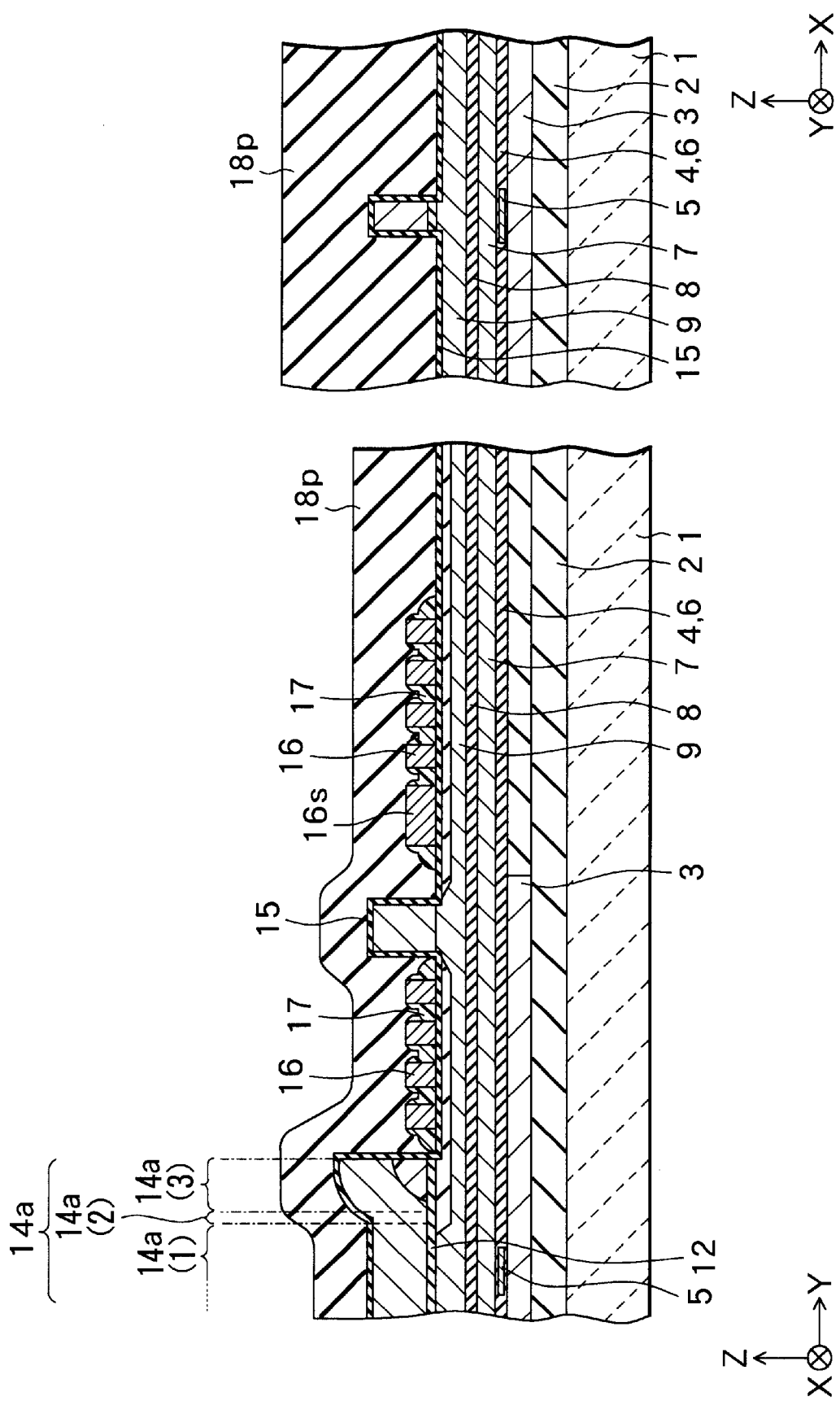
FIGS. 6A and 6B are cross sections for explaining a process subsequent to FIGS. 5A and 5B, respectively.

Then, as shown in FIGS. 6A, 5B and 11, an insulating film 15 made of alumina or the like is deposited on the whole surface of the layer structure as mentioned above in a thickness of about 0.3 to 0.5 μm by, for example, sputtering.

As shown in FIGS. 6A and 6B, a thin film coil 16 of a first layer for an inductive recording head made of copper (Cu) or the like is selectively formed in a thickness of about 1.0 to 1.5 μm by, for example, electrolytic plating on the flat insulating film 15 in the region (except for the region of the magnetic path connection portion 14b) rearward of the region in which the top pole tip 14a is disposed. The thin film coil 16 has, for example, the structure of a spiral shape in plane as shown in FIG. 17 which will be described hereinlater. In FIG. 6A, only one part of the thin film coil 16 is shown. In the case of forming the thin film coil 16, simultaneously, for example, a coil connection portion 16s is formed integrally with the thin film coil 16 on the insulating film 15 at the inner terminating end of the thin film coil 16. The coil connection portion 16s is used to electrically connect the thin film coil 16 to a coil connection portion 19sa (refer to FIG. 8A) which will be formed in a following process.

As shown in FIGS. 6A and 6B, a material which is fluidized when being heated, for example, an organic insulating material such as photoresist is formed in a predetermined pattern in the spacing between turns of the thin film coil 16 (including the coil connection portion 16s) and its peripheral region by a high-precision photolithography process. A heat treatment is conducted on the photoresist at a temperature in the range from, for example, 200 to 250 degrees. By the treatment, the photoresist is fluidized to fill the spacing between turns of the thin film coil 16, thereby forming an insulating film 17 for insulating between turns of the thin film coil 16. In the case of forming the insulating film 17, the insulating film 17 may not cover the top faces of the thin film coil 16 and the coil connection portion 16s (refer to FIG. 6A) or may cover the top faces.

As shown in FIGS. 6A and 6B, for example, an alumina layer 18p is deposited in a thickness of about 3.0 to 4.0 μm by sputtering so as to cover the whole surface of the layer structure as mentioned above, thereby covering the uneven structure region constructed by the top pole tip 14a, the magnetic path connection portion 14b, the thin film coil 16, the coil connection portion 16s, and the like.

The entire surface of the alumina layer 18p is then polished by, for example, the CMP so as to be planarized. By the operation, as shown in FIG. 7, an insulating film 18 that covers the thin film coil 16 and the like is formed. The polishing process in this event is performed until both of the top pole tip 14a and the magnetic path connection portion 14b are exposed. Preferably, the surface of alumina is polished so that the thickness of the polished top pole tip 14a becomes, for example, about 1.5 to 2.5 μm. By using an inorganic insulating material such as alumina to form the insulating film 18, different from the case of using a soft insulating material such as photoresist, the polishing face of a CMP table can be prevented from being clogged and the polished surface can be made more smooth.

Figures 7A, 7B:
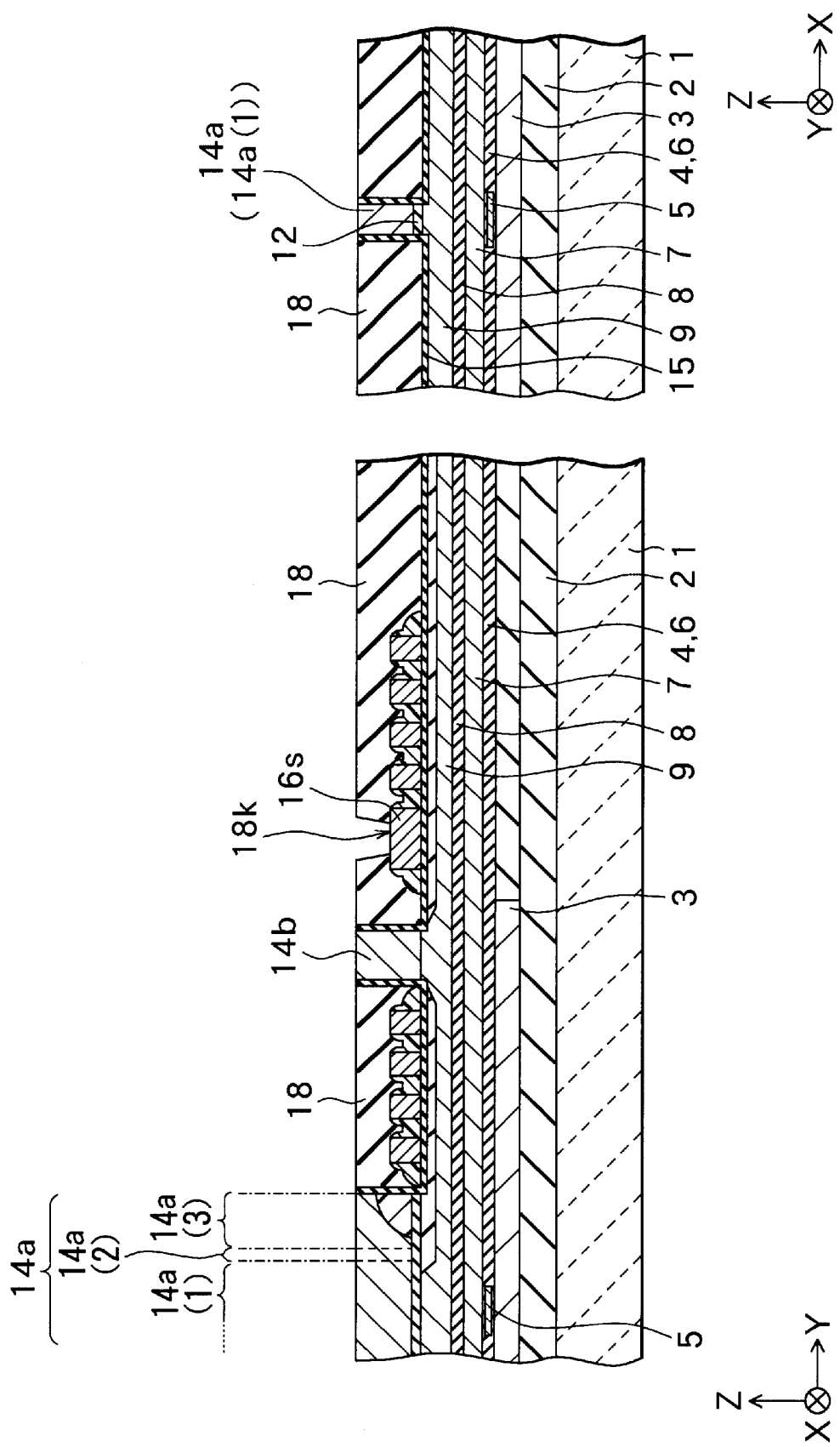
FIGS. 7A and 7B are cross sections for explaining a process subsequent to FIGS. 6A and 6B, respectively.

As shown in FIGS. 7A and 7B, part of the insulating film 18 covering the upper part of the coil connection portion 16s is partially etched and removed by, for example, RIE or ion milling to form an opening 18k for connecting the coil connection portion 16s and the coil connection portion 19sa (refer to FIG. 8A) formed in a following process. Then, as shown in FIGS. 8A and 8B, on the planarized insulating film 18 on the upper part of the thin film coil 16, a second thin film coil 19 made of copper (Cu) or the like is selectively formed in a thickness of about 1.0 to 1.5 μm by electrolytic plating in a manner similar to the case of forming the first thin film coil 16. The thin film coil 19 has a plane structure similar to that of the thin film coil 16. In the case of forming the thin film coil 19, for example, the coil connection portion 19sa is simultaneously formed on the coil connection portion 16s at the terminating end on the inner side and a wiring connection portion 19sb is formed on the insulating film 18 at the terminating end on the outer side. The coil connection portion 19sa and the wiring connection portion 19sb are integrated with the thin film coil 19. The thin film coils 16 and 19 are electrically connected to each other via the coil connection portions 16s and 19sa in the opening 18k. The wiring connection portion 19sb corresponds to an example of "coil end" in the invention.

As shown in FIGS. 8A and 8B, an insulating film 20 is selectively formed in spacing between turns of the thin film coil 19 (including the coil connection portion 19sa and the wiring connection portion 19sb) and its peripheral region by using the material and method similar to those of the case of the insulating film 17. In the case of forming the insulating film 20, the insulating film 20 may not cover the top faces of the thin film coil 19 and the coil connection portion 19sa (refer to FIG. 8A) or may cover the top faces. Since an intermediate connection pattern 14e to be in contact with and electrically connected to the wiring connection portion 19sb is formed by a following process on the wiring connection portion 19sb, preferably, the surface of the wiring connection portion 19sb is not covered with the insulating film 20.

As shown in FIGS. 8A and 8B, on a planarized surface of the upper part of the insulating film 18 to the rear end part 14a(3) of the top pole tip 14a, for example, by using a material and a method similar to those of the case of forming the top pole tip 14a and the magnetic path connection portion 14b, the intermediate connection portion 14c as part of the top pole 14 is selectively formed in a thickness of about 2.0 to 3.0 μm. The intermediate connection portion 14c has, for example, a plane shape as shown in FIG. 17 which will be described hereinlater. The intermediate connection portion 14c is partially overlapped with and in contact with part of the rear end part 14a(3) of the top pole tip 14a. The intermediate connection portion 14c and the part of the rear end part 14a(3) are magnetically coupled to each other.

At the time of forming the intermediate connection portion 14c, simultaneously, a magnetic path connection portion 14d as part of the top pole 14 is formed on the magnetic path connection portion 14b, and the intermediate connection pattern 14e is formed on the wiring connection portion 19sb. At this time, the thin film coil 19 is covered with the insulating film 20, so that the thin film coil 19 is prevented from being damaged by an influence of the etching process for forming the intermediate connection portion 14c and the like. The intermediate connection pattern 14e is used to electrically connect the thin film coils 16 and 19 to a coil connection wiring 14fh (refer to FIG. 9A) formed in a following process. The material and the method for forming the magnetic path connection portion 14d and the intermediate connection pattern 14e are similar to those of the case of the top pole tip 14a and the like. In the case of forming the intermediate connection portion 14c, preferably, for example, the position of the front end of the intermediate connection portion 14c almost coincides with the position of the front end of the insulating film pattern 13. For instance, the front side of the edge of the intermediate connection portion 14c is inclined to the flat face of the underlayer. The intermediate connection pattern 14e corresponds to an example of "coil connection pattern" in the invention. Each of the magnetic path connection portions 14b and 14d corresponds to an example of "third magnetic portion" in the invention. Each of the thin film coils 16 and 19, the coil connection portions 16s and 19sa, the wiring connection portion 19sb and the intermediate connection pattern 14e corresponds to "thin film coil part" in the invention.

As shown in FIGS. 8A and 8B, for example, an alumina layer 21p is deposited in a thickness of about 3.0 to 4.0 μm by sputtering so as to cover the entire surface of the layer structure as mentioned above to cover the uneven region constructed by the intermediate connection portion 14c, the magnetic path connection portion 14b, the intermediate connection portion 14e, the thin film coil 19, and the like.

By polishing the whole surface of the alumina layer 21p by, for example, the CMP so as to be planarized, as shown in FIGS. 9A and 9B, an insulating film 21 that covers the thin film coil 19 and the like is formed. The polishing process at this time is performed until the intermediate connection portion 14c, the magnetic path connection portion 14d and the intermediate connection pattern 14e are exposed. Each of the insulating films 17, 18, 20 and 21 corresponds to an example of "coil covering layer" and each of the insulating film patterns 11 and 13 and the insulating films 17, 18, 20 and 21 corresponds to an example of "insulating layer" in the invention.

As shown in FIGS. 9A and 9B, on the planarized surface of the region from the upper part of the magnetic path connecting part 14d to the upper part of the intermediate connecting part 14c, a top yoke 14f as part of the top pole 14 is selectively formed in a thickness of about 2.0 to 3.0 μm. The top yoke 14f has, for example, a plane shape as shown in FIG. 17 which will be described hereinlater and includes a yoke part 14f(1) extending above the thin film coils 16 and 19 and a connection portion 14f(2) extending so as to partially overlap part of the intermediate connection portion 14c in front of the yoke part 14f(1). The structural characteristics of the top yoke 14f will be described hereinlater. The rear part of the top yoke 14f is magnetically coupled to the bottom pole 9 sandwiching the magnetic path connection portions 14b and 14d via the opening 12k. The front part of the top yoke 14f is also magnetically coupled to the top pole tip 14a sandwiching the intermediate connection portion 14c. By disposing the top yoke 14f on the flat underlayer, the surface of the top yoke 14f also becomes flat.

On formation of the top yoke 14f, the coil connection wiring 14fh is formed on the surface of a region from the intermediate connection pattern 14e to an external circuit (not shown). The coil connection wiring 14fh is used to electrically connect the intermediate connection pattern 14e to the external circuit (not shown). The material and the method for forming the top yoke 14f and the coil connection wiring 14fh are substantially the same as those of the top pole tip 14a and the like. The top yoke 14f is formed so that, for example, its front end is positioned rearward of the position of the front end of the intermediate connection portion 14c, and its position of the rear end almost coincides with the position of the rear end of the magnetic path connection portions 14b and 14d. The stereoscopic structure around the connection portion 14f(2) at this time is as shown in FIG. 12. The top yoke 14c corresponds to an example of "second magnetic portion" in the invention and the coil connection wiring 14fh corresponds to an example of "conductive layer pattern" in the invention. The top pole 14 constructed by the top pole tip 14a, the intermediate connection portion 14c, the magnetic path connection portions 14b and 14d, and the top yoke 14f corresponds to an example of "first magnetic layer" in the invention.

FIGS. 9A and 9B, an overcoat layer 22 made of alumina or the like is formed in a thickness of about 20 to 40 μm by, for example, sputtering so as to cover the whole surface of the layer structure as mentioned above. Finally, an air bearing surface 90 of the recording head and the reproducing head is formed by machining and polishing, thereby completing the thin film magnetic head.

<Characteristic Action and Effect in the Method of Manufacturing the Thin Film Magnetic head>

In the method of manufacturing the thin film magnetic head according to the embodiment, as mentioned above, particularly, by performing the exposure on the same photoresist film a plurality of times by using the plurality of photo masks, the photoresist pattern used to form the top pole tip 14a is formed. By using the photoresist pattern formed in such a method, especially, the front end part 14a(1) of the top pole tip 14a can be formed with high accuracy. First, by referring to FIGS. 13A to 13D and FIGS. 14A and 14B, the method of forming the top pole tip 14a as one of the characteristics of the method of manufacturing the thin film magnetic head according to the embodiment and the action and effects of the forming method will be described in detail. The X, Y and Z axes in the drawings denote in a manner similar to the cases of FIGS. 1A and 1B to FIGS. 9A and 9B and FIGS. 10 to 12.

Figures 13A, 13B:
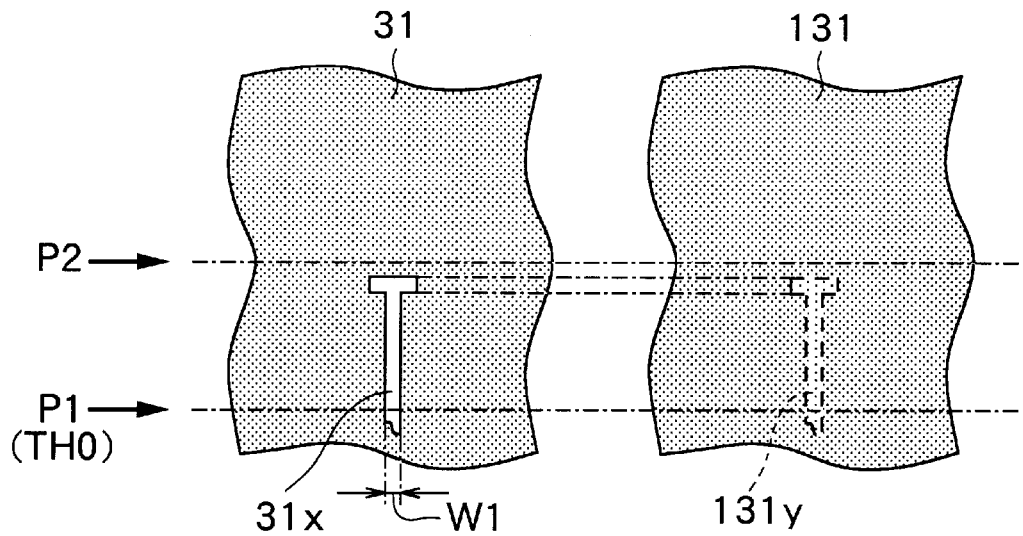
FIGS. 13A, 13B, 13C and 13D are plan views for explaining a process of forming a top pole tip in the method of manufacturing the thin film magnetic head according to the first embodiment of the invention.
Figures 13C, 13D:
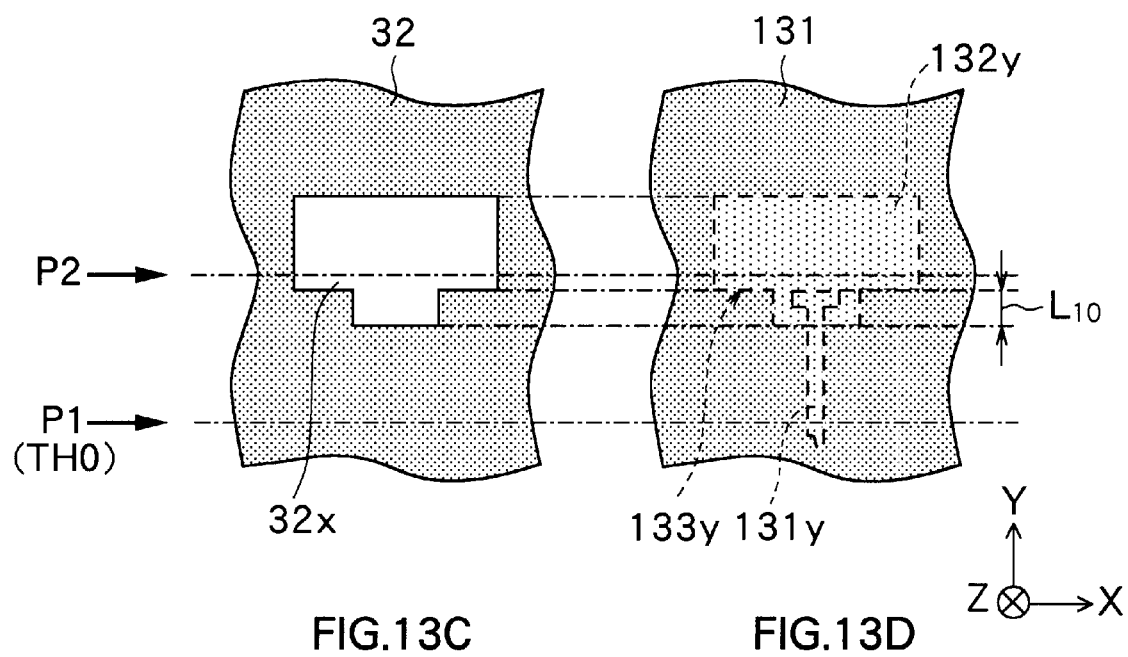
Figures 14A, 14B:
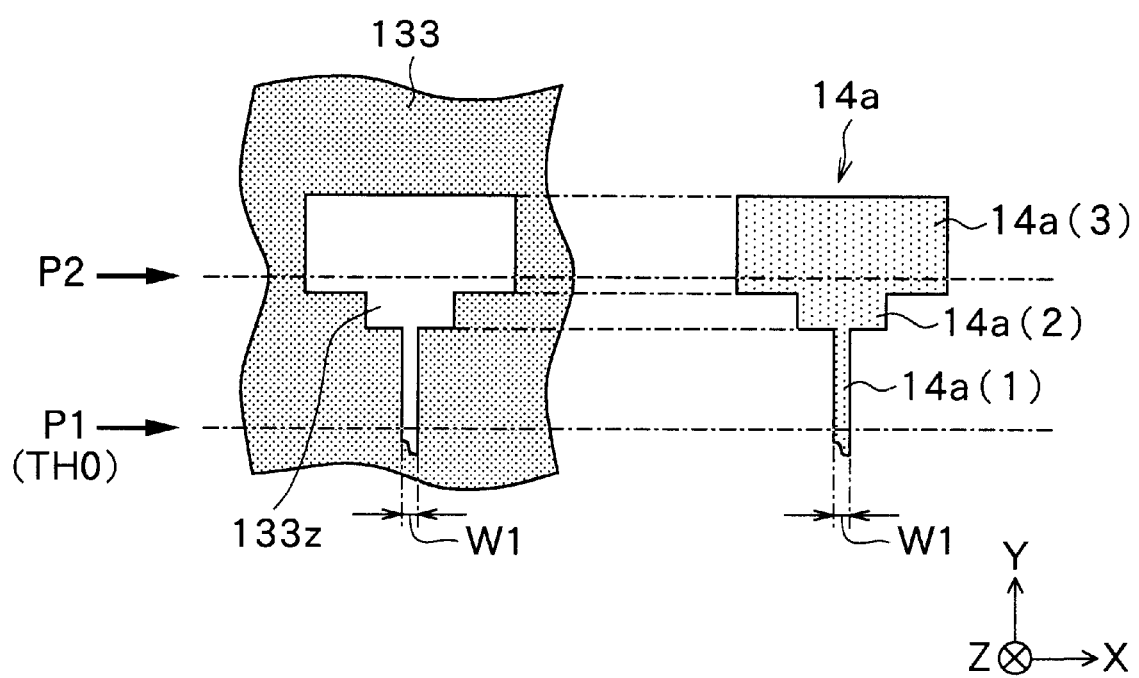
FIGS. 14A and 14B are plan views showing a process subsequent to FIGS. 13A to 13D.

FIG. 13A is a plan view of a first photo mask 31 used in the first exposing process. FIG. 13B shows a plane shape of a region (first exposure region 131y) in a photoresist film 131 exposed by the first exposing process. FIG. 13C is a plan view of a second photo mask 32 used in a second exposing process. FIG. 13D shows a shape in plane of a region (second exposure region 132y) in the photoresist film 131 exposed in the second exposing process. FIG. 14A is a plan view of a photoresist pattern 133 obtained by developing the whole exposure region (synthetic exposure region 133y) in the photoresist film 131 shown in FIG. 13D. FIG. 14B is a plan view of the top pole tip 14a formed by using the photoresist pattern 133.

The first photo mask 31 shown in FIG. 13A includes, for example, an opening 31x having a T-shape in plane. The opening 31x includes: portion of a constant width wider than the plane shape corresponding to the front end part 14a(1) in the top pole tip 14a (refer to FIG. 17); and a wider portion which occupies the rear side. The constant width is similar to a width W1 of the front end part 14a(1) of the top pole tip 14a finally formed. As shown in FIG. 13B, the first photo mask 31 is disposed in a predetermined position on the photoresist film 131 to allow a predetermined region in the photoresist film 131 to be selectively exposed via the opening 31x of the first photo mask 31.

The "predetermined position" on the photoresist film 131 on which the first photo mask 31 is disposed corresponds to the position in which the front end part 14a(1) of the top pole tip 14a is formed in a following process. The first photo mask 31 is placed on the photoresist film 131 so that the rear end of the opening 31x is positioned on the front side with respect to a position P2 (refer to FIG. 9A) of the front end of the insulating film pattern 13. Specifically, the opening 31x is positioned in a flat region formed in the flat write gap layer 12 in the photoresist film 131 so that the whole front end part 14a(1) of the top pole tip 14a is formed in the flat write gap layer 12. In such a state, the first exposing process is performed.

By the first exposing process, the first exposure region 131y is formed in the photoresist film 131. The first exposure region 131y extends rearward more than the region corresponding to the front end part 14a(1) of the top pole tip 14a but its rear end does not reach the position P2. As described above, by performing the first exposing process only in the portion formed in the flat write gap layer 12 in the photoresist film 131, the exposure region is prevented from being enlarged in the width direction for the following reason. That is, in the case of performing the exposing process on the underlayer including the inclined face, a number of rays of light reflecting in the lateral or oblique directions from the inclined face of the underlayer occur. The region other than the inherent exposure region in the photoresist film 131 is also exposed with the reflection light. Due to this, the exposure region is enlarged and, especially, the part corresponding to the part having the constant width, which is extremely narrow in the opening 31x is widened. On the contrary, in the embodiment, since the first exposing process is carried out on the flat underlayer, the tendency of expansion of the exposure region due to the influence of the reflection light is suppressed. The first exposure region 131y corresponds to an example of "first region" in the invention.

A second photo mask 32 shown in FIG. 13C includes an opening 32x having a shape in plane corresponding to the intermediate part 14a(2) and the rear end part 14a(3) (refer to FIG. 17) in the top pole tip 14a. As shown in FIG. 13D, in the second exposing process, after the second photo mask 32 is disposed in the predetermined position in the photoresist film 131 having the first exposure region 131y, the predetermined region in the photoresist film 131 is selectively exposed through the opening 32x of the second photo mask 32. By the second exposing process, the second exposure region 132y is formed in the photoresist film 131. The second photo mask 32 is disposed so that the front end of the opening 32x is positioned on the front side of the position of the rear end of the first exposure region 131y. By the operation, part (the upper part in the drawing) of the rear side in the first exposure region 131y and part (the lower part in the drawing) of the front side in the second exposure region 132y are partially overlapped, thereby forming the synthetic exposure region 133y including the overlapped region. The shape in plane of the synthetic exposure region 133y corresponds to that of the top pole tip 14a. The second exposure region 132y corresponds to an example of "second region" in the invention.

As described above, in the embodiment, the exposing process on the photoresist film 131 on the flat underlayer (exposing process on the part corresponding to the front end part 14a(1)) and the exposing process on the photoresist film 131 on the underlayer including the inclined face (exposing process on the part corresponding to the intermediate part 14a(2) and the rear end part 14a(3)) are separately performed. Consequently, different from the case of exposing all of the front end part 14a(1), the intermediate part 14a(2) and the rear end part 14a(3) by a single exposing operation, an adverse influence by the reflection light from the inclined face of the underlayer can be avoided.

In the embodiment, an adverse influence by defocusing due to variations in the height of the underlayer can be also avoided. Specifically, the best focal point at the time of exposure naturally varies in the flat region and the inclined region. Consequently, when both of the regions are exposed in a lump like the conventional manner, defocusing occurs in the flat region and/or the inclined region. On the contrary, in the embodiment, since the flat region and the inclined region are exposed separately, the exposure in the best focusing state in each of the regions can be realized. Consequently, sharp patterning can be performed.

Finally, by developing the synthetic exposure region 133y in the photoresist film 131 in a lump, the photoresist pattern 133 having an opening 133z as shown in FIG. 14A is formed. The shape in plane of the opening 133z corresponds to that of the top pole tip 14a, in which the plane shape of the synthetic exposure region 133y shown in FIG. 13D is reflected. By performing the frame plating by using the photoresist pattern 133, as shown in FIG. 14B, especially, the width of the front end part 14a(1) becomes the design width W1 and the top pole tip 14a can be formed so that the width is constant in the whole region of the top pole tip 14a.

Referring now to FIGS. 15A, 15B, 16A and 16B, more useful action and effects in the case of using the above-described method of forming the top pole tip 14a will be described.

In the example shown in FIG. 13D, length L10 of the region in which the first exposure region 131y and the second exposure region 132y are overlapped with each other is sufficiently assured. For example, when there is a demand of setting the length of the intermediate part 14a(2) to be short, it is necessary to shorten the length L10 of the overlapped region as much as possible. When the length L10 is too long, the first exposure region 131y exceeds the "position P2" and extends onto the insulating film pattern 13. As a result, an adverse influence by the reflection from the underlayer cannot be avoided. Consequently, it is preferable to shorten the length L10 of the overlapped region of the exposure regions as much as possible.

Figures 15A, 15B:
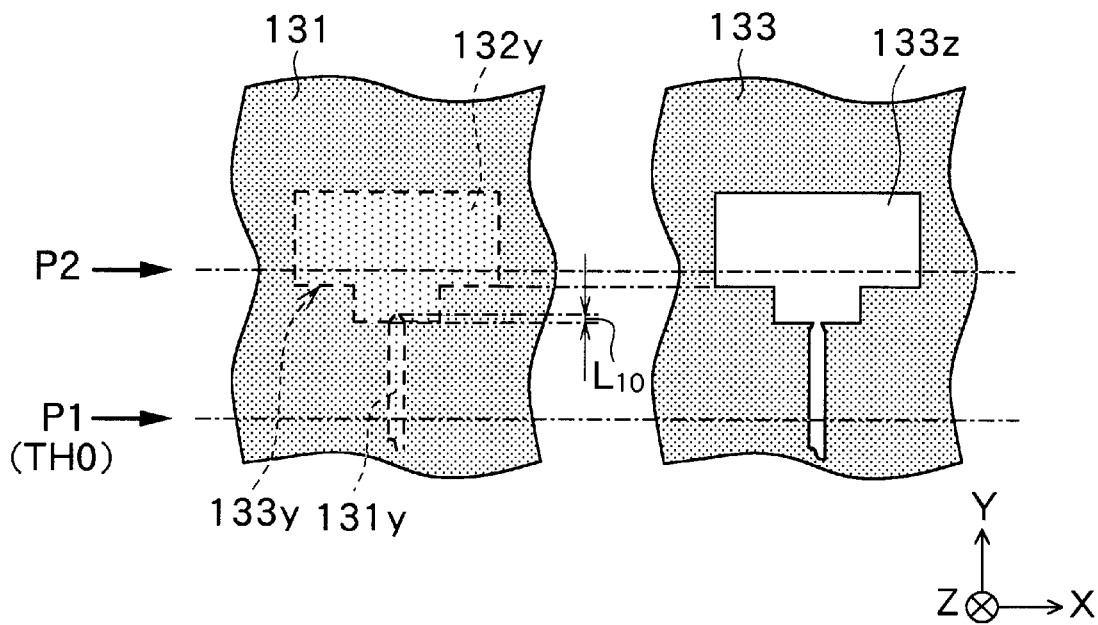
FIGS. 15A and 15B are other plan views for explaining problems of a comparative example of the first embodiment.

When the length L10 is, however, excessively shortened in the case where, for example, the first exposure region 131y has only the part of the constant width as shown in FIG. 15A, the following inconveniences occur. To be specific, in the first exposing process, the rear end of the first exposure region 131y is rounded by the influence of a slight amount of light reflected by the surface of the small uneven region of the underlayer. As a result, as shown in FIG. 15B, the part corresponding to the overlapped part of the first and second exposure regions 131y and 132y in the opening 133z of the photoresist pattern 133 finally formed becomes extremely narrow and a narrowed shape is obtained. The part corresponding to the overlapped part in the photoresist pattern 133 is reflected in the shape of the connection portion of the front end part 14a(1) and the intermediate part 14a(2) of the top pole tip 14a formed by using the photoresist pattern 133. That is, the connection portion of the front end part 14a(1) and the intermediate part 14a(2) in the top pole tip 14a is narrowed. Such a shape disturbs the propagation of the magnetic flux from the intermediate part 14a(2) to the front end part 14a(1).

Figures 16A, 16B:
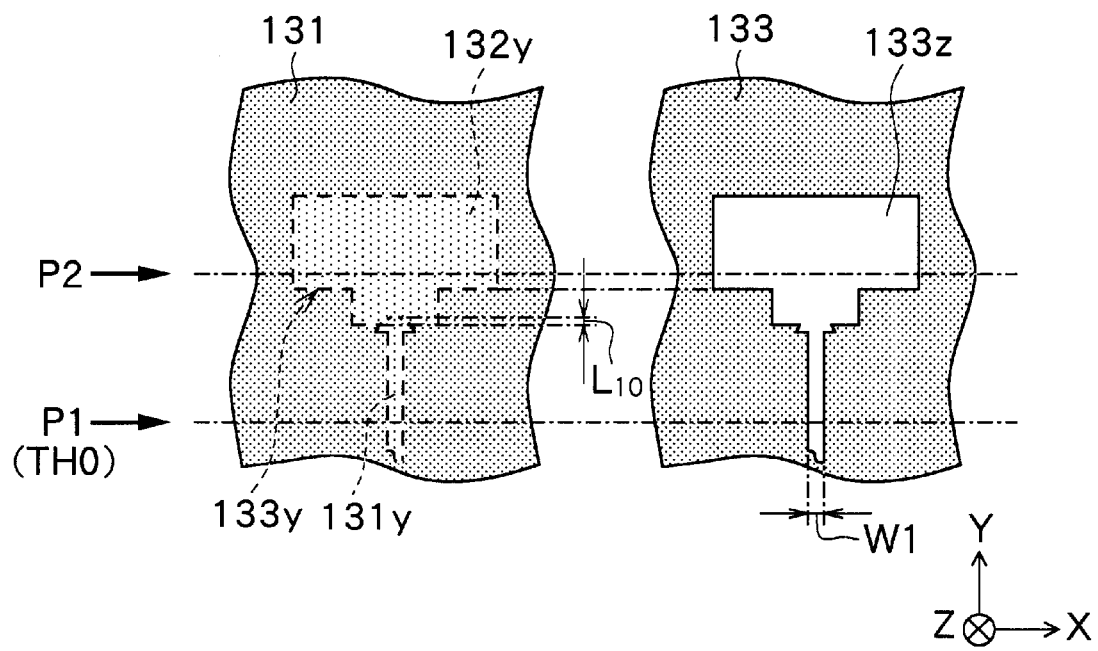
FIGS. 16A and 16B are plan views for explaining the action of the first embodiment.

In contrast to the above, in the embodiment, since the first exposure region 131y has the T shape, as shown in FIG. 16A for example, even when the rear part of the first exposure region 131y is rounded, a connection portion of a sufficient width is formed in the part corresponding to the overlapped part of the first and second exposure regions 131y and 132y in the photoresist pattern 133 finally formed (FIG. 16B). In this case, the part corresponding to the connection portion between the front end part 14a(1) and the intermediate part 14a(2) of the top pole tip 14a formed finally can be made sufficiently wide, so that the magnetic flux smoothly propagates from the intermediate part 14a(2) to the front end part 14a(1). Thus, sufficient overwrite characteristics can be assured.

<Other Effects of the Method of Manufacturing the Thin Film Magnetic Head>

The other effects of the method of manufacturing the thin film magnetic head according to the embodiment will now be described.

In the method of manufacturing the thin film magnetic head according to the embodiment, as a material of the mask precursor layer 110, an inorganic material having a relatively low reflectance such as alumina is used. Due to this, when the masks 80a and 80b are formed by performing photolithography on the photoresist film disposed on the mask precursor layer 110 and patterning the photoresist film, occurrence of light reflected by the surface of the underlayer (the mask precursor layer 110) at the time of exposure can be suppressed. The enlargement, reduction and the like of the exposure region by the influence of the reflection light is therefore suppressed, so that the masks 80a and 80b can be formed with high accuracy.

The alumina used as the material of the mask precursor layer 110 is etched faster as compared with a soft material of a photoresist film or the like. Because of the characteristic of the material of alumina, when the bottom pole 9 is selectively etched by using the pattern masks 10a and 10b which are formed by patterning the mask precursor layer 110, the amount of etching the pattern masks 10a and 10b is decreased. Consequently, the region except for the region to be etched in the bottom pole 9 can be prevented from being etched, so that reduction in the thickness of the bottom pole 9 can be avoided.

In the embodiment, in the method of forming the pattern masks 10a and 10b and the method of forming the pole part 100, the etching process according to the RIE is performed and especially the conditions (such as etching gas, processing temperature, and the like) of the etching process are made appropriate. The etching process can be therefore performed in shorter time as compared with the case of using ion milling. Thus, the pattern masks 10a and 10b and the pole part 100 can be formed in shorter time.

In the embodiment, as shown in FIGS. 8A and 9A, the intermediate connection pattern 14e is disposed on the wiring connection portion 19sb so that the top face of the intermediate connection pattern 14e is positioned higher than the top faces of the intermediate connection portion 14c and the magnetic path connection portion 14d. When each of the intermediate connection pattern 14c, the intermediate connection portion 14c and the magnetic path connection portion 14d are covered with alumina and the surface of the alumina layer is polished to form the insulating film 21, not only the intermediate connection portion 14c and the magnetic path connection portion 14d but also the intermediate connection pattern 14e can be exposed. Consequently, different from the case where no intermediate connection pattern 14e is formed, the process of forming the opening by removing part of the insulating film 21 in order to connect the wiring connection portion 19sb and the coil connection wiring 14fh is unnecessary. Moreover, since the intermediate connection pattern 14e is formed in the same process as both of the intermediate connection portion 14c and the magnetic path connection portion 14d, a new process for forming the intermediate connection pattern 14e is not required. Therefore, the number of manufacturing steps can be reduced.

In the embodiment, as the material of the insulating films 17 and 20 to be filled in the spacing between each turns of the thin film coil 16 (including the coil connection portion 16s) and the thin film coil 19 (including the coil connection portion 19sa and the wiring connection portion 19sb), an organic insulating material such as photoresist which is fluidized when being heated is used. Consequently, different from the case of using an inorganic insulating material such as alumina which is not fluidized when being heated, the spacing between each turns of the thin film coils 16 and 19 and the like can be filled so that each turns of the thin film coils 16 and 19 can be certainly insulated.

In the embodiment, as shown in FIGS. 5A to 7A, when the etching process according to RIE is performed to form the pole part 100 having the trim structure, the region except for the region in which the top pole tip 14a and the magnetic path connection portion 14b are disposed is uniformly etched. The surface level of the region of the thin film coil 16 is therefore lower than that of the under face of the front end part 14a(1) of the top pole tip 12a. Consequently, since the insulating film 18 having a sufficient thickness is disposed on the thin film coil 16, the thin film coil 16 and the thin film coil 19 which is formed in a following process can be certainly insulated from each other.

<Structure of Thin Film Magnetic Head>

Referring now to FIGS. 9A, 12 and 17, the structure of the thin film magnetic head according to the embodiment will be described.

FIG. 17 schematically shows the plane structure of the thin film magnetic head manufactured by the method of manufacturing the thin film magnetic head according to the embodiment. In FIG. 17, the insulating films 17, 18, 20 and 21, the overcoat layer 22 and the like are omitted. Only the outermost radius parts are shown with respect to the thin film coils 16 and 19. Only the outermost peripheries are shown with respect to the insulating film pattern 11. Only one part is shown with respect to the insulating film pattern 13. FIG. 9A is a cross section taken along line IXA—IXA of FIG. 17. The X, Y and Z axes in FIG. 17 denote in a manner similar to FIGS. 1A and 1B to FIGS. 9A and 9B, and FIGS. 10 to 12.

As shown in FIGS. 9A, 12 and 17, the position of the front end of the insulating film pattern 11 is the position as a reference of determining the throat height (TH), that is, the throat height zero position (TH0). The throat height (TH) is specified as a length from the position (TH0) of the front end of the insulating film pattern 11 to the position of the air bearing surface 90. "MRH0" in the drawings denotes the position of the rear end of the MR film 5, that is, the MR height zero position. The MR height (MRH) is a length from the MR height zero position to the position of the air bearing surface 90. For example, the throat height zero position (TH0) and the MR height zero position (MRH0) almost coincide with each other.

The top pole 14 is constructed by, for instance, the top pole tip 14a, the intermediate connection portion 14c, the magnetic path connection portions 14b and 14d, and the top yoke 14f which are separately formed. That is, the top pole 14 is a collection of those parts.

The top yoke 14f includes the yoke part 14f(1) having a large area for housing the magnetic flux generated by the thin film coils 16 and 19 and the connection portion 14f(2) having a constant width narrower than that of the yoke part 14f(1). For example, the rear part of the yoke part 14f(1) has almost constant width and the front part is gradually narrowed toward the air bearing surface 90. The connection portion 14f(2) is wider than, for example, the intermediate connection portion 14c which will be described hereinlater. The invention is not limited to such a case. For example, the connection portion 14f(2) may be narrower than the intermediate connection portion 14c.

The intermediate connection portion 14c has, for example, a rectangle shape in plane and is wider than the rear end part 14a(3) of the top pole tip 14a. The intermediate connection portion 14c may be narrower than the rear end part 14a(3).

For example, the top pole tip 14a includes the front end part 14a(1), the intermediate part 14a(2) and the rear end part 14a(3) in accordance with the order from the air bearing surface 90 side. Each of the parts has a rectangular shape in plane. The front end part 14a(1) has an almost constant width which defines the recording track width at the time of recording. The intermediate part 14a(2) is wider than the front end part 14a(1). The rear end part 14a(3) is wider than the intermediate part 14a(2). That is, in the connection portion between the front end part 14a(1) and the intermediate part 14a(2), a step in the width direction is formed.

A step face 14ad on the intermediate part 14a(2) side in the step of the top pole tip 14a is positioned, for example, rearward of the throat height zero position (TH0) or MR height zero position (MRH0). A front edge face 14ct of the intermediate connection portion 14c is positioned, for example, rearward of the step face 12ad and coincides with the position of the front end of the insulating film pattern 13. A front edge face 14ft of the top yoke 14f is positioned, for example, rearward of the front edge face 14ct. That is, both the intermediate connection portion 14c and the top yoke 14f are disposed away from the air bearing surface 90. The disposing positions of the intermediate connection portion 14c and the top yoke 14f are not always limited to the above case. For instance, the position of the edge face may coincide with the position of the step face 14ad or both the positions of the edge faces 14ct and 14ft may coincide with the position of the step face 14ad. The center in the width direction of the top yoke 14f, that of the intermediate connection portion 14c and that of the top pole tip 14a coincide with each other.

It is preferable to set the angle γ formed by a side edge face of the front end part 14a(1) and the step face 14ad in the top pole tip 14a, for example, within the range from 90 to 120 degrees in order to make the magnetic flux smoothly flow from the intermediate part 14a(2) to the front end part 14a(1). FIG. 17 shows an example that the angle y is about 90 degrees.

Part of the front part of the top yoke 14f is overlapped with and magnetically coupled to part of the Intermediate connection portion 14c. Part of the intermediate connection portion 14c is overlapped with and magnetically coupled to part of the rear end part 14a(3) of the top pole tip 14a. On the other hand, part of the rear part of the top yoke 14f is also magnetically coupled (not shown in FIG. 17) to the bottom pole 9 sandwiching the magnetic path connection portions 14b and 14d in the opening 12k. That is, by connecting the top pole 14 (the top pole tip 14a, the intermediate connection portion 14c, the magnetic path connection portions 14b and 14d, and the top yoke 14f) and the bottom pole 9, a propagation path of the magnetic flux, that is, a magnetic path is formed.

The position P1 of the front end of the insulating film pattern 11 lies within the region where the front end part 14a(1) of the top pole tip 14a extends. For example, the insulating film pattern 11 is disposed in a wide range including the regions in which at least the top pole 14 and the thin film coils 16 and 19 are arranged (excluding the region where the magnetic connection portions 14b and 14d are formed). For example, the position P2 of the front end of the insulating film pattern 13 is rearward of the position P1 of the front end of the insulating film pattern 11, and the insulating film pattern 13 is disposed in the rear part of the top pole tip 14a. Each of FIGS. 9A, 12 and 17 shows an example where the position P2 of the front end of the insulating film pattern 13 is rearward of the connection position of the intermediate part 14a(2) and the rear end part 14a(3) of the top pole tip 14a.

As shown in FIG. 17, each of the thin film coils 16 and 19 is a coil winding member having a spiral shape in plane. The coil connection portion 16s and a terminal 16x are formed at the inner and outer terminating ends of the thin film coil 16, respectively and are integral with the thin film coil 16. The coil connection portion 19sa and the wiring connection portion 19sb are formed at the inner and outer terminating ends of the thin film coil 19, respectively, and are integral with the thin film coil 19. The thin film coils 16 and 19 are electrically connected to each other via the coil connection portions 16s and 19sa. The intermediate connection pattern 14e is formed on the wiring connection portion 19sb, and the thin film coils 16 and 19 and the coil connection wiring 14fh are electrically connected to each other via the wiring connection portion 19sb and the intermediate connection pattern 14e. The terminal 16x and the rear end (not shown) of the coil connection wiring 14fh are connected to an external circuit (not shown). A current can be passed to the thin film coils 16 and 19 by the external circuit.

As understood from FIGS. 9A, 12 and 17, the parts except for the rear portion of the rear end part 14a(3) of the top pole tip 14a are provided on the flat write gap layer 12. The rear portion of the rear end part 14a(3) is disposed on the inclined face of the insulating film pattern 13.

<Characteristic Action and Effects of the Structure of the Thin Film Magnetic Head>

The action of the thin film magnetic head according to the embodiment will be described by referring to FIGS. 9A, 12 and 17.

First, the basic operation of the thin film magnetic head, that is, an operation of recording data onto a recording medium and an operation of reproducing data from the recording medium will be briefly described.

In the thin film magnetic head according to the embodiment, when current is passed to the thin film coils 16 and 19 via the external circuit (not shown) at the time of recording information, magnetic flux is accordingly generated. The magnetic flux generated at this time propagates the top yoke 14f from the yoke part 14f(1) to the connection portion 14f(2) and further propagates via the intermediate connection portion 14c and the rear end part 14a(3) of the top pole tip 14a which are magnetically coupled to the top yoke 14f to the intermediate part 14a(2) and then the front end part 14a(1). The magnetic flux propagated to the front end part 14a(1) reaches the front end of the air bearing surface 90 side to generate a signal magnetic field for recording on the outside near the write gap recording layer 12. By the signal magnetic field, the magnetic recording medium is partially magnetized so as to record information.

On the other hand, upon reproducing, a sense current is passed to the MR film 5 in the reproducing head. A resistance value of the MR film 5 changes according to a reproducing signal magnetic field from the magnetic recording medium. By detecting the change in resistance on the basis of a change in the sense current, information recorded on the magnetic recording medium can be readout.

Referring now to FIGS. 9A, 12 and 17, the characteristic action and effects of the thin film magnetic head according to the embodiment will be described.

In the thin film magnetic head according to the embodiment, the insulating film pattern 11 is disposed in the recess 9J formed in the bottom pole 9. The insulating film pattern 11 functions as a magnetic flux shielding member and suppresses the flow of the magnetic flux from the upper region to the lower region (leakage of the magnetic flux). The front end of the insulating film pattern 11 lies within the region where the front end part 14a(1) of the top pole tip 14a extends, and widely extends in the width and length directions in the region rearward of its front end while including part of the region in which the top pole tip 14a is disposed. By the existence of the insulating film pattern 11, in the region corresponding to the region of the insulating film pattern 11, propagation of the magnetic flux to the bottom pole 9 via the top pole tip 14a and the write gap layer 12 can be suppressed.

Figure 33:
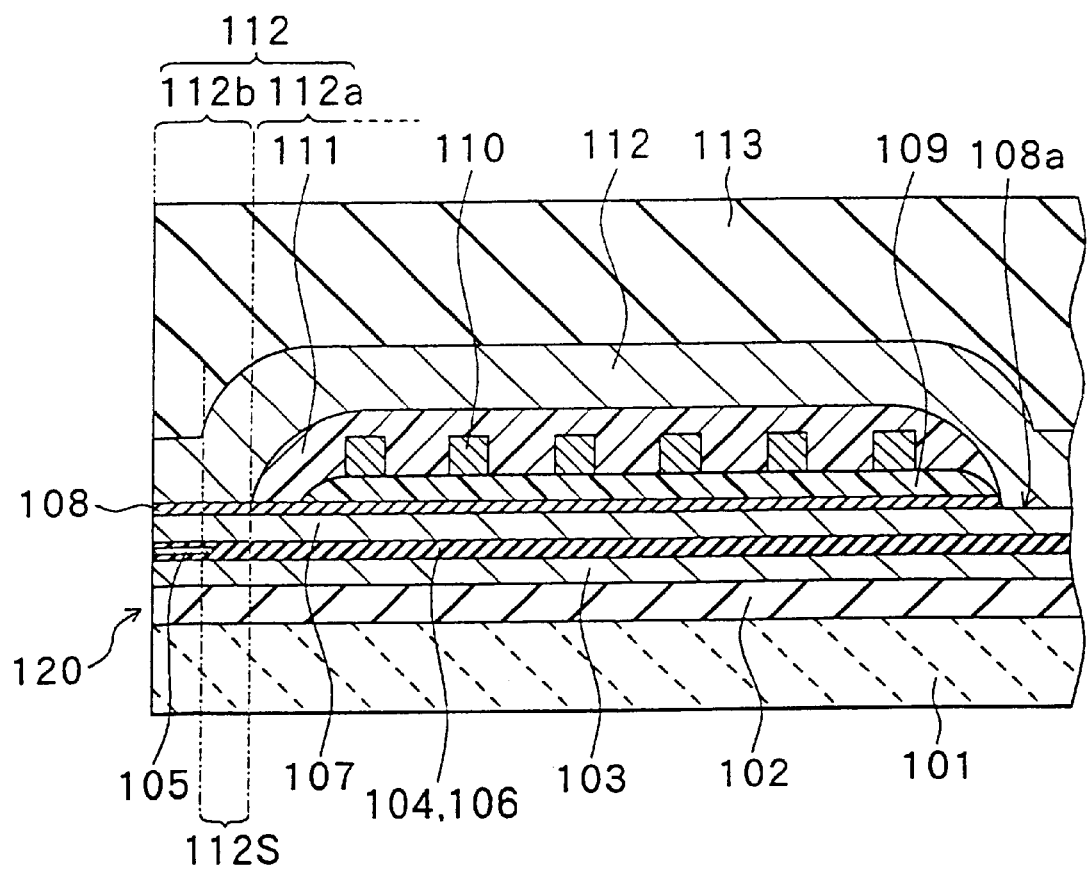
FIG. 33 is a cross section for explaining a process subsequent to FIG. 32.
Figure 34:
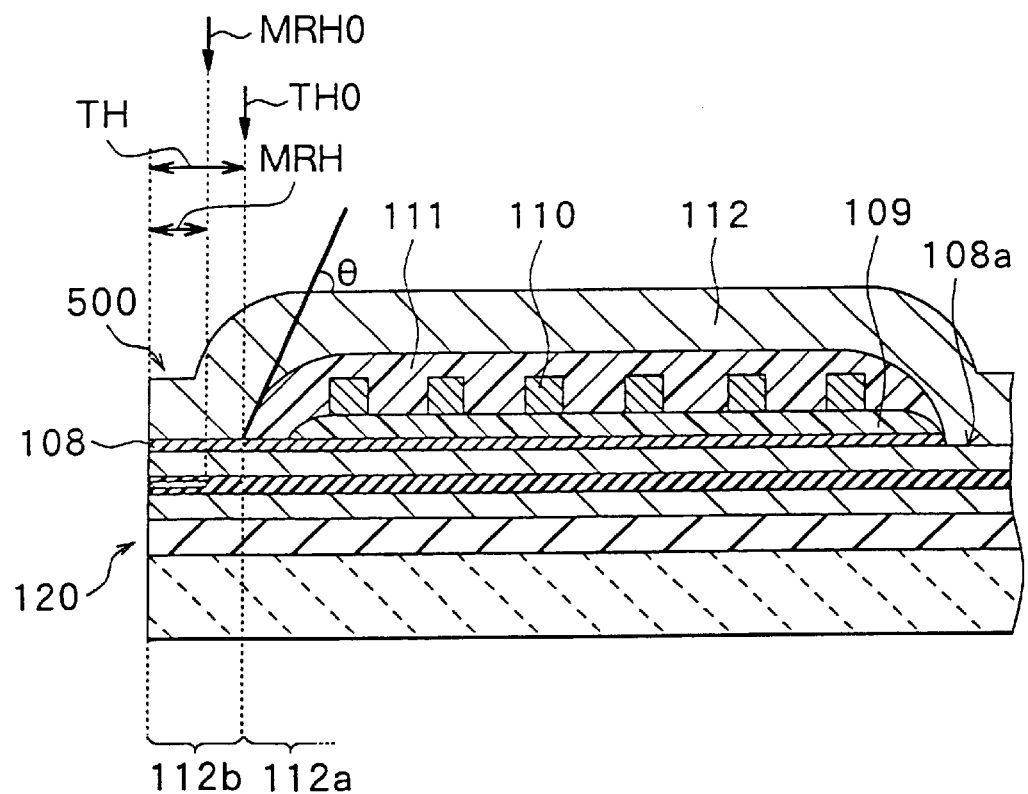
FIG. 34 is a cross section showing the structure of the main part of the conventional thin film magnetic head.
Figure 35:
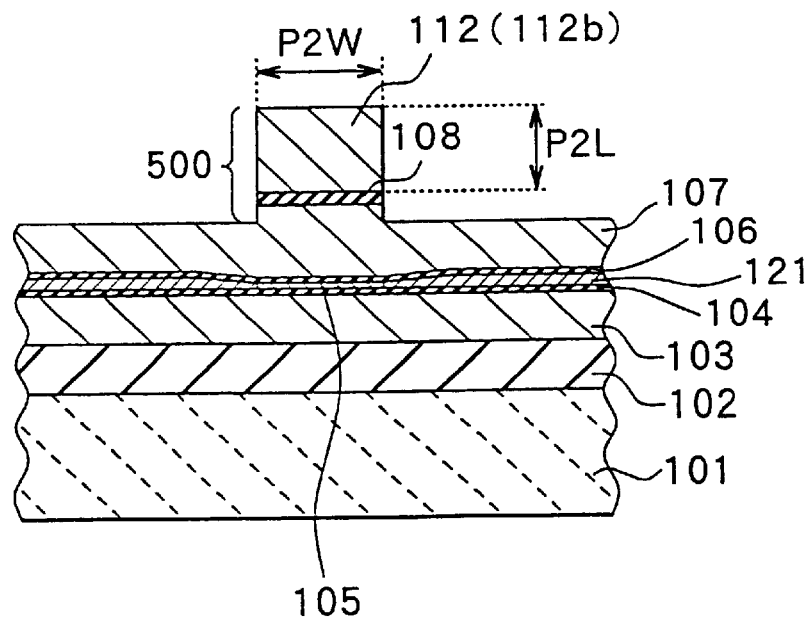
FIG. 35 is a cross section taken parallel to the air bearing surface of the pole part in the thin film magnetic head shown in FIG. 34.
Figure 36:
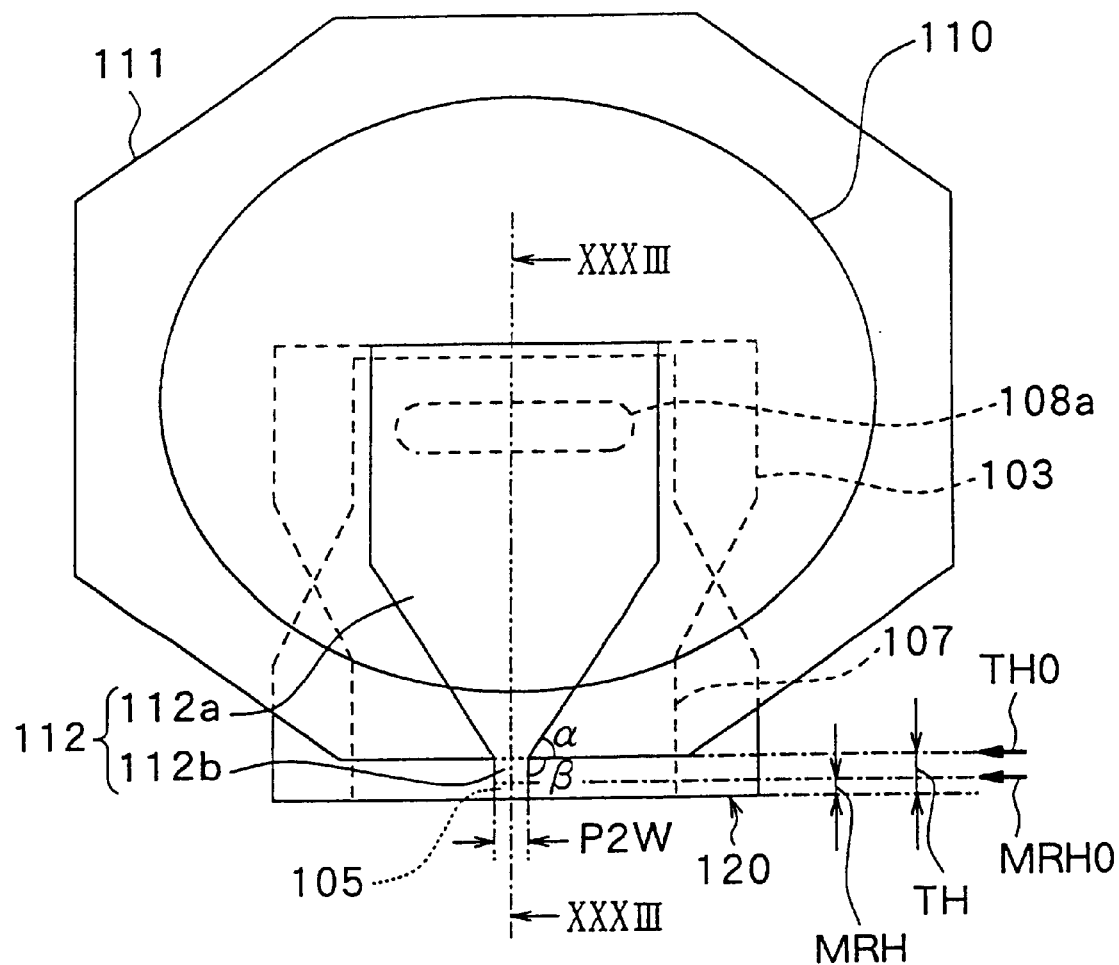
FIG. 36 is a plan view showing the structure of the conventional thin film magnetic head.

From the above, in the thin film magnetic head, different from the conventional thin film magnetic head shown in FIG. 33, the magnetic flux generated by the thin film coils 16 and 19 can be sufficiently supplied to the top yoke 14*f* without any big loss and, in the propagating process of the magnetic flux in the top pole 14, the magnetic flux flowed in the top pole tip 14*a* can be supplied to the front end part 14*a*(1) without any big loss. The sufficient magnetic flux can be consequently supplied to the front end part 14*a*(1). The excellent overwrite characteristic can be therefore assured. By the existence of the insulating film pattern 11, the propagation of the magnetic flux to the part except for the recording head, for example, to the MR film 5 of the reproducing head can be suppressed. The insulating film pattern 11 can suppress the propagation of the magnetic flux from the top pole tip 14*a* to the bottom pole 9 and, simultaneously, the propagation of the magnetic flux from the bottom pole 9 to the top pole tip 14*a*. In the embodiment, in the region corresponding to the region 112S in the conventional thin film magnetic head shown in FIG. 33, that is, the region 14S corresponding to a face 14R with which part of the rear end part 14*a*(3) of the top pole tip 14*a* and part of the intermediate connection portion 14*c* are in contact so as to be overlapped (hereinbelow, also simply referred to as "magnetic connection face"), besides the insulating film pattern 11, the insulating film pattern 13 is disposed so as to be in contact with the write gap layer 12. The insulating film pattern 13 also functions as a magnetic flux shielding member in a manner similar to the insulating film pattern 11 and suppresses the leakage of the magnetic flux. By disposing the insulating film pattern 13 in the region 14S in which the tendency of the leakage of the magnetic flux is conspicuous, coupled with the magnetic flux shielding effect of the insulating film pattern 11, the leakage of the magnetic flux in the region 14S can be more certainly suppressed. This point also contributes to assure the excellent overwrite characteristic.

In the embodiment, the width W1, W2 and W3 of the front end part 14*a*(1), the intermediate part 14*a*(2) and the rear end part 14*a*(3) constructing the top pole tip 14*a* have the relation of W1<W2<W3. When it is assumed that the permissible volumes (hereinbelow, simply referred to as "magnetic volumes") of the magnetic flux of the above parts 14*a*(1), 14*a*(2) and 14*a*(3) are V1, V2 and V3, respectively, the magnetic volumes of the parts satisfy the relation of V1<V2<V3. Consequently, in the process of propagating the magnetic flux from the rear end part 14*a*(3) to the front end part 14*a*(1) via the intermediate part 14*a*(2), the magnetic flux flowed to the top pole tip 14*a* is concentrated step by step in accordance with a step-by-step decrease in the magnetic volume, so that the sufficient volume of the magnetic flux is supplied to the front end part 14*a*(1). As described above, by properly adjusting the magnetic volumes of the parts constructing the top pole tip 14*a*, a saturation phenomenon of the magnetic flux in the magnetic flux propagating process is avoided. This point also contributes to the assurance of the excellent overwrite characteristic.

In the embodiment, since the position P2 of the front end of the insulating film pattern 13 is rearward of the position P1 of the front end of the insulating film pattern 11, the magnetic volume of the front end part 14*a*(1) of the top pole tip 14*a* can be properly assured. Thus, the saturation of the magnetic flux in the front end part 14*a*(1) in the magnetic flux propagating process can be avoided.

In the embodiment, since nickel iron alloy, iron nitride or amorphous alloy (such as cobalt iron alloy or zirconium cobalt iron alloy) having high saturated magnetic flux density is used as the material of the top pole 14 (including the top pole tip 14*a* or the like) and the bottom pole 9, the magnetic flux in the top pole 14 and the bottom pole 9 can be propagated smoothly. Even when the thickness of part of the magnetic layer of the magnetic path such as part of the bottom pole 9 under the insulating film pattern 11 is reduced and the area of the magnetic flux passing region is narrowed, saturation of the magnetic flux in the part can be avoided.

Since the portion around the front end of the insulating film pattern 13 is inclined in the embodiment, the flow of the magnetic flux in the top pole tip 14*a* on the inclined face can be smoothed.

Since the front edge face of the intermediate connection portion 14*c* is inclined with respect to the flat face of the underlayer in the embodiment, the flow of the magnetic flux flowing from the intermediate connection portion 14*c* to the top pole tip 14*a* can be smoothed.

Since the front end of each of the intermediate connection portion 14*c* and the top yoke 14*f* is positioned rearward of the position of the air bearing surface 90 in the embodiment, the magnetic flux can be prevented from being directly discharged from the parts toward the air bearing surface 90 side. Thus, occurrence of a side erasing phenomenon can be prevented.

In the embodiment, the top yoke 14*f* is formed on the underlayer planarized by the polishing process. Consequently, the top yoke 14*f* can be formed with high accuracy. Such an effect is similarly produced in the case of forming, besides the top yoke 14*f*, the intermediate connection portion 14*c*, the magnetic path connection portion 14*d*, the coil connection wiring 14*fh* and the like on the flat underlayer.

<Modification of Method of Manufacturing Thin Film Magnetic Head>

Although the top pole tip 14*a* is formed by performing the exposing process twice in the method of manufacturing the thin film magnetic head according to the foregoing embodiment, it is not always limited to the above. For example, it can be formed by performing the exposing process three times or more. In such a case as well, effects similar to those of the foregoing embodiment can be obtained. The magnetic portions other than the top pole tip 14*a*, such as the intermediate connection portion 14*c*, the magnetic path connection portions 14*b* and 14*d*, the intermediate connection pattern 14*e*, the top yoke 14*f*, the coil connection wiring 14*fh*, and the like are not always subjected to the exposing process of a plurality of times. Each of them can be formed by a single exposing process. The method of forming the magnetic portion by the exposing process of the plurality of times is useful when at least a part A (such as the front end part 14*a*(1)) having an extremely narrow width in the magnetic portion (such as the top pole tip 14*a*) is formed on the flat region on the underlayer which has both the inclined region and the flat region. When the region in which the magnetic portion is formed is flat, in order to simplify the forming process, it is preferable to form the magnetic portion by a single exposing process.

Although the RIE is employed as the method of etching the mask precursor layer 110 and the pole part 100 in the embodiment, the invention is not limited to the RIE but ion milling or the like can be also employed. As mentioned above, in the case of shortening the time necessary for the etching process, the RIE is suitable.

Although the top pole 14 (including the top pole tip 14*a*, the top yoke 14*f* and the like), the bottom shield layer 3, the top shield layer 7, and the like in the magnetic portions constructing the thin film magnetic head are formed by the electrolytic plating in the foregoing embodiment, the invention is not always limited to the method. The magnetic portions may be also formed by, for example, a method similar to that in the case of forming the bottom pole 9 or sputtering. Specifically, for example, after forming a precursor layer made of a predetermined material (such as iron nitride) by sputtering, by using a mask made of a predetermined material having a predetermined shape, the precursor layer is patterned by ion milling. As the etching method in such a case, besides the ion milling, the RIE can be used. In the case of employing the RIE, the etching process can be performed in shorter time as compared with the case of using the ion milling. Especially, by using an inorganic insulating material such as alumina as the material of the mask for patterning the precursor layer, by an action similar to that in the case of the mask precursor layer 110 made of alumina, inconveniences (such as reduction in the thickness of the magnetic portion) of the case of forming the magnetic portions can be avoided.

Although the masks 80a and 80b are formed by patterning the photoresist film by photolithography in the embodiment, the invention is not limited to the method. In addition to the above-mentioned method, for example, the masks 80a and 80b may be formed by growing a plating film by electrolytic plating or by forming a precursor layer and patterning the precursor layer by the etching process. A material similar to that of the top pole tip 14a or the like in the embodiment can be used as the material of the plating film and the precursor layer in such a case. As the method of forming the precursor layer, sputtering or electrolytic plating may be used. As the etching method, ion milling or RIE can be used.

Although the photoresist is used as the material of the insulating films 17 and 20 in the embodiment, the invention is not limited to the material but polyimide resin, SOG (Spin On Glass) and the like which are fluidized when being heated in a manner similar to the photoresist may be used.

In the embodiment, as the material of the top pole 14 (including the top pole tip 14a, the top yoke 14f and the like), the bottom pole 9, and the like, Permalloy, iron nitride, amorphous alloy or the like each having high saturated magnetic flux density is used. Besides the materials, for example, nickel cobalt iron (FeCoNi) can be used. In such a case, it is suitable to set the ratio of metal components of nickel cobalt iron to, for example, Fe:Co:Ni=40:30:30 (percent by weight). The nickel cobalt iron of such a composition has high saturated magnetic flux density equal to or higher than that of Permalloy or the like.

Although Permalloy having the composition of Ni:Fe= 80:20 (percent by weight) is used as the material of the bottom shield layer 3 and the top shield layer 7 in the embodiment, the invention is not limited to the material but iron nitride or amorphous alloy (such as cobalt iron or zirconium cobalt iron) may be used. Permalloy of another composition (for example, Ni:Fe=45 percent by weight: 55 percent by weight) can be used.

Although alumina is used as the material of the write gap layer 12 and the sputtering is used as the forming method in the embodiment, the invention is not limited to the above. As the material of the write gap layer 12, besides alumina, for example, an inorganic insulating material such as aluminium nitride (AlN), silicon oxide, or silicon nitride can be used or a non-magnetic material such as tantalum (Ta), tungsten titanium (WTi) or titanium nitride (TiN) may be also used. Besides the sputtering, the write gap layer 12 may be also formed by CVD (Chemical Vapor Deposition). By forming the write gap layer 12 by using such a method, it can be suppressed that a pin hole or the like is included in the gap layer. This point therefore contributes to avoid the leakage phenomenon of the magnetic flux via the write gap layer 12.

<Modification of the Structure of Thin Film Magnetic Head>

Figure 18:
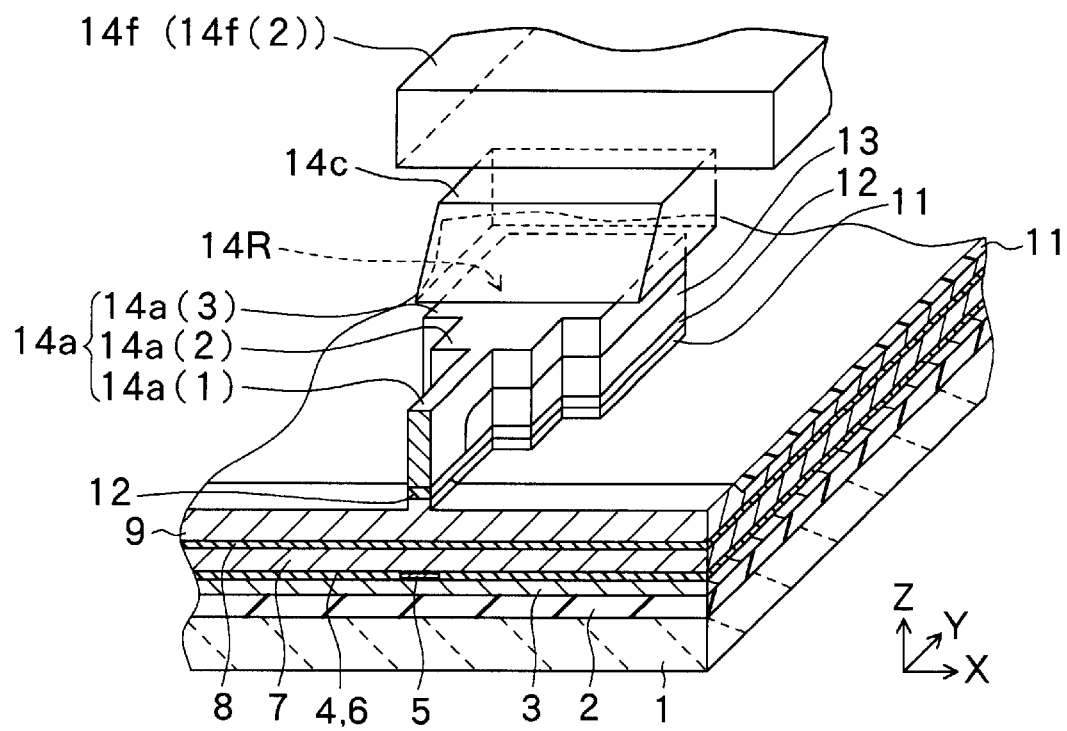
FIG. 18 is a perspective view showing a modification of the thin film magnetic head according to the first embodiment of the invention.

In the thin film magnetic head according to the embodiment, as shown in FIG. 12, the insulating film pattern 13 is disposed only in the region 14S (refer to FIG. 9A) corresponding to the magnetic connection face 14R, that is, the lower region of part of the rear end part 14a(3) in the top pole tip 14a. The invention is not always limited to the arrangement. For example, as shown in FIG. 18, the insulating film pattern 13 may extend in the region from the rear end part 14a(3) to the front end part 14a(1). In such a case, due to the existence of the insulating film pattern 13, the leakage of the magnetic flux from the top pole tip 14a to the bottom pole 9 in the wider region corresponding to the disposing range of the insulating film pattern 13 can be suppressed. In the case of extending the disposing region of the insulating film pattern 13, as described above, the front end of the insulating film pattern 13 is positioned rearward of the front end of the insulating film pattern 11 to properly assure the magnetic volume in the front end part 14a(1) and to avoid saturation of the magnetic flux in the front end part 14a(1).

Figure 19:
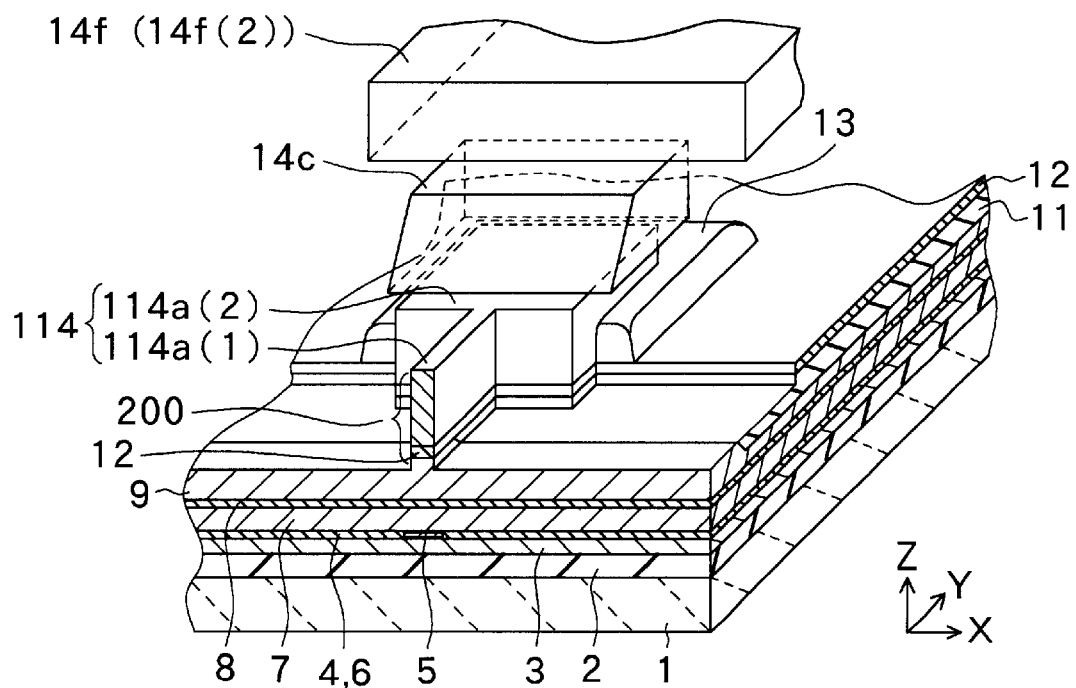
FIG. 19 is a perspective view showing another modification of the thin film magnetic head according to the first embodiment of the invention.

In the embodiment, as shown in FIG. 12, the top pole tip 14a is consisted of the three parts of the front end part 14a(1), the intermediate part 14a(2) and the rear end part 14a(3) having different widths. The invention is not always limited to the construction. As long as the propagation of the magnetic flux in the top pole tip 14a is not checked, the construction of the top pole tip 14a can be freely changed. Specifically, for example, as shown in FIG. 19, in place of the top pole tip 14a, a top pole tip 114a consisted of two parts, that is, a front end part 114a(1) corresponding to the front end part 14a(1) and, a rear end part 114a(2) which is wider than the front end part 114a(1) can be used. In such a case as well, by adjusting the magnetic volume in each of the parts constructing the top pole tip 114a, effects similar to those of the case of using the top pole tip 14a can be obtained. Although FIGS. 12 and 19 show the cases where each of the parts of the top pole tips 14a and 114a has a rectangular shape, the invention is not limited to the rectangular shape but other shape may be used.

In the embodiment, as shown in FIG. 12, when the pole part 100 is formed by the etching process, the write gap layer 12, the bottom pole 9 and the insulating film pattern 11 in the peripheral region are also etched to thereby etch the whole surface. The invention is not always limited to the case. For example, as shown in FIG. 19, only a region on the front side of the front end of the insulating film pattern 13 may be etched. Obviously, in FIG. 19, the top pole tip 14a may be used instead of the top pole tip 114a. In FIG. 19, the structure except for the above-mentioned point is similar to that of FIG. 12.

Although the case that the top yoke (14f) has a single layer structure of Permalloy has been described in the embodiment (refer to FIGS. 9A and 9B), the invention is not limited to the case. For example, as shown in FIGS. 20A and 20B, the top yoke may have a structure (214f) in which layers 91 made of a high saturated magnetic flux density material such as Permalloy and layers 92 made of an inorganic insulating material such as alumina are alternately stacked. By the structure, occurrence of an eddy current in the magnetic path can be prevented and high frequency characteristics can be improved. FIGS. 20A and 20B are similar to FIGS. 9A and 9B except for the top yoke 214f.

Although the top shield layer 7 and the bottom pole 9 are formed separately from each other and the insulating film 8 is interposed between them in the embodiment, the invention is not limited to the arrangement. For example, the insulating film 8 may not be interposed between them. In such a case, the top shield layer 7 and the bottom pole 9 may be integrally formed in a single layer.

In the embodiment, the coil connection portions 16s and 19sa are disposed at the inner terminating ends of the thin film coils 16 and 19, respectively, and the wiring connection portion 19sb is disposed at the outer terminating end of the thin film coil 19. The invention is not limited to the arrangement. For example, the disposing positions of the coil connection portions 16 and 19sa may be changed from the inner side to the outer side and the disposing position of the wiring connection portion 19sb may be changed from the outer side to the inner side. In such a case, in association with the change in the disposing position of the wire connecting part 19sb, it is preferable to similarly change the disposing positions of the intermediate connection pattern 14e and the coil connection wiring 14fh.

[Second Embodiment]

A second embodiment of the invention will now be described.

Figures 22A, 22B:
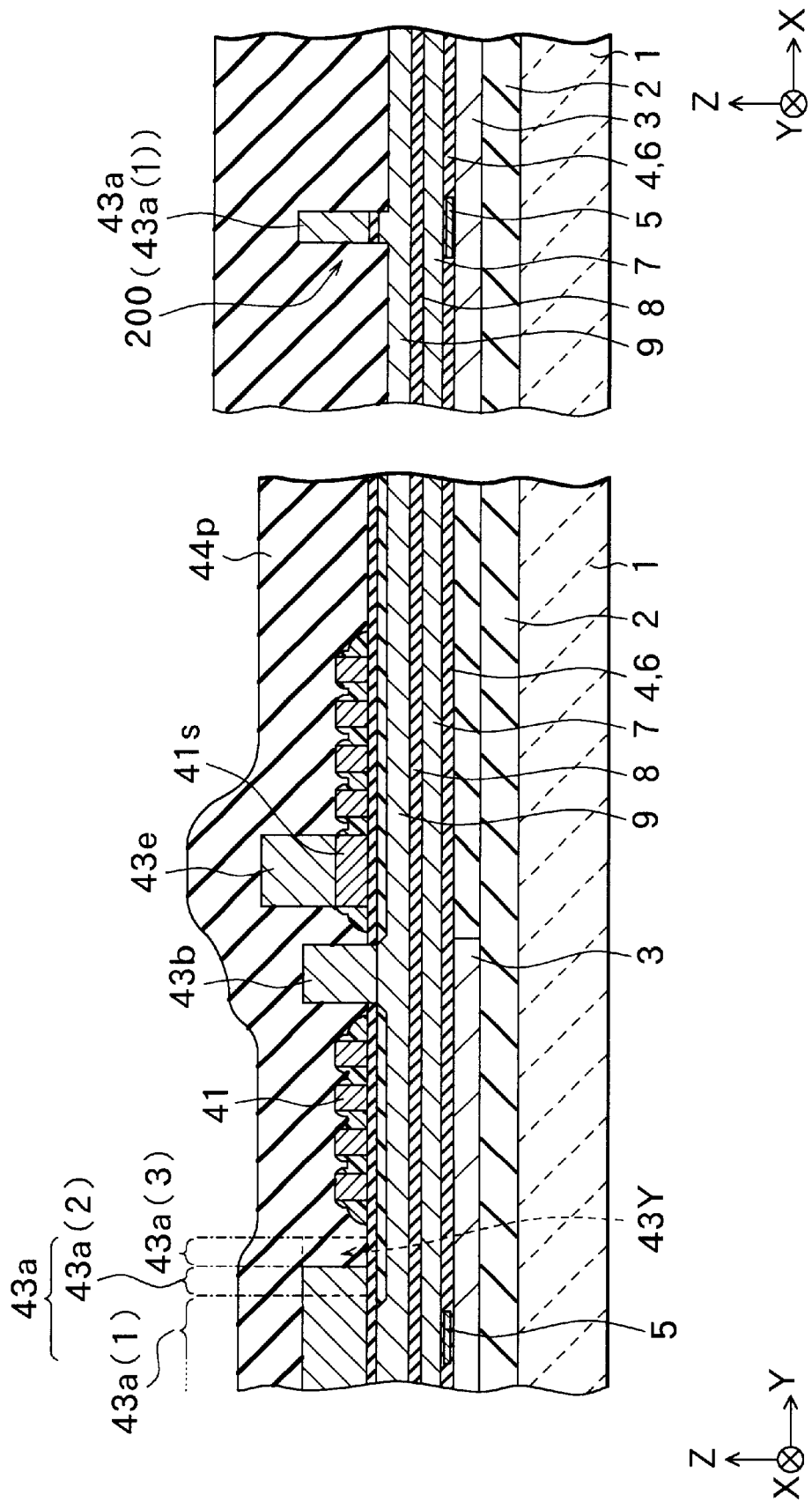
FIGS. 22A and 22B are cross sections for explaining a process subsequent to FIGS. 21A and 21B, respectively.
Figures 24A, 24B:
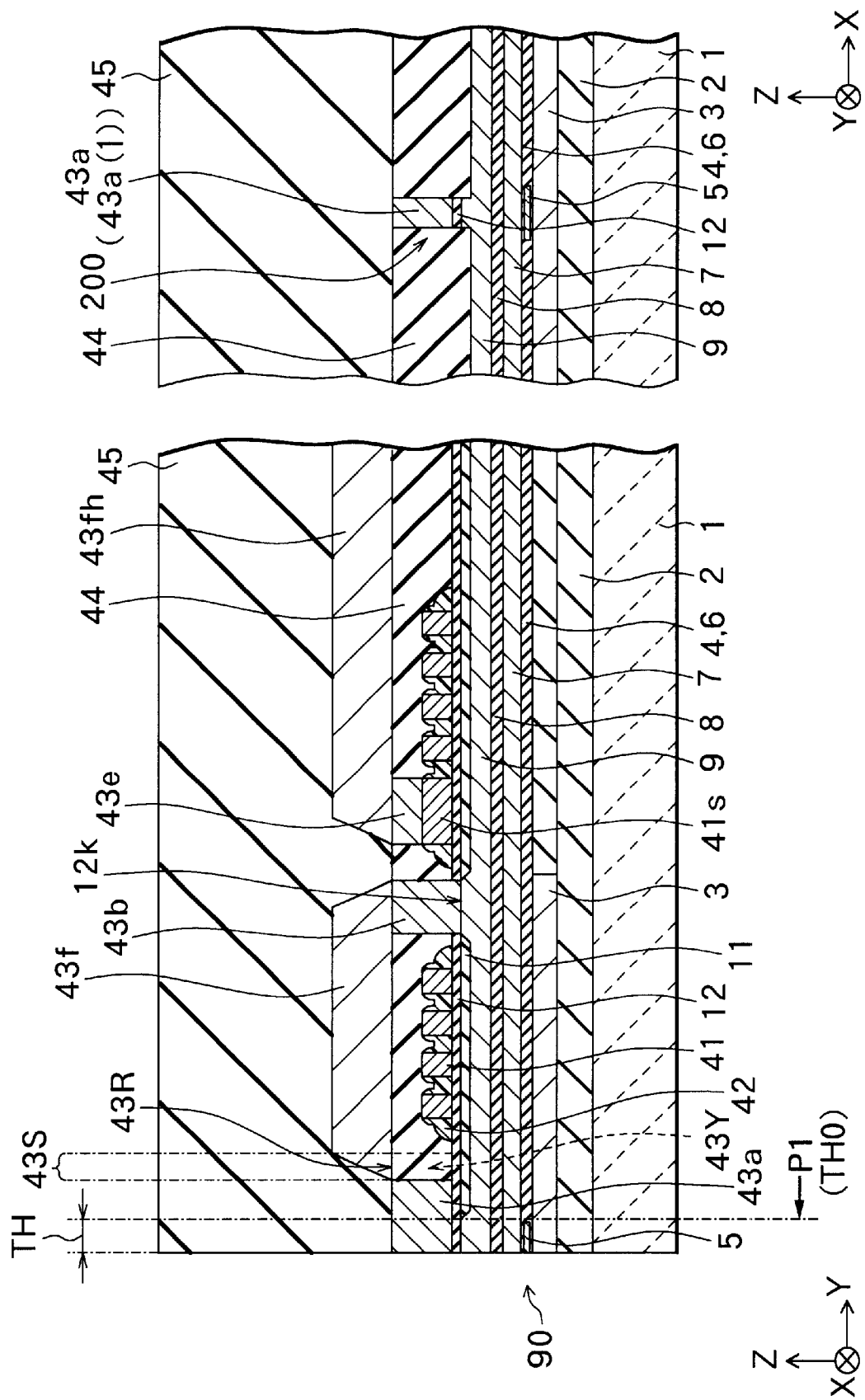
FIGS. 24A and 24B are cross sections for explaining a process subsequent to FIGS. 23A and 23B, respectively.
Figure 25:
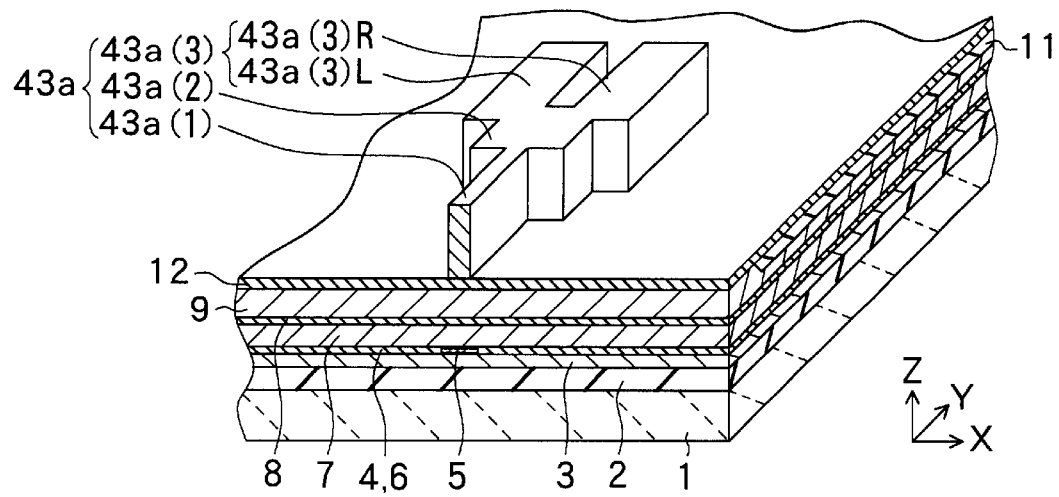
FIG. 25 is a perspective view corresponding to the cross sections shown in FIGS. 21A and 21B.
Figure 26:
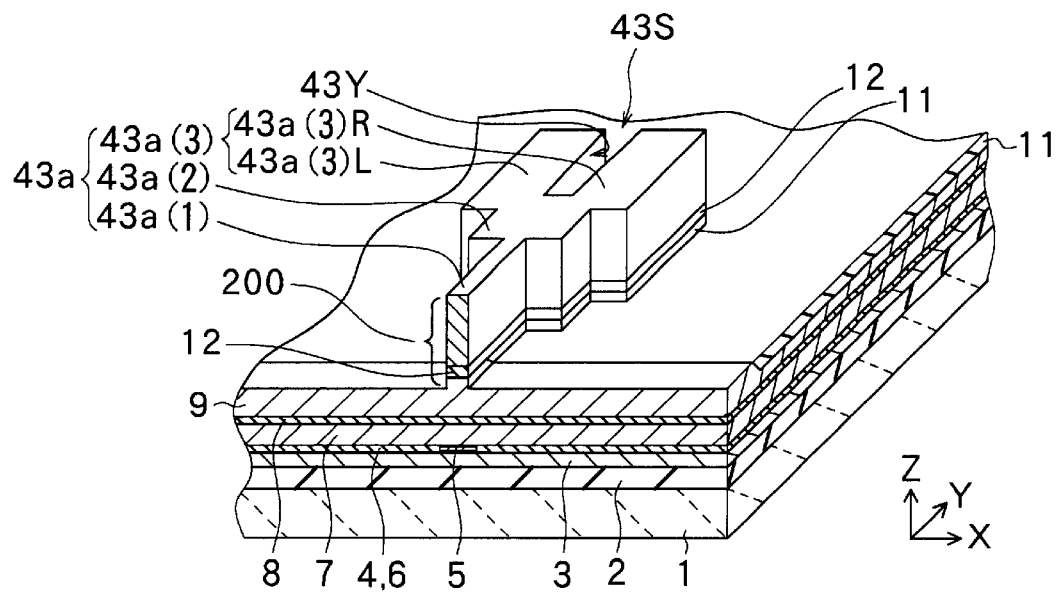
FIG. 26 is a perspective view corresponding to the cross sections shown in FIGS. 22A and 22B.
Figure 27:
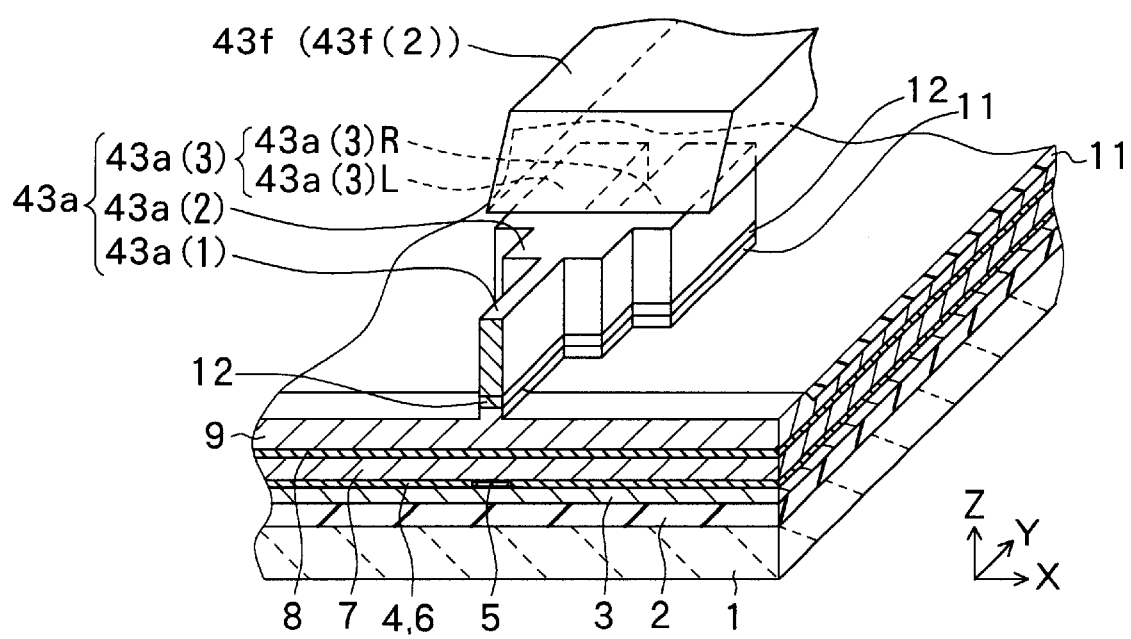
FIG. 27 is a perspective view corresponding to the cross sections shown in FIGS. 24A and 24B.

First, by referring to FIGS. 21A and 21B to FIGS. 24A and 24B and FIGS. 25 to 27, a method of manufacturing a composite thin film magnetic head as a method of manufacturing a thin film magnetic head according to the second embodiment of the invention will be described. Since the thin film magnetic head according to the second embodiment is embodied by the method of manufacturing the thin film magnetic head according to the embodiment, the head will be also described. FIGS. 21A to 24A are cross sections each perpendicular to the air bearing surface. FIGS. 21B to 24B are cross sections each parallel to the air bearing surface of the pole part. FIGS. 25 to 27 are perspective views corresponding to main manufacturing processes. FIG. 25 corresponds to the state shown in FIGS. 21A and 21B. FIG. 26 corresponds to the state shown in FIGS. 22A and 22B. FIG. 27 corresponds to the state shown in FIGS. 24A and 24B. In FIG. 25, the thin film coil 41, the insulating film 42 and the like in FIGS. 21A and 21B are omitted. In FIG. 26, the thin film coil 41 and the insulating films 42 and 44p in FIGS. 22A and 22B are omitted. In FIG. 27, the thin film coil 41, the insulating films 42 and 44, the overcoat layer 45 and the like in FIGS. 24A and 24B are omitted. The X, Y and Z axis directions in FIGS. 21A and 21B to FIGS. 24A and 24B and FIGS. 25 to 27 denote similar to those in the first embodiment. The same components as those in the first embodiment are designated by the same reference numerals.

In the method of manufacturing the thin film magnetic head according to the embodiment, since the processes until the write gap layer 12 (including the opening 12k) in FIGS. 21A and 21B is formed are similar to those shown in FIGS. 1A and 1B in the first embodiment, the description is omitted here.

In the embodiment, after forming the write gap layer 12, as shown in FIGS. 21A, 21B and 25, a thin film coil 41 for an inductive-type recording head made of copper (Cu) or the like is selectively deposited in a thickness of about 1.0 to 1.5 $\mu$m on the planarized write gap layer 12 on the insulating film pattern 11 by, for example, electrolytic plating. The thin film coil 41 has a structural characteristic similar to, for example, that of the thin film coil 16 in the first embodiment. FIG. 21A shows only part of the thin film coil 16. In the case of forming the thin film coil 41, simultaneously, for example, a wiring connection portion 41s is formed at the inner terminating end integrally with the thin film coil 41 on the write gap layer 12. The wiring connection portion 41s is used to electrically connect the thin film coil 41 to a coil connection wiring 43fh (refer to FIG. 24A) formed in a following process. The wiring connection portion 41s corresponds to an example of "coil end" in the invention.

As shown in FIGS. 21A, 21B and 25, in spacing between turns and the peripheral region of the thin film coil 41 (including the wiring connection portion 41s), an insulating film 42 made of photoresist or the like is formed in a predetermined pattern by high-precision photolithography. The structural characteristic and forming method of the insulating film 42 are similar to those of the insulating films 17 and 20 in the first embodiment.

Figure 28:
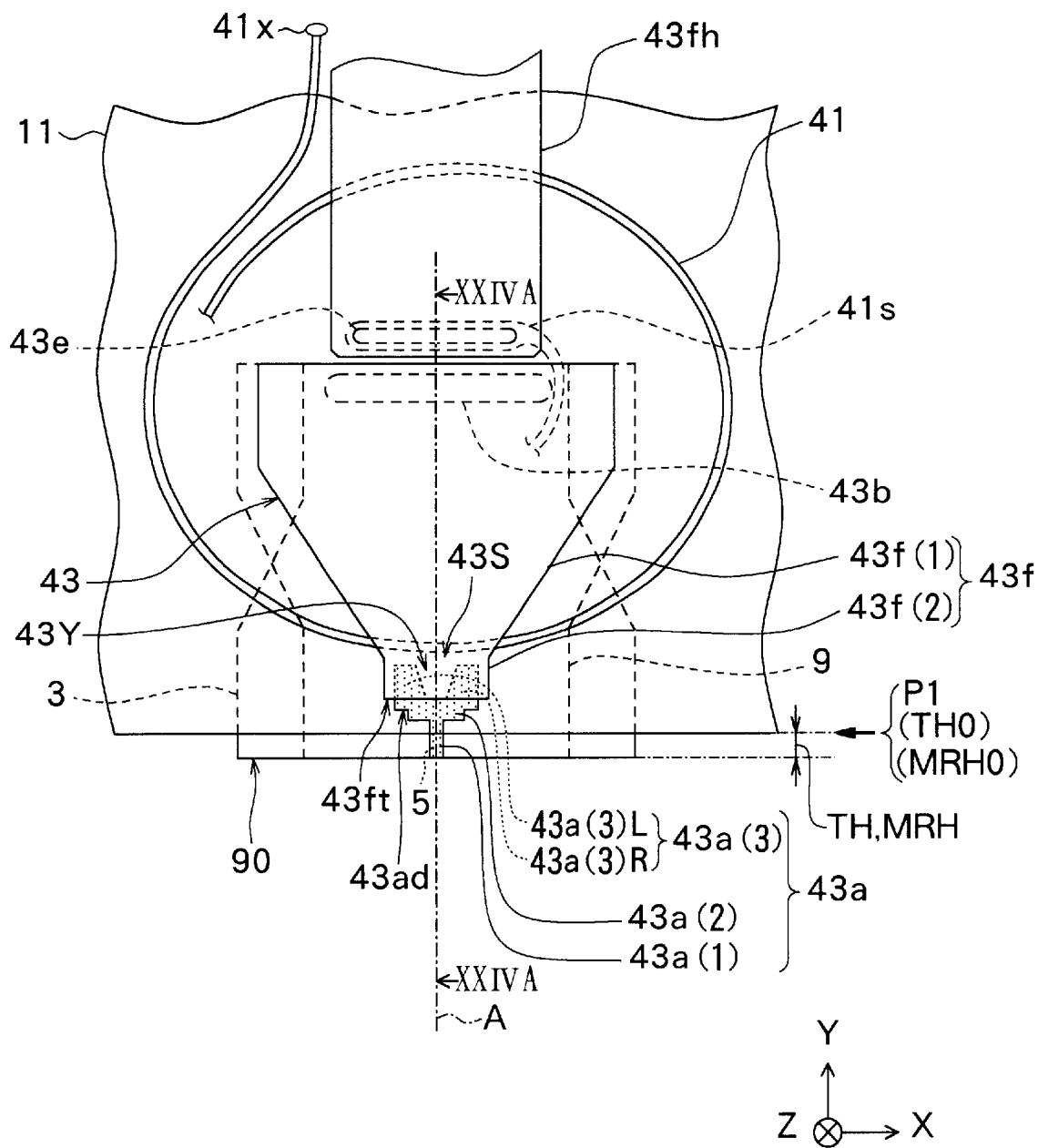
FIG. 28 is a plan view showing the structure of the thin film magnetic head according to the second embodiment of the invention.

As shown in FIGS. 21A, 21B and 25, on the flat write gap layer 12 on the front side of the region in which the thin film coil 41 is disposed, a top pole tip 43a as part of a top pole 43 is selectively formed in a thickness of about 2.5 to 3.5 $\mu$m by, for example, frame plating. The top pole tip 43a has a plane shape as shown in FIG. 28 which will be described hereinlater and includes a front end part 43a(1), an intermediate part 43a(2), and a rear end part 43a(3) consisted of a right rear end part 43a(3)R and a left rear end part 43a(3)L which are disposed so as to be separated from each other in the width direction. The structural characteristics of the top pole tip 43a will be described hereinlater. In the case of forming the top pole tip 43a, simultaneously, a magnetic path connection portion 43b as part of the top pole 43 is formed in the opening 12k and an intermediate connection pattern 43e is formed on the wiring connection portion 41s (the magnetic path connection portion 43b and the intermediate connection pattern 43e are not shown in FIG. 25). The intermediate connection pattern 43e is used to electrically connect the thin film coil 41 and the coil connecting wire 43fh which will be formed in a following process.

The top pole tip 43a corresponds to an example of "first magnetic portion" in the invention. The magnetic path connection portion 43b corresponds to an example of "third magnetic portion" in the invention. The front end part 43a(1) corresponds to "constant width portion" in the invention. The intermediate part 43a(2) corresponds to an example of "coupling portion" in the invention. The rear end part 43a(3) corresponds to an example of "connection portion" in the invention. Further, the intermediate connection pattern 43e corresponds to an example of "coil connecting pattern" in the invention. The thin film coil 41, the wiring connection portion 41s and the intermediate connection pattern 43e correspond to an example of "thin film coil part" in the invention.

In the case of forming the top pole tip 43a by the frame plating method, different from the case of forming the top pole tip 14a in the first embodiment, for example, the exposure process on the photoresist film to form the photoresist pattern is performed in a lump for the following reason. Since the entire top pole tip 43a is formed on the flat write gap layer 12 in the embodiment, an adverse influence of light reflected by the underlayer at the time of exposing the photoresist film is hardly exerted. The details of the method of forming such a photoresist pattern will be described hereinlater. As the material of the top pole tip 43a, the magnetic path connection portion 43b and the intermediate connection pattern 43e, in a manner similar to that of the top pole tip 14a and the like in the first embodiment, a magnetic material having a high saturated magnetic flux density such as Permalloy (Ni:Fe=45 percent by weight: 55 percent by weight) is used.

As shown in FIGS. 22A, 22B and 26, by using a photoresist film (not shown) selectively formed in the region rearward of the position of the front end of the insulating film 42 and the top pole tip 43a as a mask, the entire surface of the layer structure as mentioned above is etched about 0.3 to 0.4 μm by the RIE similar to that in the case of forming the pole part 100 in the first embodiment. By the etching process, the write gap layer 12, the bottom pole 9 and the insulating film pattern 11 around the top pole tip 43a in the region forward of the front end of the insulating film 42 are selectively removed and uniformly etched. At this time, part of each of the write gap layer 12 and the insulating film pattern 11 corresponding to a region 14Y surrounded by the two rear end parts, that is, the right and left rear end parts 43a(3)R and 43a(3)L and the intermediate part 43a(2) in the top pole tip 43a is removed as a matter of fact. By the etching process, a pole part 200 having the trim structure is formed.

As shown in FIGS. 22A, 22B and 26, for example, an alumina layer 44p is deposited in a thickness of about 3.0 to 4.0 μm so as to cover the entire surface of the layer structure as mentioned above by sputtering to thereby cover the uneven region constructed by the top pole tip 43a, the magnetic path connection portion 43b, the intermediate connection pattern 43e, the thin film coil 41 and the like.

Figures 23A, 23B:
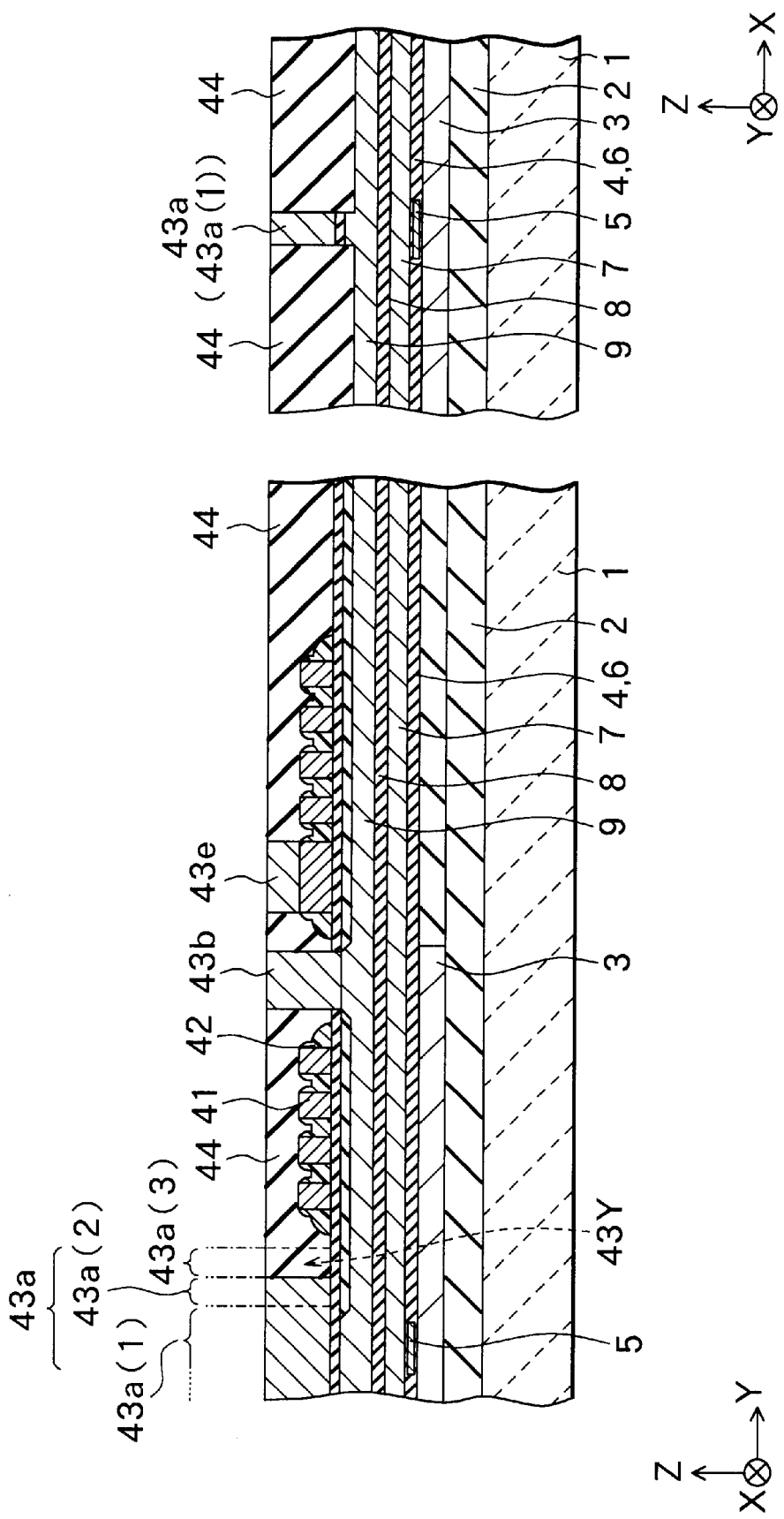
FIGS. 23A and 23B are cross sections for explaining a process subsequent to FIGS. 22A and 22B, respectively.

Subsequently, by polishing the entire surface of the alumina layer 44p by, for example, the CMP to planarize the surface, as shown in FIGS. 23A and 23B, an insulating film 44 which covers the thin film coil 41 and the like is formed. The polishing process at this time is performed until the top pole tip 43a, the magnetic path connection portion 43b and the intermediate connection pattern 43e are exposed. In the region 43S rearward of the top pole tip 43a, part of the insulating film 44 is buried. The insulating films 42 and 44 correspond to an example of "coil covering layer" in the invention and the insulating film pattern 11 and the insulating films 42 and 44 correspond to an example of "insulating layer" in the invention.

As shown in FIGS. 24A and 24B, an top yoke 43f as part of the top pole 43 is selectively formed in a thickness of about 2.0 to 3.0 μm on the region from the magnetic path connection portion 43b to the rear end part 43a(3) of the top pole tip 43a. The top yoke 43f has, for example, the structural characteristic similar to that of the top yoke 14f in the first embodiment. In the case of forming the top yoke 43f, simultaneously, the coil connection wiring 43fh is selectively formed on the region from the intermediate connection pattern 43e to an external circuit (not shown). The material, forming method and the like of the top yoke 43f and the coil connection wiring 43fh are similar to those of the case of forming the top pole tip 43a and the like in the first embodiment. The top yoke 43f is formed so that the position of the front end coincides with the position of the rear end of the intermediate part 43a(2) in the top pole tip 43a and at least the front edge face is inclined. The stereoscopic structure of the periphery of the top yoke 43f is as shown in FIG. 27. The top yoke 43f corresponds to an example of "second magnetic portion" in the invention. The top pole 43 consisted of the top pole tip 43a, the magnetic path connection portion 43b, and the top yoke 43f corresponds to an example of "first magnetic layer" in the invention.

As shown in FIGS. 24A and 24B, an overcoat layer 45 made of alumina or the like is formed by, for example, sputtering so as to cover the whole surface of the layer structure as mentioned above. After that, the air bearing surface 90 is formed by machining and polishing, thereby completing a thin film magnetic head according to the embodiment.

FIG. 28 is plan view schematically shows the structure of the thin film magnetic head manufactured by the method of manufacturing the thin film magnetic head according to the embodiment. In FIG. 28, the same components as those shown in FIG. 17 of the first embodiment are designated by the same reference numerals. In FIG. 28, the insulating films 42 and 44, the overcoat layer 45 and the like are omitted. With respect to the thin film coil 41, only the outermost peripheral part is shown. FIG. 24A is a cross section taken along line XXIVA—XXIVA of FIG. 28.

As shown in FIG. 28, the top pole 43 is constructed by the top pole tip 43a, the magnetic path connection portion 43b and the top yoke 43f which are separately formed. The top yoke 43f has a plane shape similar to that of the top yoke 14f (refer to FIG. 9A) in the first embodiment and includes a yoke part 43f(1) and a connection portion 43f(2) corresponding to the yoke part 14f(1) and the connection portion 14f(2) of the top yoke 14f, respectively. The position of the front edge face 43ft of the top yoke 43f almost coincides with, for example, the position of the rear end of the top pole tip 43a.

The top pole tip 43a includes, in accordance with the order from the air bearing surface 90 side, a front end part 43a(1), an intermediate part 43a(2) and a rear end part 43a(3) corresponding to the front end part 14a(1), the intermediate part 14a(2) and the rear end part 14a(3) (refer to FIG. 9A) of the top pole tip 14a in the first embodiment, respectively. The centers in the width direction of these parts coincide with each other. The front end part 43a(1) has an almost constant width in the length direction. The intermediate part 43a(2) includes, for instance, a front part wider than the front end part 43a(1) and a rear part wider than the front part. The rear end part 43a(3) includes, for example, two parts disposed so as to be separate in the width direction, that is, the right rear end part 43a(3)R and the left rear end part 43a(3)L. The right and left rear end parts 43a(3)R and 43a(3)L are disposed symmetrically with respect to the center line A of the front end part 43a(1) and the intermediate part 43a(2). Their shapes are symmetrical with respect to the center line A as a reference. The width of the rear end part 43a(3) specified by the two parts substantially coincides with, for example, that of the rear portion of the intermediate part 43a(2). A step in the width direction is formed in the coupling portion of the front end part 43a(1) and the intermediate part 43a(2). A step face 43ad on the intermediate part 43a(2) side in the coupling portion is positioned, for example, rearward of TH0 (or MRH0). As shown in FIG. 24A, the top pole tip 43a extends on the flat write gap layer 12.

As shown in FIGS. 24A and 28, the top yoke 43f is magnetically coupled to the bottom pole 9 sandwiching the magnetic path connection portion 43b in the opening 12k. As shown in FIGS. 24A, 27 and 28, the top yoke 43f is also partially overlapped with and magnetically coupled to part of the top pole tip 43a (the rear end part 43a(3)). That is, by connecting the top pole 43 (the top pole tip 43a, the magnetic path connection portion 43b and the top yoke 43f) and the bottom pole 9, a magnetic path is formed.

As shown in FIG. 28, the thin film coil 41 and the wiring connection portion 41s have the structural characteristics similar to, for example, those of the thin film coil 16 and the coil connection portion 16s in the first embodiment. The thin film coil 41 is electrically connected to the coil connection wiring 43fh sandwiching the intermediate connection pattern 43e. A terminal 41x provided at the outer terminating end of the thin film coil 41 and part (not shown) of the rear side of the coil connection wiring 43fh are connected to an external circuit (not shown). Via then external circuit, current can be passed to the thin film coil 41.

The structural characteristics of the other disposed members shown in FIG. 28 are similar to those of the first embodiment (FIG. 17).

In the embodiment, as shown in FIGS. 24A, 27 and 28, different from the first embodiment, when an etching process to form the pole part 200 in a region corresponding to the region 14S (refer to FIG. 9A), that is, a region 43S corresponding to the magnetic coupling face 43R with which the rear end part 43a(3) of the top pole tip 43a and the top yoke 43f are in contact so as to be overlapped, the insulating film pattern 13 is not disposed. In the embodiment, part of the insulating film 44 which covers the thin film coil 41 and the like is buried in a region 43Y as part of the region 43S. The part of the insulating film 44 buried in the region 43Y plays the role of suppressing the leakage of the magnetic flux in the region 43S in place of the insulating film pattern 13. Consequently, by the existence of the insulating film 44 buried in the region 43Y, the leakage of the magnetic flux in the region 43Y can be suppressed without disposing the insulating film pattern 13 by the action as follows. That is, the tendency of the leakage of the magnetic flux in the region 43S is conspicuous in the center region (region including the region 43Y) because the magnetic flux flows concentratedly to the center region of the region 43S in the magnetic flux propagation process from the top yoke 43f to the top pole tip 43a. Consequently, by burying part of the insulating film 44 into the region 43Y, the concentration of the magnetic flux onto the center region can be suppressed.

In the embodiment, as shown in FIGS. 24A, 27 and 28, the rear end part 43a(3) of the top pole tip 43a is constructed by the two parts (the right rear end part 43a(3)R and the left rear end part 43a(3)L) disposed so as to be separated from each other in the width direction. The overwrite characteristic can be therefore improved by the action as described hereinbelow. Specifically, the magnetic flux generated by the thin film coil 41 at the time of an information recording operation propagates the top yoke 43f and evenly flows in the rear end parts 43a(3)R and 43a(3)L of the top pole tip 43a. The magnetic flux flowed in both of the parts propagates the intermediate part 43a(2) and is merged in the intermediate part 43a(2). The resultant flux further propagates the front end part 43a(1). By constructing such a magnetic flux propagation path, especially, a magnetic flux saturating phenomenon which occurs when the magnetic flux flows from a region (the rear end part 43a(3)) of a large magnetic volume to a region (the intermediate part 43a(2)) of a small magnetic volume can be suppressed. Consequently, the propagation loss of the magnetic flux in the top pole tip 43a can be reduced and the magnetic flux of a sufficient volume can be supplied to the front end part 43a(1) of the top pole tip 43a.

In the embodiment, the intermediate connection pattern 43e is formed on the wiring connection portion 41s provided at the end of the thin film coil 41 by the same process as forming the top pole tip 43a. Consequently, by the action similar to that of the case of forming the intermediate connection pattern 14e (refer to FIGS. 8A and 9A) in the first embodiment, the process of connecting the thin film coil 41 and the coil connection wiring 43fh is simplified. Thus, the number of manufacturing steps can be reduced.

Since the front edge face of the top yoke 43f is inclined in the embodiment, the flow of the magnetic flux from the top yoke 43f to the top pole tip 43a can be smoothed.

Referring now to FIGS. 29A to 29D, the method of forming the top pole tip 43a in the embodiment will be described in detail.

In the method of manufacturing the thin film magnetic head according to the embodiment, different from the case of forming the top pole tip 14a in the first embodiment, by performing the exposing process once on the photoresist film, the photoresist pattern used to form the top pole tip 43a is formed. When the underlayer (the write gap layer 12) of the region in which the top pole tip 43a is disposed is flat, by performing the exposing process once, the top pole tip 43a can be formed with high accuracy. The point will be mainly described hereinbelow.

FIG. 29A shows the shape in plane of a photo mask 51 used in the exposing process. FIG. 29B shows a region (an exposure region 151y) of a photoresist film 151 exposed by the exposing process. FIG. 29C shows the shape in plane of a photoresist pattern 152 obtained by developing the exposure region 151y shown in FIG. 29B. FIG. 29D shows the shape in plane of the top pole tip 43a formed by using the photoresist pattern 152.

The photo mask 51 shown in FIG. 29A has an opening 51x of a shape corresponding to the shape in plane of the top pole tip 43a. In the exposing process in the embodiment, first, by performing the exposing process with the photo mask 51, as shown in FIG. 29B, the exposure region 151y having the shape in plane corresponding to the opening 51x is formed in the photoresist film 151. Since the exposing process at this time is performed on the flat underlayer, occurrence of light reflected in the lateral and oblique directions by the underlayer is suppressed and the expanding tendency of the exposure region is accordingly suppressed. Especially, in the embodiment, a dent (the region 43Y in FIG. 29D) is provided rearward of the top pole tip 43a. A part 51a corresponding to the dent in the photo mask 51 serves as a light shielding part, so that the total amount of light emitted to the part corresponding to the region 43S in the photoresist 151 decreases. Consequently, the amount of light reflected from the underlayer decreases and, as a result, the expanding tendency of the exposure region due to the reflection light is suppressed. That is, very accurate exposure can be performed on the photoresist film 151. Particularly, in the photoresist film 151, expansion of the exposure region of the part corresponding to the front end part 43a(1) of the top pole tip 43a can be effectively prevented.

By developing the exposure region 151y in the photoresist film 151, as shown in FIG. 29C, the photoresist pattern 152 having an opening 152z is formed. The shape in plane of the opening 152z corresponds to the shape in plane of the top pole tip 43a. By performing the plating process with the photoresist pattern 152, the top pole tip 43a (FIG. 29D) is formed. The front end part 43a(1) of the top pole tip 43a formed as mentioned above has a shape characteristic similar to that of the front end part 14a(1) of the top pole tip 14a in the first embodiment. That is, the front end part 43a(1) of the top pole tip 43a also has a constant width which is very narrow over the entire front end part 43a(1).

In the case of forming the top pole tip 43a, it is not always necessary to perform the exposing process once. For example, as described in the first embodiment and its modification, the top pole tip 43a may be formed by the exposing process of twice or more. Especially, in the second embodiment, by performing the exposing process on the part corresponding to the front end part 43a(1) of the top pole tip 43a in the photoresist film 151 separately from the other part (the intermediate part 43a(2) and the like), the absolute amount of light emitted to the photoresist film 151 can be reduced. As a result, the front end part 43a(1) of the top pole tip 43a can be very accurately formed.

Since the action, effects, modification and the like of the method of manufacturing the thin film magnetic head according to the embodiment are similar to those of the first embodiment, their description is omitted here.

Figure 30:
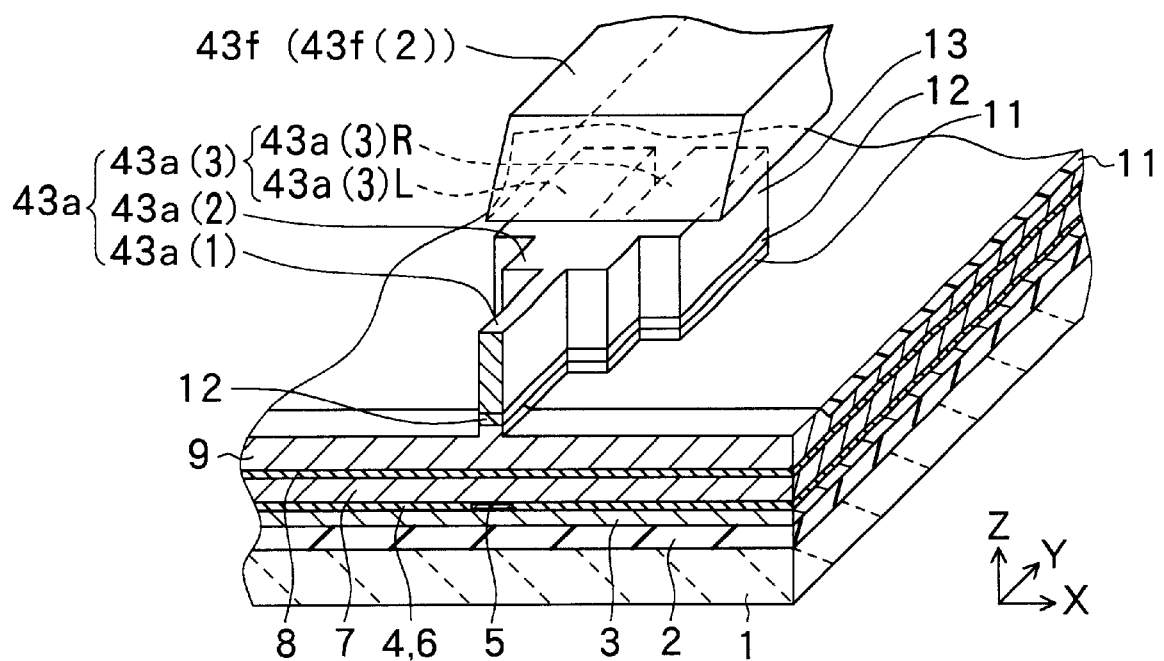
FIG. 30 is a perspective view showing a modification of the thin film magnetic head according to the embodiment of the invention.
Figure 31:
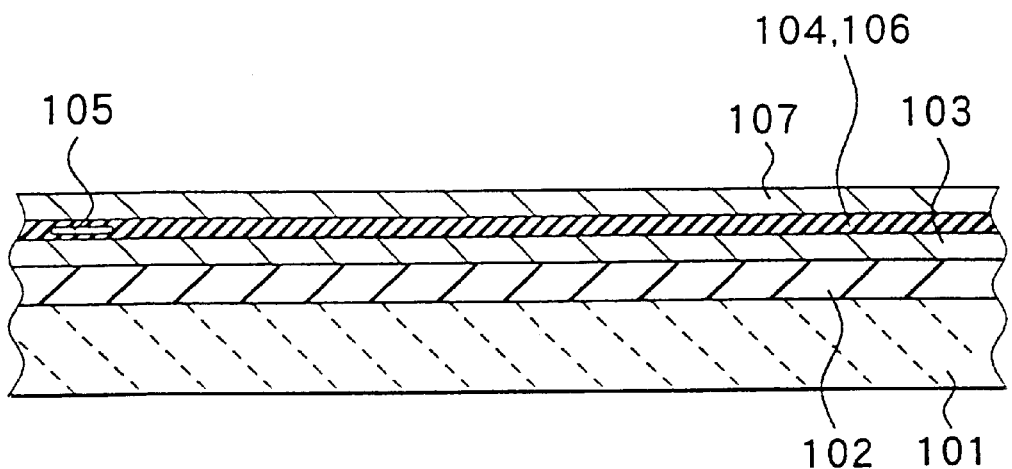
FIG. 31 is a cross section for explaining a process in a method of manufacturing a conventional thin film magnetic head.
Figure 32:
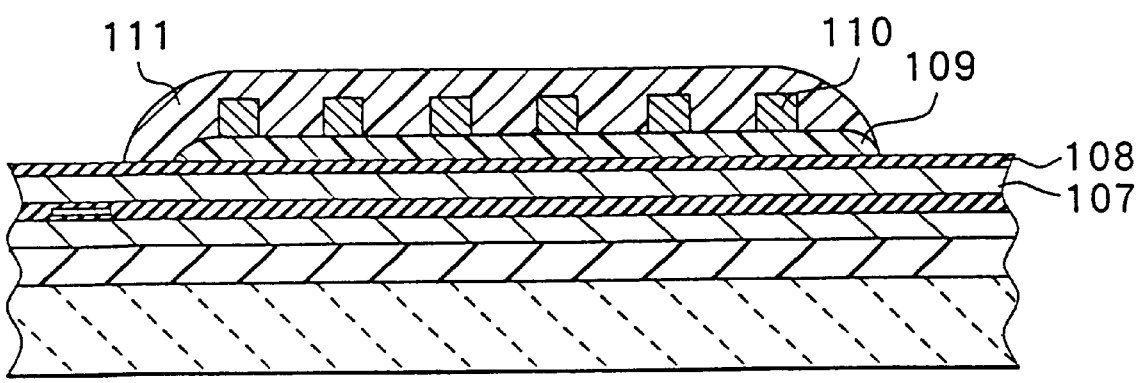
FIG. 32 is a cross section for explaining a process subsequent to FIG. 31.

Although the invention has been described above by the embodiments, the invention is not limited to the embodiments but can be variously modified. For example, in the second embodiment, the insulating film pattern 13 (refer to FIG. 12) in the first embodiment is not disposed. The invention is not always limited to the arrangement. As shown in FIG. 30, it is also possible to provide the insulating film pattern 13 below the rear end part 43a(3) of the top pole tip 43a and allow part of the rear end part 43a(3) to be on the insulating film pattern 13. In such a case, the effects of suppressing the leakage of the magnetic flux in both the cases described in the first and second embodiments can be obtained. The overwrite characteristic of the thin film magnetic head can be therefore improved more. In such a case, part of the top pole tip 43a does not always have to be on the insulating film pattern 13. For example, the whole top pole tip 43a may be disposed on the flat face in the front side region of the insulating film pattern 13.

Although the method of manufacturing the composite thin film magnetic head has been described in the embodiments and modification, the invention can be also applied to a recording-only thin film magnetic head having an inductive magnetic transducer for writing and a thin film magnetic head having an inductive magnetic transducer for recording and reproducing. The invention can be also applied to a thin film magnetic head of a structure in which a element for writing and a element for reading are stacked in an opposite order.

As described above, according to the thin film magnetic head or the method of manufacturing the thin film magnetic head of the invention, there is provided the first non-magnetic pattern serving as part of the insulating layer, which is provided in a recess formed in a part on the side in contact with the gap layer, of the second magnetic layer. The front end of the first non-magnetic pattern specifies the position of the front end of the insulating layer. The front end is positioned in a region where the constant width portion extends in the region where the first magnetic portion extends. Consequently, due to the existence of the first non-magnetic pattern, the propagation of the magnetic flux from its upper region to its lower region, that is, leakage of the magnetic flux is suppressed, so that the propagation loss of the magnetic flux in the magnetic flux propagation process can be reduced. As a result, an effect such that the excellent overwrite characteristic can be assured is achieved.

Particularly, according to the thin film magnetic head or the method of manufacturing the thin film magnetic head in an aspect of the invention, the second non-magnetic pattern which extends so as to be in contact with a face opposite to the face with which the first non-magnetic pattern is in contact in the gap layer and which serves as part of the insulating layer is provided. Consequently, due to the existence of the second non-magnetic pattern, propagation of the magnetic flux between the first and second magnetic layers can be suppressed and, particularly, an effect such that propagation of the magnetic flux from the first magnetic layer to the second magnetic layer can be suppressed is achieved. With respect to this point as well, the invention can contribute to the assurance of the excellent overwrite characteristic.

According to the thin film magnetic head in another aspect of the invention, the surface near the front end of the second non-magnetic pattern is inclined with respect to the surface of the gap layer. As a result, an effect such that the flow of the magnetic flux in the first magnetic portion on the second non-magnetic pattern can be smoothed is achieved.

According to the thin film magnetic head in further another aspect of the invention, the front end of the second non-magnetic pattern is positioned rearward in the length direction of the position of the front end of the first non-magnetic pattern, and the first magnetic portion extends from a flat region of the gap layer to the inclined face of the second non-magnetic pattern. As a result, an effect such that while assuring the magnetic volume in the constant width portion in the first magnetic portion, propagation of the magnetic flux from the first magnetic portion to the second magnetic layer in the area in which the second non-magnetic pattern is formed can be suppressed is achieved.

According to the thin film magnetic head or the method of manufacturing the thin film magnetic head in further another aspect of the invention, part of the insulating layer is buried in the region surrounded by the coupling portion in the first magnetic portion and at least two connection portions, so that propagation of the magnetic flux from the first magnetic portion to the second magnetic layer can be suppressed. That is, an effect such that leakage of the magnetic flux can be suppressed by the part of the insulating layer buried in the region is achieved. This point also contributes the assurance of the excellent overwrite characteristic.

According to the thin film magnetic head or the method of manufacturing the thin film magnetic head in further another aspect of the invention, at least one of the first and second magnetic layers is made of a material containing nickel iron alloy or iron nitride. Consequently, an effect such that propagation of the magnetic flux in at least one of the first and second magnetic layers can be smoothed is achieved.

According to the thin film magnetic head or the method of manufacturing the thin film magnetic head in further another aspect of the invention, at least one of the first and second magnetic layers is made of a material containing an amorphous alloy such as cobalt iron alloy or zirconium cobalt iron. Consequently, an effect such that propagation of the magnetic flux in at least one of the first and second magnetic layers can be smoothed is achieved.

According to the method of manufacturing the thin film magnetic head in further another aspect of the invention, in the case where the surface near the front end of the second non-magnetic pattern has an inclined face inclined with respect to the surface of the gap layer and at least part of the coupling portion in the first magnetic portion and the connection portion is disposed on the inclined face of the second non-magnetic pattern, the step of forming the first magnetic portion comprises: a step of forming a photoresist layer so as to cover at least the flat region in the gap layer and the inclined region in the second non-magnetic pattern; a first exposing step of selectively exposing a first region including a region corresponding to the shape in plane of the constant width portion, in the photoresist layer in the flat region of the gap layer; a second exposing step of selectively exposing a second region corresponding to the shape in plane of at least the coupling portion and the connection portion in the photoresist layer in a region extending from the inclined region in the second non-magnetic pattern to the flat region in the gap layer; a step of forming a photoresist pattern by developing both the first and second regions in the photoresist layer in a lump; and a step of integrally forming the constant width portion, the coupling portion and the connection portion by using the photoresist pattern. Also in the case of forming the first magnetic portion on the underlayer which is not flat, effects such that an adverse influence by the light reflected from the underlayer in the photolithography step can be avoided, and the first magnetic portion can be formed with high accuracy are achieved.

According to the method of manufacturing the thin film magnetic head in further another aspect of the invention, in the second exposing step, the first and second regions are partially overlapped with each other. Also in the case where an influence by the light reflected from the underlayer is exerted in the photolithography step, an effect such that the first magnetic portion can be formed almost in a design shape is achieved.

According to the method of manufacturing the thin film magnetic head in further another aspect of the invention comprises the steps of: forming the first magnetic portion and, simultaneously, forming the third magnetic portion and a coil connection pattern as part of the thin film coil part on a coil end provided at the end of the thin film coil part; forming a coil covering layer as part of the insulating layer so as to cover at least the first magnetic portion, the third magnetic portion and the coil connection pattern; planarizing the surface of the coil covering layer by polishing until at least the first magnetic portion, the third magnetic portion and the coil connection pattern are exposed; and forming the second magnetic portion so as to be magnetically coupled with the exposed faces of both the first and third magnetic portions on the surface planarized by the polishing and, simultaneously, forming a conductive layer pattern so as to be electrically connected to the exposed face of the coil connection pattern. Consequently, different from the case where the coil connection pattern is not formed on the coil end, the step of forming an opening by etching part of the coil covering layer so as to electrically connect the coil end and the conductive layer pattern is unnecessary. Thus, an effect such that the number of manufacturing steps can be reduced is achieved.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:

a first magnetic layer having a magnetic pole and a second magnetic layer having a magnetic pole, which are magnetically coupled to each other, the magnetic poles facing each other with a gap layer having a flat surface region in between in part of a side of a recording-medium-facing surface facing a recording medium, and the first magnetic layer including a first magnetic portion having a constant width portion which extends from the recording medium facing surface in a length direction so as to be apart from the recording medium facing surface and which specifics a recording track width of the recording medium, the first magnetic portion further comprising:

at least two connection portions disposed so as to be separated from each other in the track width direction; and a coupling portion for magnetically coupling the constant width portion and at least two connection portions;

a thin film coil part disposed between the two magnetic layers sandwiching an insulating layer; and a first non-magnetic pattern which is embedded in a recess formed in part on the side in contact with the gap layer, of the second magnetic layer, and which serves as part of the insulating layer, the position of the front end of the first non-magnetic pattern specifying the position of the front end of the insulating layer, wherein the front end of the first non-magnetic pattern is positioned in a region where the constant width portion extends of the region where the first magnetic portion extends.

2. A thin film magnetic head according to claim 1, wherein at least one of the first and second magnetic layers is made of a material containing either a nickel iron alloy or an iron nitride.

3. A thin film magnetic head according to claim 1, wherein at least one of the first and second magnetic layers is made of a material containing an amorphous alloy.

4. A thin film magnetic head according to claim 3, wherein the amorphous alloy is either a cobalt iron alloy or a zirconium cobalt-iron alloy.

5. A thin film magnetic head according to claim 1, wherein at least the constant width portion of the first magnetic portion extends on the flat region of the gap layer.

6. A thin film magnetic head according to claim 1, wherein a region surrounded by the coupling portion and at least two connection portions of the first magnetic portion is filled with part of the insulating layer.

* * * * *